(12) United States Patent
Douady et al.

(10) Patent No.: US 10,728,474 B2
(45) Date of Patent: Jul. 28, 2020

(54) IMAGE SIGNAL PROCESSOR FOR LOCAL MOTION ESTIMATION AND VIDEO CODEC

(71) Applicants: GoPro, Inc., San Mateo, CA (US); Bruno César Douady, Bures-sur-Yvette (FR); Sandeep Doshi, Sunnyvale, CA (US)

(72) Inventors: Bruno César Douady, Bures-sur-Yvette (FR); Sandeep Doshi, Sunnyvale, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/303,428

(22) PCT Filed: May 25, 2017

(86) PCT No.: PCT/US2017/034422
§ 371 (c)(1),
(2) Date: Nov. 20, 2018

(87) PCT Pub. No.: WO2017/205597
PCT Pub. Date: Nov. 30, 2017

(65) Prior Publication Data
US 2019/0297283 A1 Sep. 26, 2019

Related U.S. Application Data

(63) Continuation of application No. 15/399,269, filed on Jan. 5, 2017, now Pat. No. 10,404,926, which is a (Continued)

(51) Int. Cl.
*H04N 5/357* (2011.01)
*H04N 5/247* (2006.01)
(Continued)

(52) U.S. Cl.
CPC .......... *H04N 5/3572* (2013.01); *G06T 3/0093* (2013.01); *G06T 3/4038* (2013.01);
(Continued)

(58) Field of Classification Search
CPC .... H04N 5/3572; H04N 19/85; H04N 5/2258; H04N 5/23238; H04N 5/247;
(Continued)

(56) References Cited

U.S. PATENT DOCUMENTS

2008/0240612 A1 10/2008 Liang
2009/0290641 A1* 11/2009 Crinon ............... H04N 19/56
375/240.16
(Continued)

FOREIGN PATENT DOCUMENTS

WO 2015172235 A1 11/2015

OTHER PUBLICATIONS

PCT International Preliminary Report and Writtten Opinion for PCT/US2017/034422, dated Nov. 27, 2018, 10 pages.
(Continued)

*Primary Examiner* — Lin Ye
*Assistant Examiner* — Tuan H Le
(74) *Attorney, Agent, or Firm* — Young Basile Hanlon & MacFarlane, P.C.

(57) ABSTRACT

Image signal processing including generating image signal processing based encoding hints for motion estimation may include an image signal processor obtaining an input image portion of an input image from the input image signal, generating motion information for the input image portion, processing the input image portion based on the motion information, outputting processed image data, and outputting the motion information as encoding hints, such that the motion information is accessible by an encoder for generating an encoded output bitstream by obtaining the pro-
(Continued)

cessed image data as source image data, obtaining the motion information, generating prediction data for encoding the source image data based on the motion information, generating encoded image data based on the prediction data, and including the encoded image data in an encoded output bitstream.

23 Claims, 21 Drawing Sheets

Related U.S. Application Data continuation of application No. 15/358,495, filed on Nov. 22, 2016, now Pat. No. 10,499,085, which is a continuation of application No. 15/268,038, filed on Sep. 16, 2016, now Pat. No. 9,639,935.

(60) Provisional application No. 62/341,580, filed on May 25, 2016.

(51) Int. Cl.

| | | |
|---|---|---|
| H04N 5/232 | (2006.01) | |
| H04N 17/00 | (2006.01) | |
| G06T 7/80 | (2017.01) | |
| G06T 3/40 | (2006.01) | |
| H04N 19/10 | (2014.01) | |
| H04N 19/136 | (2014.01) | |
| H04N 19/176 | (2014.01) | |
| H04N 19/423 | (2014.01) | |
| H04N 19/70 | (2014.01) | |
| H04N 19/90 | (2014.01) | |
| H04N 13/271 | (2018.01) | |
| G06T 5/20 | (2006.01) | |
| G06T 5/50 | (2006.01) | |
| H04N 19/85 | (2014.01) | |
| G06T 3/00 | (2006.01) | |
| H04N 5/225 | (2006.01) | |
| H04N 13/239 | (2018.01) | |
| H04N 13/122 | (2018.05) | |
| G06T 5/00 | (2006.01) | |

(52) U.S. Cl.
CPC .................. *G06T 5/20* (2013.01); *G06T 5/50* (2013.01); *G06T 7/85* (2017.01); *H04N 5/2258* (2013.01); *H04N 5/23238* (2013.01); *H04N 5/247* (2013.01); *H04N 13/271* (2018.05); *H04N 17/002* (2013.01); *H04N 19/10* (2014.11); *H04N 19/136* (2014.11); *H04N 19/176* (2014.11); *H04N 19/423* (2014.11); *H04N 19/70* (2014.11); *H04N 19/85* (2014.11); *H04N 19/90* (2014.11); *G06T 5/002* (2013.01); *G06T 2207/10016* (2013.01); *H04N 13/122* (2018.05); *H04N 13/239* (2018.05)

(58) Field of Classification Search
CPC ....... H04N 17/002; G06T 7/85; G06T 3/4038; G06T 3/0093; G06T 2207/10016
See application file for complete search history.

(56) References Cited

U.S. PATENT DOCUMENTS

| | | |
|---|---|---|
| 2010/0189179 A1 | 7/2010 | Gu |
| 2010/0322306 A1 | 12/2010 | Au |
| 2011/0033130 A1 | 2/2011 | Poon |
| 2012/0154545 A1 | 6/2012 | Choi |
| 2013/0021483 A1 | 1/2013 | Bennett |
| 2013/0051689 A1 | 2/2013 | Shimauchi |
| 2013/0051697 A1 | 2/2013 | Takahashi |
| 2014/0028876 A1 | 1/2014 | Mills |
| 2014/0341287 A1 | 11/2014 | Mody |
| 2015/0016543 A1 | 1/2015 | Rapaka |
| 2015/0049193 A1 | 2/2015 | Gupta |
| 2015/0302561 A1 | 10/2015 | Pekkucuksen |
| 2015/0317781 A1 | 11/2015 | Napier |
| 2016/0037061 A1 | 2/2016 | Lim |
| 2016/0307346 A1 | 10/2016 | Staudenmaier |
| 2017/0084007 A1 | 3/2017 | Rakhshanfar |
| 2017/0111652 A1* | 4/2017 | Davies ................ H04N 19/513 |
| 2017/0287184 A1 | 10/2017 | Pettersson |

OTHER PUBLICATIONS

PCT International Preliminary Report and Written Opinion for PCT/US2017/034231 dated Nov. 27, 2018, 11 pages.
PCT International Search Report and Written Opinion for PCT/US16/31076, dated Aug. 8, 2016, 19 Pages.
Form PCT/ISA/206 and Annex to Form PCT/ISA/206 Communication Relating to the Results of the Partial International Search for International Application No. PCT/US2017/034231 dated Sep. 13, 2017 (14 pgs).
PCT International Search Report and Written Opinion for PCT/US2017/034231 dated Nov. 7, 2017, 19 pages.
Pesquet-Popescu et al., "Motion Estimation Techniques," TELECOM Paris Tech, https://pdfs.semanticscholar.org/98ca/f8325abb40aa6bbddd0e7f5d3a6c366d03e6.pdf, 76 pages.

* cited by examiner

1300

| $P_{0,0}$ | $P_{0,1}$ | $P_{0,2}$ | $P_{0,3}$ |
|---|---|---|---|
| $P_{1,0}$ | $P_{1,1}$ | $P_{1,2}$ | $P_{1,3}$ |
| $P_{2,0}$ | $P_{2,1}$ | $P_{2,2}$ | $P_{2,3}$ |
| $P_{3,0}$ | $P_{3,1}$ | $P_{3,2}$ | $P_{3,3}$ |

1310

| $P_{0,0}$ | $P_{0,1}$ | $P_{0,2}$ | $P_{0,3}$ |
|---|---|---|---|
| $P_{1,0}$ | $P_{1,1}$ | $P_{1,2}$ | $P_{1,3}$ |
| $P_{2,0}$ | $P_{2,1}$ | $P_{2,2}$ | $P_{2,3}$ |
| $P_{3,0}$ | $P_{3,1}$ | $P_{3,2}$ | $P_{3,3}$ |

FIG. 13

IMAGE SIGNAL PROCESSOR FOR LOCAL MOTION ESTIMATION AND VIDEO CODEC

CROSS-REFERENCE TO RELATED APPLICATION(S)

This application claims the benefit of U.S. Provisional Application No. 62/341,580, filed on May 25, 2016, U.S. patent application Ser. No. 15/268,038, filed Sep. 16, 2016, now U.S. Pat. No. 9,639,935, U.S. patent application Ser. No. 15/358,495, filed on Nov. 22, 2016, and U.S. patent application Ser. No. 15/399,269, filed on Jan. 5, 2017, which are incorporated herein by reference in the entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing, including temporal and spatial image noise reduction, local motion compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for image signal processing based encoding hints for motion estimation.

An aspect of the disclosure relates to a non-transitory computer-readable storage medium, comprising executable instructions that, when executed by a processor, facilitate performance of operations including obtaining, by an image signal processor, from an image sensor, an input image signal, obtaining, by the image signal processor, an input image portion of an input image from the input image signal, generating, by the image signal processor, motion information for the input image portion, generating, by the image signal processor, a processed image portion by processing the input image portion based on the motion information, including, by the image signal processor, the processed image portion in processed image data, outputting, by the image signal processor, the processed image data, such that the processed image data is accessible by an encoder, and outputting, by the image signal processor, the motion information as an encoding hint, such that the motion information is accessible by the encoder for generating an encoded output bitstream by, obtaining source image data for a frame, the source image data including the processed image data, obtaining the motion information, obtaining a source image portion from the source image data, the source image portion corresponding to the processed image portion, generating a prediction portion for encoding the source image portion based on the motion information, generating encoded image data based on the prediction portion, and including the encoded image data in the encoded output bitstream.

Another aspect of the disclosure is a method for digital image and video processing. The method may include obtaining, by an image signal processor, from an image sensor, an input image signal, obtaining, by the image signal processor, an input image portion of an input image from the input image signal, generating, by the image signal processor, motion information for the input image portion, generating, by the image signal processor, a processed image portion by processing the input image portion based on the motion information, including, by the image signal processor, the processed image portion in processed image data, outputting, by the image signal processor, the processed image data, and outputting, by the image signal processor, the motion information as an encoding hint. The method may include obtaining, by an encoder, source image data for a frame, the source image data including the processed image data, obtaining, by the encoder, the motion information, obtaining, by the encoder, a source image portion from the source image data, the source image portion corresponding to the processed image portion, generating, by the encoder, a prediction portion for encoding the source image portion based on the motion information, generating, by the encoder, encoded image data based on the prediction portion, and outputting, by the encoder, the encoded image data.

Another aspect of the disclosure is an apparatus. The apparatus includes an image sensor, and an image signal processor configured to obtain an input image signal from the image sensor, obtain an input image portion of an input image from the input image signal, generate motion information for the input image portion, generate a processed image portion by processing the input image portion based on the motion information, include the processed image portion in processed image data, output the processed image data, and output the motion information as an encoding hint. The apparatus includes an encoder configured to obtain source image data for a frame, the source image data including the processed image data, obtain the motion information output by the image signal processor, obtain a source image portion from the source image data, the source image portion corresponding to the processed image portion, generate a prediction portion for encoding the source image portion based on the motion information, generate encoded image data based on the prediction portion, and output the encoded image data.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 13 shows examples of blocks for determining encoding hints in accordance with this disclosure.

Figure 1:
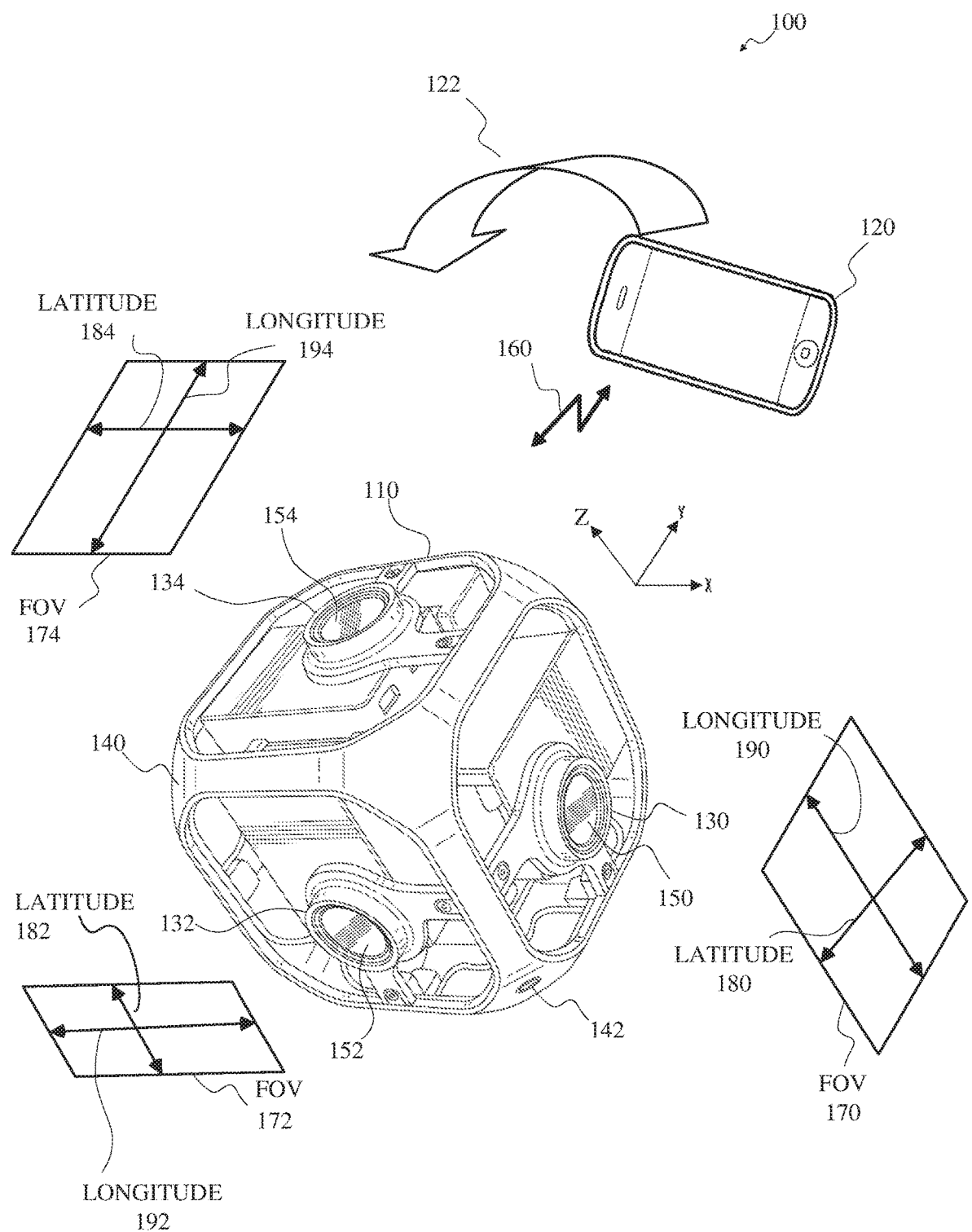
FIG. 1 is a diagram of an example of an image capture system for content capture in accordance with implementations of this disclosure.

All figures disclosed herein are © Copyright 2017 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more image sensors and may process the image signal to generate one or more processed images, pictures, or frames. Processing the images by the image signal processor may include identifying motion information, such as motion vectors, representing motion between the respective images and reference data, which may include previously processed image data, such as previously processed reference data from a temporally previous frame or from a previously processed portion of the current frame. For example, the image signal processor may perform motion estimation to generate the motion information. The image signal processor may output the processed images, which may include storing the processed images, such as in a memory of the image capture device. An encoder, such as an encoder included in the image capture device, may access the processed images output by the image signal processor and may generate corresponding encoded images by encoding the processed images. Encoding the processed images by the encoder may include performing motion estimation to identifying motion information, such as motion vectors, representing motion between the respective images and reference data.

Image signal processing and encoding including image signal processing-based encoding hints for motion estimation may improve the efficiency of image signal processing and encoding that omits image signal processing-based encoding hints for motion estimation. For example, image signal processing and encoding including image signal processing-based encoding hints may include the image signal processor outputting the motion information generated by the image signal processor as encoding hints and the encoder accessing the motion information generated by the image signal processor as encoding hints and using the encoding hints to encode the processed images, which may omit motion estimation or may include motion estimation based on the encoding hints.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of the sides of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, respective image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, respective image capture devices 130, 132, 134 may have a respective field-of-view 170, 172, 174, such as a field-of-view 170, 172, 174 that 90° in a lateral, or latitudinal, dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the lateral dimension 184 of the field-of-view 174 for the image capture device 134, the lateral dimension 180 of the field-of-view 170 for the image capture device 130 may be oriented at 90° with respect to the longitudinal dimension 192 of the field-of-view 172 for the image capture device 132, and the lateral dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by respective image capture device 130, 132, 134 may be combined to form a panoramic image.

In some implementations, an image capture device 130, 132, 134 may include a lens 150, 152, 154 or another optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, In some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, the GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application, such as the GoPro App, may generate and share, such as via a cloud-based or social media service, one or more images, or short video clips, such as in response to user input.

In some implementations, the user interface device 120, such as via an application, such as the GoPro App, may remotely control the image capture apparatus 110, such as in response to user input.

In some implementations, the user interface device 120, such as via an application, such as the GoPro App, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application, such as the GoPro App, may mark one or more key moments contemporaneously with capturing the images or video by the image capture apparatus 110, such as with a HiLight Tag, such as in response to user input.

In some implementations, the user interface device 120, such as via an application, such as the GoPro App, may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application, such as the GoPro App, may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting, such as 3840 pixels by 2160 pixels, a frame rate setting, such as sixty frames per second (fps), a location setting, and/or a context setting, which may indicate an activity, such as mountain biking, in response to user input, and may communicate the settings, or related information, to the image capture apparatus 110.

Figure 2:
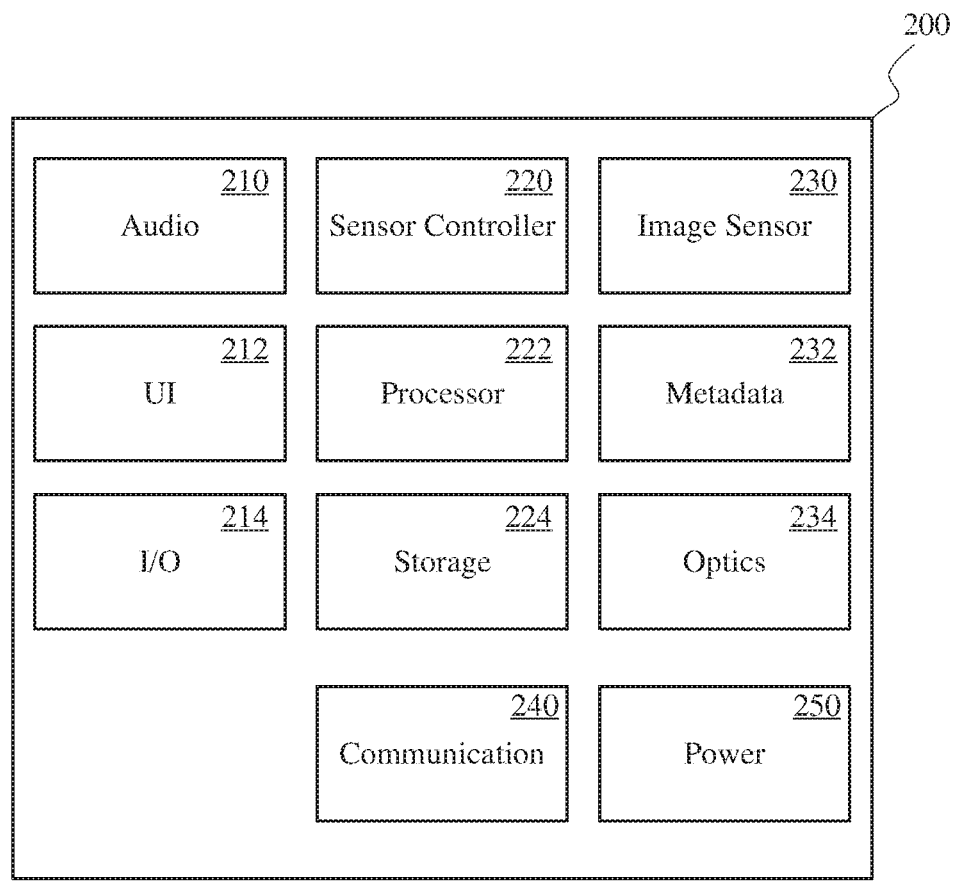
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, for example, Advanced Audio Coding (AAC), Audio Compression-3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content, such as metadata, images, audio, or a combination thereof, captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular LTE, communications interface for communication between the image capture device 200 and a remote device, such as the user interface device 120 in FIG. 1. The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200, such as shown and described with respect to FIG. 1. Multiple mechanical, sensory, or electrical units may be controlled by a learning apparatus via network/radio connectivity.

Figure 3:
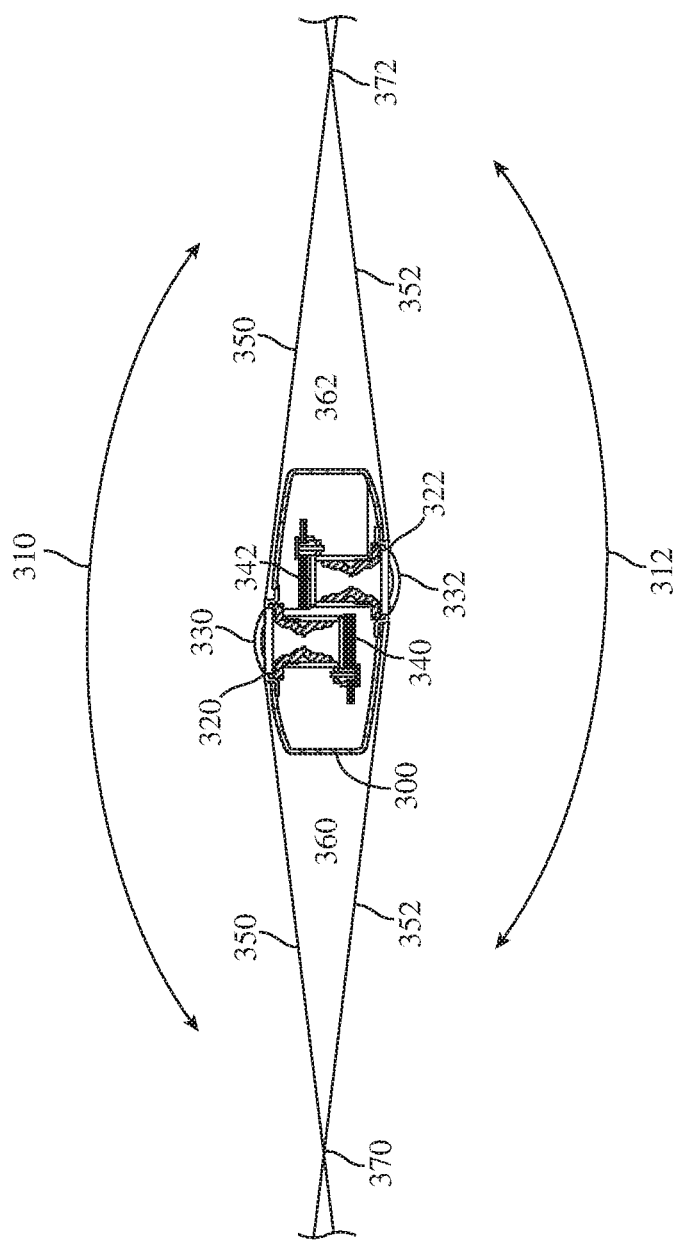
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
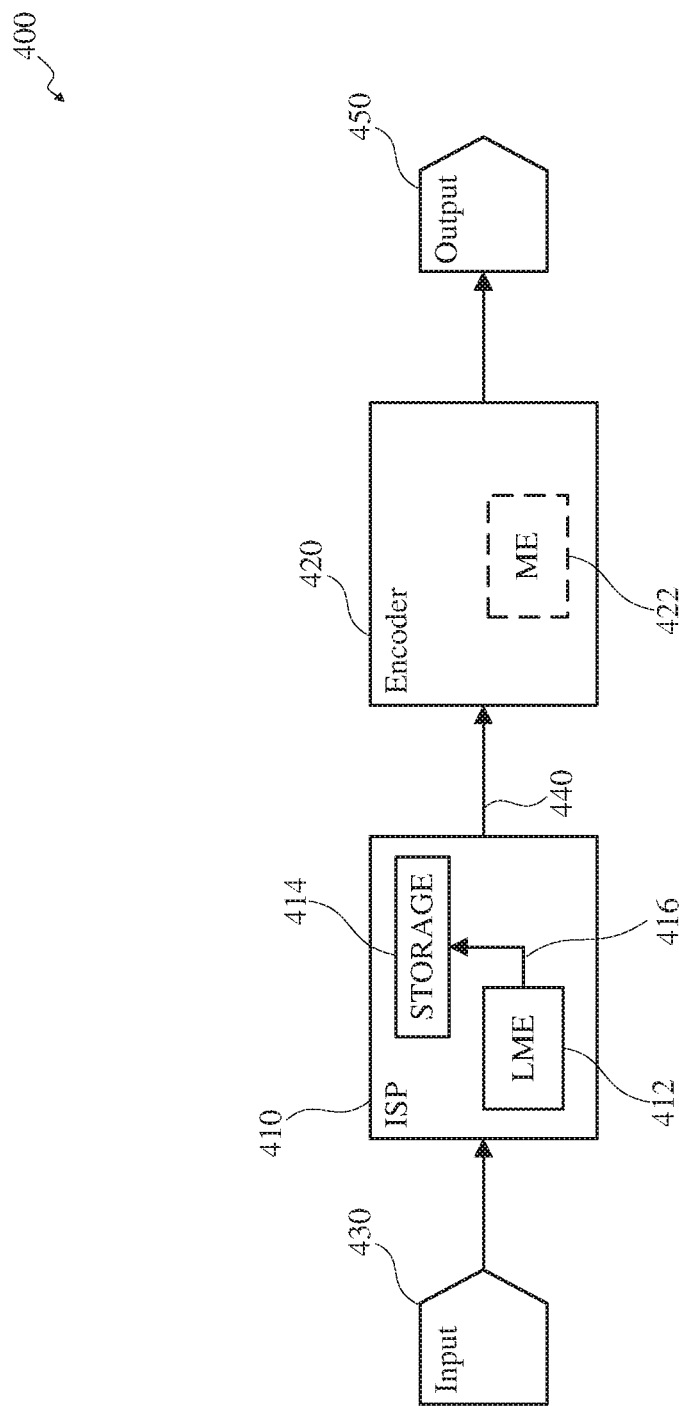
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as having 4×4, 16×16, 64×64, and/or other dimensions. In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors, such as an 'x' component and a 'y' component of motion, at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include an internal electronic storage unit 414, such as shared memory, such as random-access memory (RAM), flash, or other types of memory. The internal electronic storage unit 414 may store local motion estimation information 416 determined by the local motion estimation unit 412 for one or more frames. The local motion estimation information 416 and associated image or images may be output 440 to the encoder 420. In some implementations, the internal electronic storage unit 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the internal electronic storage unit 414, and the encoder 420 may read the motion information from the internal electronic storage unit 414 or otherwise receive the motion information from the image signal processor 410. The encoder 420 may use the motion estimation information determined by the image signal processor 410 for motion compensation processing.

Figure 5:
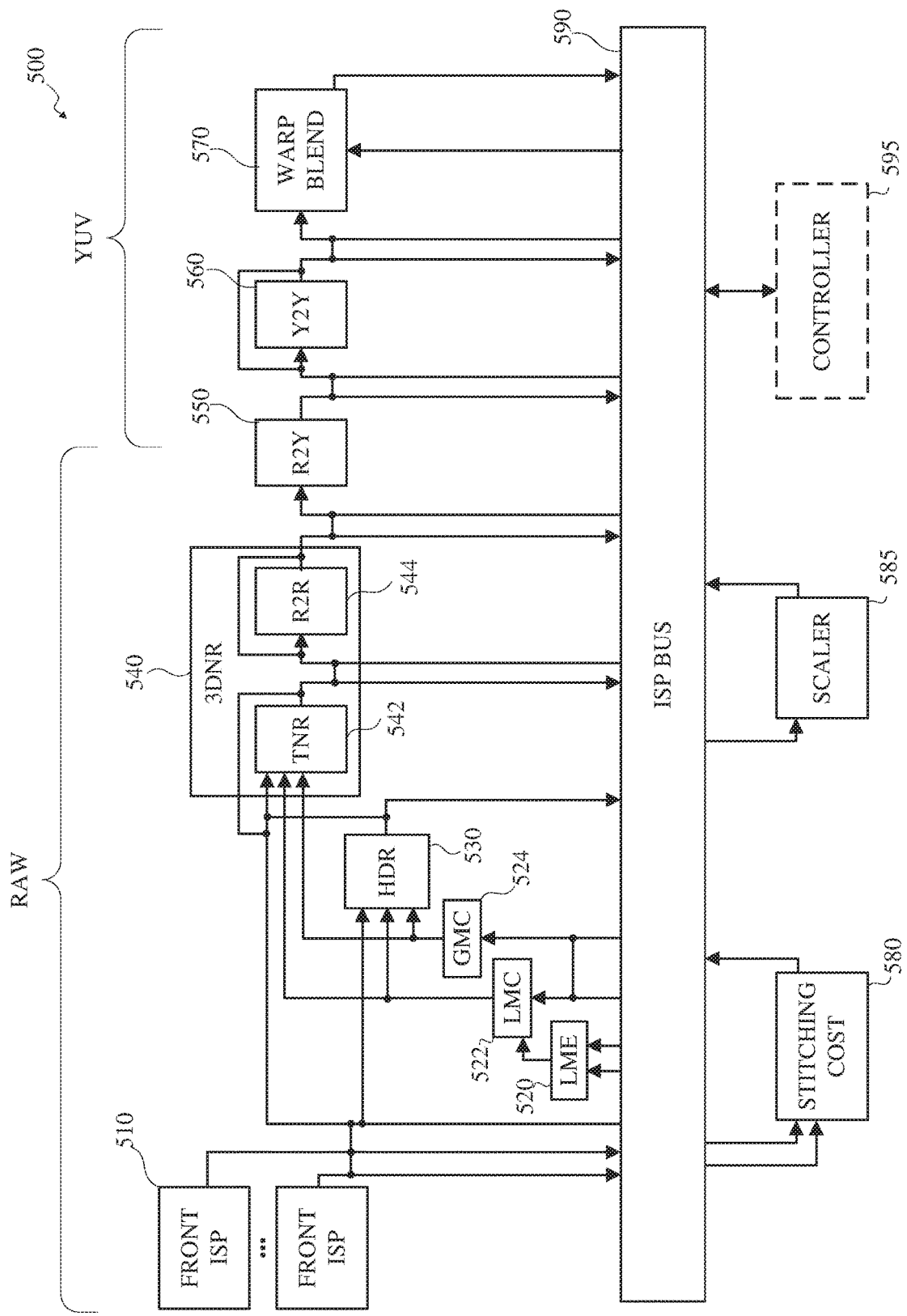
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with a respective image capture device.

The local motion estimation unit 520 may receive, or otherwise access, an input frame, or one or more portions thereof, which may be a current input frame, such as via the image signal processor bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processor bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align, or partially align, the reference frame, or one or more portions thereof, with the current input frame, or one or more portions thereof.

The local motion compensation unit 522 may output a local motion compensated reference frame, or one or more portions thereof.

The global motion compensation unit 524 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus. In some embodiments, other changes affecting the frame, such as zooming, may be included as global motion.

The global motion compensation unit 524 may apply the global motion information to the reference frame, or one or more portions thereof, which may align, or partially align, the reference frame, or one or more portions thereof, with the current input frame, or one or more portions thereof.

The global motion compensation unit 524 may output a global motion compensated reference frame, or one or more portions thereof.

The high dynamic range unit 530 may receive, or otherwise access, the current input frame, or one or more portions thereof, such as from the front image signal processor 510. The current input frame may be a long exposure input frame corresponding to the short exposure reference frame. The high dynamic range unit 530 may receive, or otherwise access, the local motion compensated reference frame from the local motion compensation unit 522. The high dynamic range unit 530 may receive, or otherwise access, the global motion compensated reference frame from the global motion compensation unit 524.

The high dynamic range unit 530 may generate a high dynamic range image based on the current input image and the local motion compensated reference frame, the global motion compensated reference frame, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The temporal noise reduction unit 542 may generate output including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing respective pixels in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of a respective frame to a rectangle. For example, the warp and blend unit 570 may warp a corona around the equator of a respective frame to a rectangle based on the corresponding low-resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear, such as fisheye, images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity (x) and longitude (y) based on a warping. Respective values of the cost map may be a cost function of a disparity (x) value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
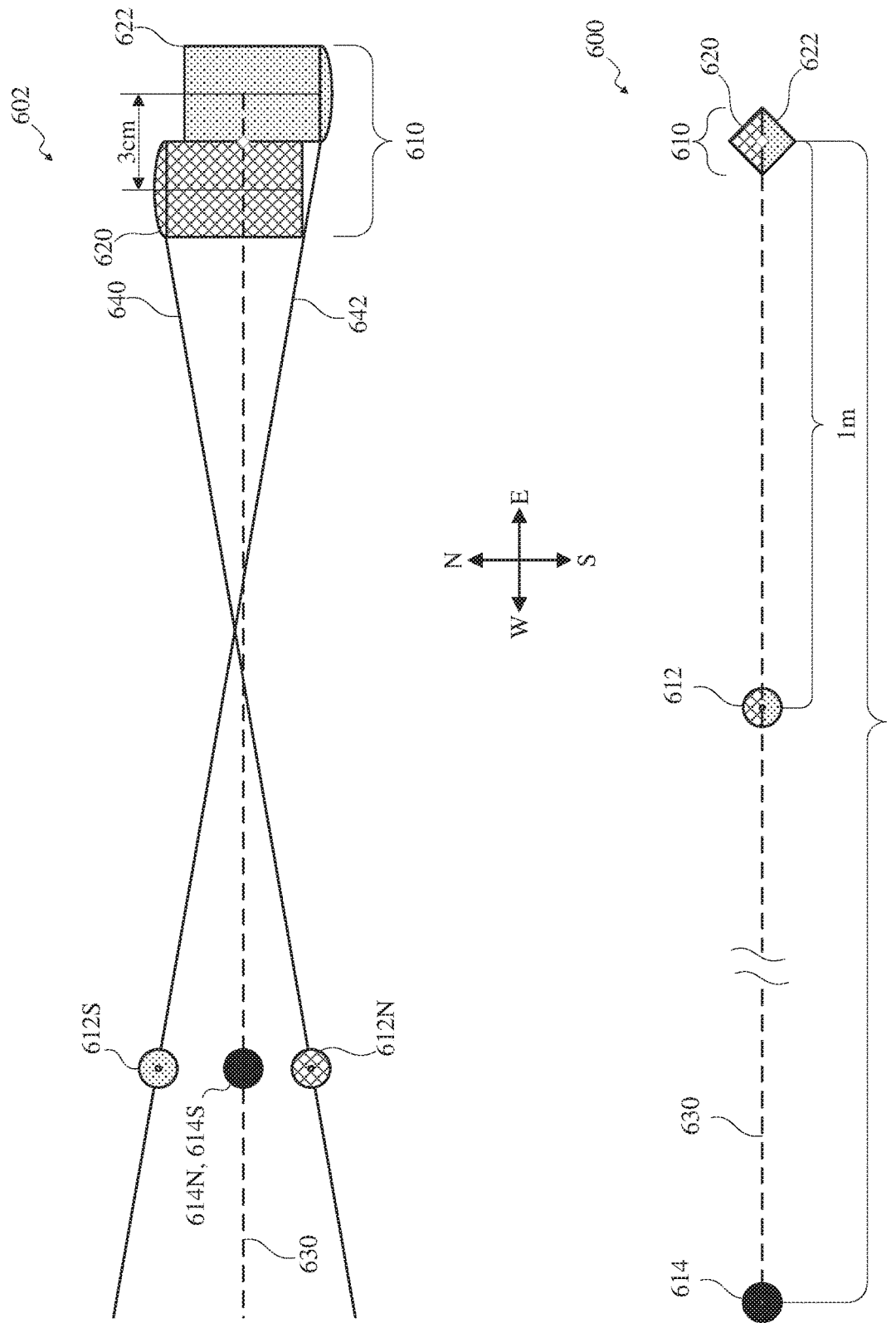
FIG. 6 is a diagram of an example of spatial and field-of-view representations of overlapping field-of-view for adaptive camera model calibration in accordance with implementations of this disclosure.

FIG. 6 is a diagram of an example of spatial and field-of-view representations of overlapping field-of-view for adaptive camera model calibration in accordance with implementations of this disclosure. FIG. 6 is shown as oriented with north at the top and east at the right and is described with reference to longitude and latitude for simplicity and clarity; however, any orientation may be used, direction, longitude, and latitude are described with reference to the image capture apparatus or the respective image capture devices and may differ from geographic analogs.

FIG. 6 includes a lower portion showing a spatial representation 600 of an image capture apparatus 610 including a near object 612 and a far object 614 and an upper portion showing a corresponding field-of-view representation 602 for the image capture apparatus 610 including near object content 612N as captured by the north facing image capture device 620, near object content 612S as captured by the south facing image capture device 622, far object content 614N as captured by the north facing image capture device 620, and far object content 614S as captured by the south facing image capture device 622.

In the spatial representation 600, the image capture apparatus 610, which may be a multi-face image capture apparatus, such as the image capture apparatus 110 shown in FIG. 1 or the image capture apparatus 300 shown in FIG. 3, is represented by a diamond. In some implementations, the multi-face image capture apparatus 610 may include two or more image capture devices 620, 622, such as the image capture device 200 shown in FIG. 2, which may have overlapping field-of-view. A north facing image capture device 620 is indicated as a triangle with a cross hatched background, and a south facing image capture device 622 is indicated as a triangle with a stippled background. An equator 630, which may be a midpoint between the two image capture devices 620, 622, is indicated by a broken line.

In the spatial representation 600, the near object 612, which may be captured, in whole or in part, in one or more images captured by the image capture devices 620, 622, is shown as a circle, along the equator 630, having a north half with a cross-hatched background and a south half having a stippled background. The near object 612 may be a relatively short distance from the image capture apparatus 610, such as one meter (1*m*) as shown. The far object 614, which may be captured, in whole or in part, in one or more images captured by the image capture devices 620, 622, is shown as a black circle along the equator 630. The far object 614 may be a relatively long distance from the image capture apparatus 610, such as a distance much greater than 1 meter (>>1 m) as shown. For example, the far object 614 may be near the horizon.

In the field-of-view representation 602, the north facing image capture device 620 is shown on the left of the image capture apparatus 610, facing north, with a cross hatched background, and the corresponding north field-of-view is partially represented as including content above, such as north of, a north field-of-view boundary 640. The south facing image capture device 622 of the image capture apparatus 610 is shown on the right, facing south, with a stippled background, and the corresponding south field-of-view is partially represented as including content below, such as south of, a south field-of-view boundary 642.

In some implementations, the respective fields-of-view for the image capture devices 620, 622 may include a defined N° longitudinal dimension, such as 360° of longitude, and may include a defined N° lateral dimension, which may be greater than 180° of latitude. For example, the north facing image capture device 620 may have a field-of-view that extends 10° latitude below the equator 630 as represented by the north field-of-view boundary 640, and the south facing image capture device 622 may have a field-of-view that extends 10° latitude above the equator 630, as represented by the south field-of-view boundary 642. The overlapping region may include 360° of longitude and may include 20° of latitude, which may include a range of 10° north latitude to 10° south latitude.

In some implementations, the image capture devices 620, 622 may be physically offset along one or more spatial axis. For example, as shown in the field-of-view representation 602, the north facing image capture device 620 is offset vertically, such as north-south, and horizontally. In the example shown in FIG. 6, the horizontal, or longitudinal, offset between the image capture devices 620, 622, or between the respective optical centers of the image capture devices 620, 622, is 3 cm; however, other offsets may be used.

As shown in the spatial representation 600, the near object 612 is positioned along the equator 630 and is positioned relatively proximal to the image capture apparatus 610, such as one meter (1*m*). The far object 614 is positioned along the equator and is positioned relatively distal (>>1 m) from the image capture apparatus 610. For simplicity and clarity, the distance of the far object 614 may be, as an example, three kilometers from the spatial center of the image capture apparatus 610 as indicated by the small white diamond in the image capture apparatus 610.

As shown in the field-of-view representation 602, the optical center of the north facing image capture device 620 may be offset from the spatial center of the image capture apparatus 610 horizontally by a defined amount, such as by 1.5 cm west laterally, and vertically by a defined amount, such as by 1.5 cm north longitudinally, and the optical center of the south facing image capture device 622 may be offset from the spatial center of the image capture apparatus 610 horizontally by a defined amount, such as by 1.5 cm east laterally, and vertically by a defined amount, such as by 1.5 cm south longitudinally.

In the field-of-view representation 602, the near object content 612N as captured by the north facing image capture device 620, corresponding to the near object 612 shown in the spatial representation 600, the near object content 612S as captured by the south facing image capture device 622, corresponding to the near object 612 shown in the spatial representation 600, the far object content 614N as captured by the north facing image capture device 620, corresponding to the far object 614 shown in the spatial representation 600, and the far object content 614S as captured by the south facing image capture device 622, corresponding to the far object 614 shown in the spatial representation 600, are shown vertically aligned at an intermediate distance from the image capture apparatus 610 to indicate that distance information for the near object 612 and the far object 614 may be unavailable independent of analyzing the images.

In the field-of-view representation 602, the far object content 614N as captured by the north facing image capture device 620 and the far object content 614S as captured by the south facing image capture device 622 are shown along the equator 630 indicating that the position of the far object content 614N as captured by the north facing image capture device 620 may be indistinguishable from the position of the far object content 614S as captured by the south facing image capture device 622. For example, the far object 614, as shown in the spatial representation 600, may be approximately 2,999.9850000375 meters at an angle of approximately 0.00028648° from the optical center of the north facing image capture device 620 and may be approximately 3,000.0150000375 meters at an angle of approximately 0.00028647° from the optical center of the south facing image capture device 622. The angular difference of approximately one hundred-millionth of a degree between the location of the far object 614 relative to the optical center of the north facing image capture device 620 and the location of the far object 614 relative to the optical center of the south facing image capture device 622 may correspond to a difference of zero pixels in the corresponding images.

The position of the near object 612 may differ in the respective images captured by the image capture devices 620, 622. In the field-of-view representation 602, the near object content 612N as captured by the north facing image capture device 620 is shown with a cross-hatched background below the equator 630 indicating that the position of the near object content 612N as captured by the north facing image capture device 620 may be slightly below the equator 630, such as 1° south latitude, and the near object content 612S as captured by the south facing image capture device 622 is shown with a stippled background above the equator 630 indicating that the position of the near object content 612S as captured by the south facing image capture device 622 may be slightly above the equator 630, such as 1° north latitude. For example, the near object 612, as shown in the spatial representation 600, may be approximately 1.01511083 meters at an angle of approximately 0.846674024° from the optical center of the north facing image capture device 620, and may be approximately 0.985114207 meters at an angle of approximately 0.872457123° from the optical center of the south facing image capture device 622. The angular difference of approximately 1.72° between the location of the near object 612 relative to the optical center of the north facing image capture device 620 and the location of the near object 612 relative to the optical center of the south facing image capture device 622 may correspond to a difference of one or more pixels in the corresponding images.

In some implementations, images captured by the image capture devices 620, 622 may be combined to generate a combined image wherein overlapping regions and transitions between overlapping regions, such as portions corresponding to field-of-view boundaries 640, 642, are visually cohesive. In some implementations, combining images may include aligning overlapping regions of the images to adjust for differences between the relative locations of the respective image capture devices 620, 622 and the content captured by the images. In some implementations, aligning overlapping regions of images may be based on the physical alignment of the respective image capture devices 620, 622 of the image capture apparatus 610, the distance between the respective image capture devices 620, 622 of the image capture apparatus 610 and the content captured by the images, or both. An example of image alignment is shown in FIG. 7.

Figure 7:
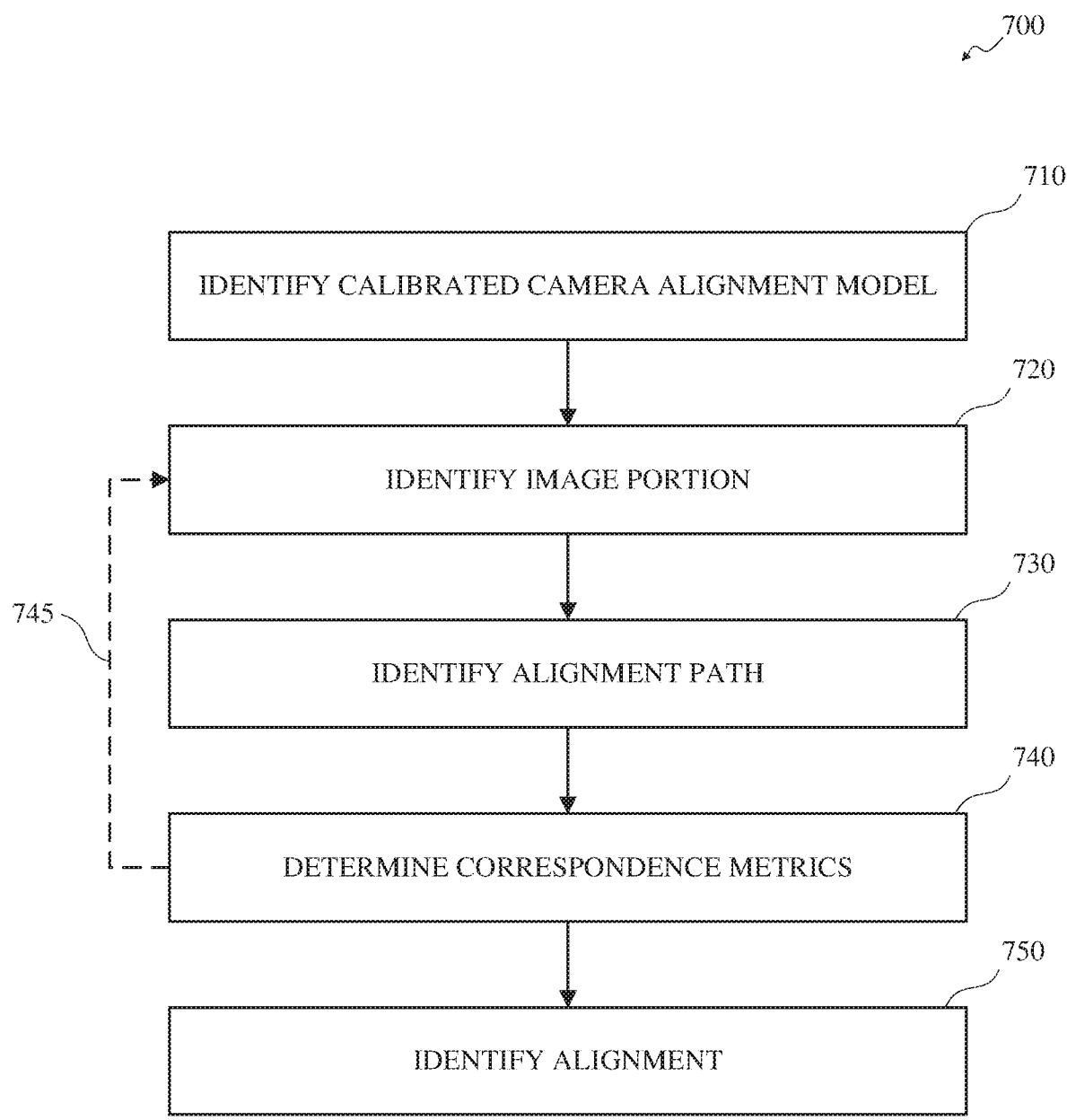
FIG. 7 is a flowchart of an example of aligning overlapping image regions in accordance with implementations of this disclosure.

FIG. 7 is a flowchart of an example of aligning overlapping image regions 700 in accordance with implementations of this disclosure. In some implementations, aligning overlapping image regions 700 may be implemented in an image capture apparatus, such as the image capture apparatus 110 shown in FIG. 1, the image capture apparatus 300 shown in FIG. 3, or the image capture apparatus 610 shown in FIG. 6. For example, a stitching cost unit, such as the stitching cost unit 580 of the image signal processor 500 shown in FIG. 5, may implement aligning overlapping image regions 700. In some implementations, aligning overlapping image regions 700 may include identifying a calibrated camera alignment model at 710, identifying image portions corresponding to defined relative space at 720, identifying an alignment path at 730, determining correspondence metrics at 740, identifying an alignment at 750, or a combination thereof.

Although not shown separately in FIG. 7, an image signal processor, such as the image signal processor 410 shown in FIG. 4 or the image signal processor 500 shown in FIG. 5, which may be included in an image capture apparatus, may receive one or more input image signals, such as the input image signal 430 shown in FIG. 4, from one or more image sensors, such as the image sensor 230 shown in FIG. 2 or the image sensors 340, 342 shown in FIG. 3, or from one or more front image signal processors, such as the front image signal processors 510 shown in FIG. 5, and may identify one or more input images, or frames, from the one or more input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and respective input images or frames may be associated with respective temporal information.

In some implementations, a calibrated camera alignment model may be identified at 710. In some implementations, an image capture apparatus may include a memory, such as the electronic storage unit 224 shown in FIG. 2, and a calibrated camera alignment model may be read from the memory, or otherwise received by the image capture apparatus. For example, the calibrated camera alignment model may be a previously generated calibrated camera alignment model, such as a calibrated camera alignment model calibrated based on one or more previously captured images or frames.

A camera alignment model for image capture devices having overlapping fields-of-view may indicate an expected correspondence between the relative spatial orientation of the fields-of-view and portions, such as pixels, in overlapping regions of corresponding images captured by the image capture devices. The relative spatial orientation of the fields-of-view may correspond with a physical alignment of the respective image capture devices and may be expressed in terms of relative longitude and latitude.

In some implementations, a camera alignment model may include one or more parameters for use in aligning the overlapping images. For example, a camera alignment model may indicate one or more portions, such as pixels, of an overlapping region of an image, one or more of which is expected to correspond with a defined relative longitude. For example, the one or more portions may be expressed as a path of pixels, respective pixels corresponding to a respective relative latitude, on or near a defined longitude, which may be referred to herein as an alignment path, or epipolar. In some implementations, the calibrated camera alignment model may vary based on image resolution.

In some implementations, the correspondence between the expected relative alignment of the overlapping fields-of-view captured by respective images of an image capture apparatus and the respective images may be described by a camera alignment model and may be referred to herein as the defined relative space. For example, a camera alignment model may indicate a portion, such as a pixel, of a first image that is expected to correspond with a defined location in the defined relative space, such as at the relative prime meridian (0° relative longitude) and the relative equator (0° relative latitude), and may indicate a corresponding portion, such as a corresponding pixel, of the second image that is expected to align with the pixel in the first image at the defined location, conditioned on the distance of the content captured at the respective portions of the images being greater than a threshold, wherein the threshold indicates a maximum distance from the image capture apparatus for which angular distances translate to pixel differences.

In some implementations, an expected camera alignment model may indicate an expected alignment of image capture devices, which may differ from the physical alignment of the image capture devices concurrent with capturing images. A calibrated camera alignment model may be a camera alignment model, such as an expected camera alignment model, calibrated based on captured images to correspond with the contemporaneous physical alignment of the image capture devices.

In some implementations, one or more image portions corresponding to defined relative space may be identified at 720. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 730. The alignment path, or epipolar, may indicate a path, which may be vertical, or approximately vertical, from the point identified at 720 to a point along the edge of the image. In some implementations, the alignment path, or epipolar, may be a path along the longitude of the point identified at 720. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame. In some implementations, an alignment path may begin at a first end, such as at a location, which may be a portion, such as a pixel, of the image, along, or proximate to, a defined relative longitude, such as the relative prime meridian, and a defined relative latitude, such as the relative equator, of an image, end at a second end, such as at a location, which may be a portion, such as a pixel, of the image, along, or proximate to, the defined relative longitude and the edge of an image which may be distal from the relative equator with respect to the optical center of the image capture device.

In some implementations, one or more correspondence metrics may be determined at 740. In some implementations, a group, or block, such as a 13×13 block of pixels, centered on the first pixel identified at 720 may be identified from the first image, and a group, or block, such as a 13×13 block of pixels, centered on the second pixel identified at 720 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks.

In some implementations, determining the correspondence metrics may include determining a match quality metric for a respective point along the alignment paths, which may be performed iteratively or in parallel. For example, a match quality metric may be determined for the two blocks corresponding to the current relative longitude and the relative equator (0° relative latitude), and a second match quality metric may be determined for two blocks corresponding to a respective point, or pixel, in a respective frame along the current alignment path and defined distance, such as 0.1° latitude, toward the edge of the respective frame, which may be 0.1° north in the south frame and 0.1° south in the north frame. Respective match quality metrics, such as approximately 150 match quality metrics, may be determined for blocks at a respective point, or pixel, along the respective alignment paths, at defined latitude distance intervals. In some implementations, a two-dimensional (2D) cost map may be generated. A first dimension of the two-dimensional cost map may indicate a longitude for a respective match quality metric. A second dimension of the two-dimensional cost map may indicate a number, or cardinality, of pixels, which may be a spatial difference, between the corresponding pixel and the point, or pixel, at the origin of the alignment path, which may be referred to herein as a disparity. A value of the two-dimensional cost map for an intersection of the first and second dimensions of the two-dimensional cost map may be the corresponding match quality metric. Although the blocks in the two frames are described as being at corresponding, or symmetrical, latitude positions along the respective alignment paths, in some implementations, other correspondence metrics may be determined. For example, a correspondence metric may be determined based on differences between points along the alignment path in one frame and one or more points at different latitudes along the alignment path in the other frame.

In some implementations, identifying image portions corresponding to defined relative space at 720, identifying an alignment path at 730, determining correspondence metrics at 740, or a combination thereof may be performed for two or more longitudes as indicated by the broken line at 745. For example, identifying image portions corresponding to defined relative space at 720, identifying an alignment path at 730, and determining correspondence metrics at 740 may be performed for a respective defined longitudinal distance, such as each 0.5° of longitude, or a defined pixel distance corresponding to a defined longitudinal distance as a function of a resolution of the captured images.

Figure 8:
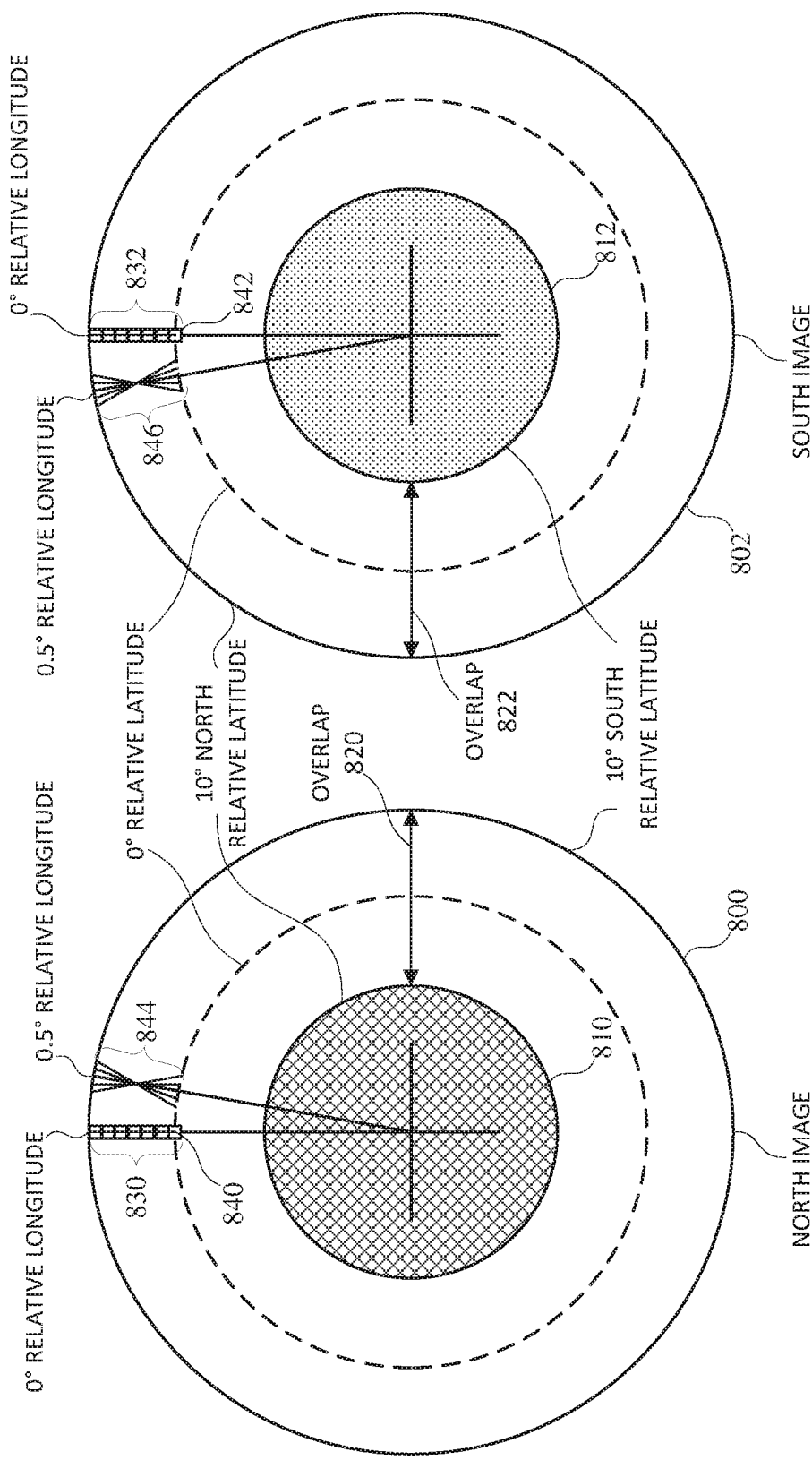
FIG. 8 is a diagram of elements of aligning overlapping image regions in accordance with this disclosure.

In some implementations, an alignment for the current images may be identified at 750. In some implementations, identifying the alignment for the current images at 750 may include simultaneously optimizing the correspondence metrics and a smoothness criterion. For example, identifying the alignment for the current images at 750 may include identifying one or more disparity profiles from the correspondence metrics, such as from the cost map generated at 740. A disparity profile from the correspondence metrics may include a discrete per longitude sequence of match quality metrics. For example, a disparity profile may include, for a respective longitude, such as each 0.5° of longitude, a disparity and a corresponding match quality metric. Optimizing the correspondence metrics may include identifying the minimal match quality metric for respective longitudes. Optimizing the smoothness criterion may include minimizing a sum of absolute differences in the disparity between adjacent longitudes. Simultaneously optimizing may include identifying a disparity profile representing a latitude per longitude evaluated, having a minimal cost, which may be a sum of match quality metrics, subject to the smoothness criterion. For example, a difference between the disparity corresponding to a minimal match quality metric for a longitude and the disparity corresponding to a minimal match quality metric for an adjacent longitude may exceed a defined threshold, which may indicate that the low match quality metric represents a false positive, and the second smallest match quality metric for one or both of the longitudes may be used. An example of elements of aligning overlapping image regions is shown in FIG. 8.

In some implementations, identifying the disparity profile may include generating disparity profiles at multiple scales, which may include generating match cost metrics at each of a defined set of scales. In some implementations, the disparity profile may be identified based on a low-resolution frame, such as low-resolution frame generated by the front image signal processor 510 shown in FIG. 5.

In some implementations, simultaneously optimizing the correspondence metrics and a smoothness criterion may include determining a weighted sum of the correspondence metrics and the smoothness criterions for respective disparity profiles and identifying the minimal weighted sum as the simultaneously optimized disparity profile. For example, simultaneously optimizing may include, for a disparity profile (p), determining a sum of the match quality metrics along the disparity profile as a first cost (c1), determining a sum of the absolute difference between successive disparity values as a cost (c2), and determining a simultaneously optimized disparity profile ($p_{so}$) using a first weight (w1) representing the relative importance of the first cost and a second weight (w2) representing a relative importance of the second cost, which may be expressed as $p_{so}$=w1*c1+w2*c2. Although weighted averaging is described herein, other combining functions may be used.

For example, 724 longitudes may be evaluated in respective frames, which may include determining correspondence metrics for 724 alignment paths, which may be approximately one alignment path per 0.5° longitude for 360°, determining correspondence metrics for a respective alignment path may include determining 150 match quality metrics, which may correspond to 150 latitudes evaluated per longitude evaluated, which may be approximately one match quality metric per 0.1° latitude for 10°, determining the correspondence metrics may include determining 108600 (724*150) match quality metrics, and simultaneously optimizing may include identifying a disparity profile including 724 of the 108600 match quality metrics.

In an example, content captured by the overlapping regions of the image capture devices along the equator far, such as three kilometers, from the image capture apparatus, may correspond with match quality metrics corresponding to a relatively small disparity, such as zero, which may correspond to a position at or near the equator, and content captured by the overlapping regions of the image capture devices along the equator near, such as one meter, to the image capture apparatus, may correspond with match quality metrics corresponding to a relatively large disparity, such as a disparity corresponding to a position at or near the edge of the images, such as at 10° latitude.

FIG. 8 is a diagram of elements of aligning overlapping image regions in accordance with this disclosure. FIG. 8 shows a north circular frame 800 and a south circular frame 802. The north circular frame 800 includes a non-overlapping region 810 indicated with a cross-hatched background, and an overlapping region 820. The south circular frame 802 includes a non-overlapping region 812 indicated with a stippled background, and an overlapping region 822. In some implementations, the longitudes in a frame, such as the north frame 800 as shown, may be oriented clockwise, and the longitudes in a corresponding frame, such as the south frame 802 as shown, may be oriented counterclockwise.

The overlapping regions 820, 822 of the north circular frame 800 and the south circular frame 802 may be aligned as shown in FIG. 7. For example, in the north circular frame 800, blocks 830, such as a 13×13 block of pixels, may be identified along an alignment path 840 beginning at 0° relative longitude and 0° relative latitude and ending along the edge of the frame 800, which may be at a distal relative latitude, such as 10° south latitude, as shown. In the south circular frame 802, corresponding blocks 832 may be identified along a corresponding alignment path 842 beginning at 0° relative longitude and 0° relative latitude and ending along the edge of the frame 802, which may be at 10° north latitude, as shown. Correspondence metrics may be determined based on differences between the identified blocks 830 from the north circular frame 800 and the spatially corresponding blocks 832 from the south circular frame 802.

In the north circular frame 800, candidate alignment paths 844 are shown for the 0.5° relative longitude, a respective path beginning at 0° relative latitude and ending along the edge of the north circular frame 800, to indicate that correspondence metrics may be determined at respective defined distances longitudinally and to indicate that for each respective longitude, multiple candidate alignment paths 844 may be evaluated. For example, a first candidate alignment path from the candidate alignment paths 844 may be orthogonal to the equator, which may be aligned along the respective longitude, and respective other candidate alignment path from the candidate alignment paths 844 may be angularly offset relative to the longitude as shown. FIG. 8 is not to scale. Although the blocks are shown as adjacent, the blocks may overlap horizontally, vertically, or both. Although seven blocks and two alignments paths are shown for simplicity, any number of blocks and alignment paths may be used. For example, 724 alignment paths, which may correspond with approximately 0.5° longitudinal intervals, may be used, and 150 blocks per alignment path, which may correspond with approximately 0.1° latitude intervals, may be used. Corresponding candidate alignment paths 846 are shown in the south circular frame 802. In some implementations, a number, or cardinality, of points, such as pixels, indicated by each respective candidate alignment path 844 may be a defined cardinality, such as 150 points, and each respective point from a candidate alignment path 844 may be offset, or shifted, from a corresponding point in another candidate alignment path 844 parallel to the equator. In some implementations, a candidate alignment path 844, or a portion thereof, for a longitude may overlap a candidate alignment path, or a portion thereof, for an adjacent longitude.

In some implementations, a camera alignment model may be based on the physical orientation of elements of the image capture device, such as the physical alignment of lenses, image sensors, or both. Changes in the physical orientation of elements of one or more of the image capture devices having overlapping fields-of-view may cause misalignment such that aligning overlapping image regions, such as the aligning overlapping image regions 700 shown in FIG. 7, based on a misaligned camera alignment model may inaccurately or inefficiently align image elements, such as pixels. For example, misalignment of image capture devices may occur during fabrication such that the alignment of image capture devices having overlapping field-of-view may differ from an expected alignment. In another example, the physical orientation of elements of an image capture device may change, such as in response to physical force, temperature variation, material aging or deformation, atmospheric pressure, or any other physical or chemical process, or combination of processes, that may change image capture device alignment. In some implementations, camera alignment model calibration may include updating, adjusting, or modifying a camera alignment model based on identified changes in the physical orientation of elements of one or more of the respective image capture devices. An example of camera alignment model calibration is shown in FIG. 9.

Figure 9:
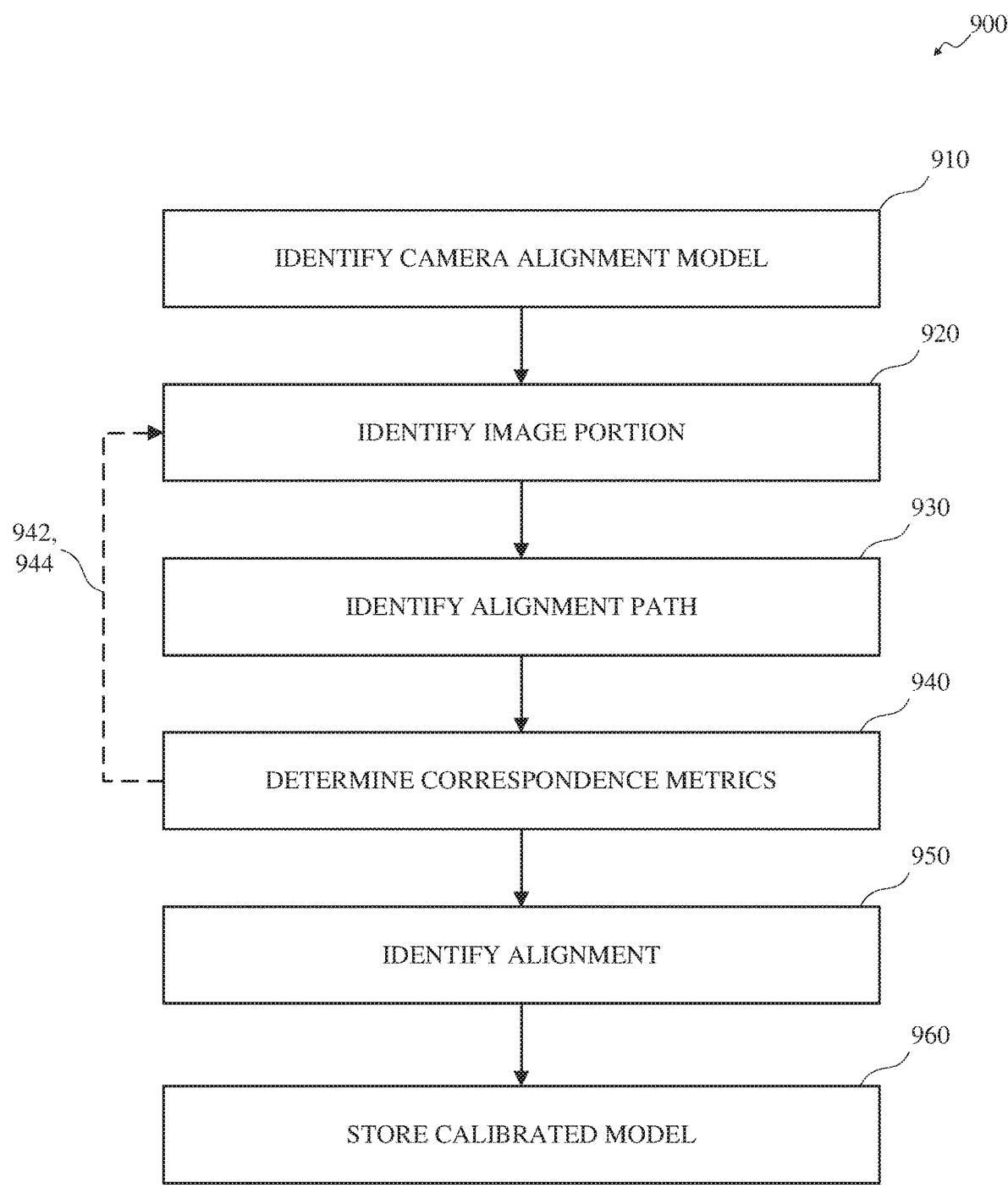
FIG. 9 is a flowchart of an example of a method of camera alignment model calibration in accordance with implementations of this disclosure.

FIG. 9 is a flowchart of an example of a method of camera alignment model calibration 900 in accordance with implementations of this disclosure. In some implementations, camera alignment model calibration 900 may include adaptively detecting image capture device misalignment and generating or modifying a camera alignment model to maintain or restore the alignment of defined elements in overlapping images, such that overlapping image regions may be combined to form a visually cohesive combined image.

In some implementations, camera alignment model calibration 900 may be performed periodically, in response to an event, or both. For example, camera alignment model calibration 900 may be performed periodically, at a camera alignment calibration rate, such as once per unit time, such as once per second, which may be less than half the frame rate of the input video. In some implementations, the camera alignment calibration rate may be one one-hundredth of the frame rate. In another example, camera alignment model calibration 900 may be performed in response to an event, such as capturing a defined number of frames, such as thirty frames or sixty frames, which may correspond to a frame-rate for captured video, in response to an expiration of a timer, in response to starting, such a powering on, or resetting, an image capture apparatus, in response to input, such as user input, indicating camera alignment model calibration, in response to detecting kinetic force exceeding a defined threshold, in response to detecting a misalignment of overlapping image regions, or any other event, or combination of events, capable of triggering camera alignment model calibration 900.

In some implementations, camera alignment model calibration 900 may be implemented in an image capture apparatus, such as the image capture apparatus 110 shown in FIG. 1, the image capture apparatus 300 shown in FIG. 3, or the image capture apparatus 610 shown in FIG. 6. In some implementations, camera alignment model calibration 900 may be similar to aligning overlapping image regions 700 as shown in FIG. 7, except as described herein. For example, a calibration controller, such as the configuration controller 595 shown in FIG. 5, may implement camera alignment model calibration 900. In another example, aligning overlapping image regions as shown at 700 in FIG. 7 may include identifying one alignment path per longitude evaluated, which may be referred to herein as including a one-dimensional (1D) search, and camera alignment model calibration 900 as shown in FIG. 9 may include identifying a set of candidate alignment paths per longitude evaluated, which may be referred to herein as including a two-dimensional search.

In some implementations, camera alignment model calibration 900 may include identifying a camera alignment model at 910, identifying image portions corresponding to defined relative space at 920, identifying an alignment path at 930, determining correspondence metrics at 940, identifying an alignment at 950, storing a recalibrated camera alignment model at 960, or a combination thereof. In some implementations, camera alignment model calibration 900 may be performed in independently of, or in conjunction with, generating a combined image, such as generating a combined image based on two or more images captured by image capture devices having overlapping fields-of-view. For example, a combined image may be generated based on two or more images captured by image capture devices having overlapping fields-of-view, and, independently, camera alignment model calibration 900 may be performed based on the two or more images.

In some implementations, a camera alignment model, such as a calibrated camera alignment model may be identified at 910. In some implementations, identifying the camera alignment model at 910 may be similar to identifying a calibrated camera alignment model at 710 as shown in FIG. 7. For example, a multi-face capture apparatus, such as the image capture apparatus 110 shown in FIG. 1, the image capture apparatus 300 shown in FIG. 3, or the image capture apparatus 610 shown in FIG. 6, may include a memory, such as the electronic storage unit 224 shown in FIG. 2, and a camera alignment model may be read from the memory, or otherwise received by the image capture apparatus. In some implementations, a calibrated camera alignment model may be a previously calibrated camera alignment model identified based on a previous camera alignment model calibration 900. In some implementations, the image capture apparatus, or a component thereof, such as an image signal processor, may receive calibration parameters, such as from another component to the image capture apparatus. In some implementations, one or more calibration parameters, such as white balance, focus, exposure, flicker adjustment, or the like, may be automatically adjusted in accordance with this disclosure.

Although not shown separately in FIG. 9, in some implementations, the calibrated camera alignment model may be a camera alignment model generated in conjunction with fabrication of the image capture apparatus. For example, the image capture apparatus may be fabricated such that the respective axes of individual image capture devices, such as the image capture device 200 shown in FIG. 2, are physically aligned within a defined fabrication alignment tolerance of an expected fabrication alignment, and an expected fabrication alignment model may indicate an expected mechanical alignment, which may include an expected angular, or rotational, alignment; an expected longitudinal, x-axis, or horizontal, displacement; an expected lateral, y-axis, or vertical, displacement; an expected elevation, z-axis, or depth, displacement; or a combination thereof, between respective image sensors having overlapping fields-of-view. In some implementations, the expected angular alignment may include an expected alignment along a longitudinal, horizontal, or x-axis; a lateral, vertical, or y-axis; an elevation, depth, or z-axis; or a combination thereof. For example, in a multi-face image capture apparatus, such as the image capture apparatus 110 shown in FIG. 1, two image capture devices may have overlapping fields-of-view, the expected angular alignment may indicate that the x-axis and the z-axis of a first image capture device are 90° from the corresponding y-axis and the corresponding z-axis of a second image capture device, and the y-axis of the first image capture device may be parallel to the x-axis of the second image capture device. In some implementations, a fabrication misalignment may be identified, which may indicate a determined difference in camera alignment between the physical alignment of image capture devices as fabricated and the expected alignment, such as a difference within the defined fabrication alignment tolerance. In some implementations, identifying the fabrication misalignment may include capturing overlapping images of reference content; identifying a spatial location in the overlapping regions of the respective images that captured the reference content, which may be related to a distance between the content captured and the respective image capture devices; and determining a difference between an expected spatial location of the reference content in respective captured images and the identified spatial location of the reference content.

Although not shown separately in FIG. 9, in some implementations, camera alignment model calibration 900 may include storing frames captured by a multi-camera array, such as a six-camera cubic array, in a multi-dimensional array, such as a two-dimensional 2×3 array. Storing the frames may be performed prior to camera alignment model calibration 900, prior to generating a combined frame, or both. In some implementations, the six-camera cubic array may include a top image capture device, a right image capture device, a bottom image capture device, a front image capture device, a left image capture device, and a rear image capture device. The 2×3 array may include top storage portions (0,0; 0,1; 0,2) and bottom storage portions (1,0; 1,1; 1,2). Frames captured by the top image capture device, the right image capture device, and the bottom image capture device may be stored in the top storage portions (0,0; 0,1; 0,2), and frames captured by the front image capture device, the left image capture device, and the rear image capture device may be stored in the bottom storage portions (1,0; 1,1; 1,2).

In some implementations, subsequent to identifying the camera alignment model at 910, the physical alignment of one or more image capture devices of an image capture apparatus may change. For example, physical components, such as structural components or materials, of one or more image capture devices, the image capture apparatus, or both may expand, contract, warp, or a combination thereof, in response to changes, such as variations in temperature, aging, physical force, or a combination thereof, which may cause image capture device misalignment. For example, a one-micron change in image capture device alignment may cause a single pixel discrepancy between the image capture devices.

In some implementations, one or more image portions corresponding to defined relative space may be identified at 920. Identifying image portions at 920 may be similar to identifying image portions at 720 as shown in FIG. 7, except as described herein. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 930. Identifying an alignment path at 930 may be similar to identifying an alignment path at 730 as shown in FIG. 7, except as described herein. The alignment path, or epipolar, may indicate a path, which may be vertical, or approximately vertical, from the point identified at 920 to a point along the edge of the image, such as a point at a distal relative latitude. In some implementations, the alignment path, or epipolar, may be a path along the longitude of the point identified at 920. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame.

In some implementations, one or more correspondence metrics may be determined at 940. Identifying correspondence metrics at 940 may be similar to identifying correspondence metrics at 740 as shown in FIG. 7, except as described herein. In some implementations, a group, or block, such as a 13×13 block of pixels, centered on the first pixel identified at 920 may be identified from the first image, and a group, or block, such as a 13×13 block of pixels, centered on the second pixel identified at 920 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks. In some implementations, determining the correspondence metrics may include determining a match quality metric for respective points along the alignment paths, which may be performed iteratively or in parallel.

In some implementations, identifying image portions corresponding to defined relative space at 920, identifying an alignment path at 930, determining correspondence metrics at 940, or both may be performed for a set of candidate alignment paths for a longitude as indicated by the broken line at 942. A first candidate alignment path from the set of candidate alignment paths may be orthogonal to the equator, which may be aligned along the respective longitude, and each other candidate alignment path from the set of candidate alignment paths may be angularly offset relative to the longitude. The degree of angular offset for a respective candidate alignment path may be a defined angular difference from the degree of angular offset for each other candidate alignment path from the set of candidate alignment path for a longitude. For example, a candidate image portion along a candidate alignment path may be a 13×13 block of pixels, and the degree of angular offset for each other candidate alignment path from the set of candidate alignment path for a longitude may correspond with a spatial difference of six pixels.

For example, a first candidate image portion corresponding to a point, or pixel, along the identified longitude may be identified as indicated at 920, a first candidate alignment path may be identified originating at the first candidate image portion as indicated at 930, and first correspondence metrics may be determined for the first candidate alignment path as indicated at 940; a second candidate image portion corresponding to a point, or pixel, longitudinally, or horizontally, adjacent to the identified longitude, such as a point along the latitude of the first candidate image portion and within a defined spatial distance, such as one pixel, from the identified longitude, in a first direction, such as left or right may be identified, a second candidate alignment path may be identified originating at the second candidate image portion as indicated at 930, and second correspondence metrics may be determined for the second candidate alignment path as indicated at 940; and a third candidate image portion corresponding to a point, or pixel, longitudinally, or horizontally, adjacent to the identified longitude, such as a point along the latitude of the first candidate image portion and within a defined spatial distance, such as one pixel, from the identified longitude, in a second direction, opposite the direction of the second candidate image portion, such as right or left of the first identified image portion may be identified, a third candidate alignment path may be identified originating at the third candidate image portion as indicated at 930, and third correspondence metrics may be determined for the third candidate alignment path as indicated at 940. Although three candidate alignment paths are described herein, any number of candidate alignment paths may be used.

In another example, an alignment path may extend from a location, such as a pixel, in a frame corresponding to a relative longitude and an equator, which may be a midpoint between the field-of-view of the image capture device and the overlapping field-of-view of the adjacent image capture device. The path may extend to a location, such as a pixel, in the frame at an edge of the frame. At a latitude along the path, a longitude of the path may differ from the relative longitude by an amount corresponding to an expected relative orientation of the image capture device and the adjacent image capture device, which may be indicated by the camera alignment model. The alignment path may be identified as a first candidate alignment path, and a second alignment path may be identified corresponding to the first alignment path and longitudinally offset from the first alignment path.

In some implementations, identifying image portions corresponding to defined relative space at 920, identifying an alignment path at 930, determining correspondence metrics at 940, or a combination thereof may be performed for two or more longitudes as indicated by the broken line at 944. For example, identifying image portions corresponding to defined relative space at 920, identifying an alignment path at 930, and determining correspondence metrics at 940 may be performed for respective defined longitudinal distances, such as each 0.5° of longitude, or a defined pixel distance corresponding to a defined longitudinal distance as a function of a resolution of the captured images.

In some implementations, an alignment for the current images may be identified at 950. Identifying the alignment for the current images at 950 may be similar to identifying the alignment for the current images at 750 as shown in FIG. 7, except as described herein. In some implementations, identifying the alignment for the current images at 950 may include simultaneously optimizing the correspondence metrics, which may include the correspondence metrics for respective candidate alignment paths, and a smoothness criterion. A disparity profile from the correspondence metrics may include a discrete per longitude sequence of match quality metrics, wherein a respective match quality metric for a longitude may correspond to one of the candidate alignment paths for the longitude. Simultaneously optimizing may include identifying a disparity profile representing a latitude per longitude evaluated, having a minimal cost, which may be a sum of match quality metrics, subject to the smoothness criterion.

For example, 724 longitudes may be evaluated in a respective frame, which may include determining correspondence metrics for 724 alignment paths, which may be approximately one alignment path per 0.5° longitude for 360°; 150 match quality metrics may be determined for a respective alignment path, which may include three candidate alignment paths per longitude, which may correspond to 450 (3*150) latitudes evaluated per longitude evaluated, which may be approximately three match quality metrics per 0.1° latitude for 10°, and determining the correspondence metrics may include determining 325800 (724*3*150) match quality metrics.

In some implementations, a calibrated, or recalibrated, camera alignment model may be generated and stored at 960. Generating the calibrated camera alignment model may include calibrating the camera alignment model identified at 910 based on the disparity profile identified at 950. For example, for a longitude the camera alignment model identified at 910 may indicate an alignment path, the disparity profile identified at 950 may indicate a candidate alignment path that differs from the alignment path for the longitude indicated by the camera alignment model identified at 910, and the calibrated camera alignment model may update the alignment path for the longitude based on the candidate alignment path identified at 950. For example, updating the alignment path may include omitting the alignment path indicated in the camera alignment model identified at 910 from the calibrated camera alignment model and including the candidate alignment path identified at 950 in the calibrated camera alignment model as the alignment path for the longitude. In another example, updating the alignment path may include using a weighted average of the alignment path indicated in the camera alignment model identified at 910 and the candidate alignment path identified at 950 as the alignment path for the longitude.

In some implementations, the relative weight of the candidate alignment path for updating the alignment path may be lowered, or updating based on the candidate alignment path may be omitted. For example, a difference between the alignment path for the longitude indicated by the camera alignment model identified at 910 and the candidate alignment path identified at 950 may exceed a threshold, which may indicate that the difference is inconsistent with one or more defined alignment change profiles, and updating based on the candidate alignment path may be omitted. An alignment change profile may indicate a defined range of change in alignment corresponding to a cause, such as a temperature change, of the change in alignment.

Although not shown separately in FIG. 9, in some implementations, determining the correspondence metrics at 940 may include determining a gradient of the match quality metric as a function of the angle of the path relative to the longitude, and calibrating the camera alignment model at 960 may be based on the gradient, and the periodic 2D search may be omitted. For example, a gradient of the match quality metric as a function of the angle of the path relative to the longitude may be a difference between the match metrics on adjacent pixels, such as two adjacent pixels, in a direction parallel to the equator, which may indicate a direction, magnitude, or both of angular offset to apply to a corresponding alignment path.

Compressing, or encoding, an image, or video, may include allocating encoding resources, such as bit allocations, for encoding the images, or portions thereof. Allocating encoding resources may include identifying encoding parameters, such as quantization parameters, and rate control to optimize bit allocation in the encoded stream. These parameters can be determined by hardware and/or software. Single-pass encoding may inefficiently allocate resources for some portions, such as some blocks, of an image or frame. Multi-pass encoding may increase processor utilization, latency, or both.

In some implementations, encoding hints for bitrate control are determined by an image signal processor and passed to an encoder with a corresponding frame or frames of video to be encoded. The image signal processor may process complete frames of video before hand-off to the encoder to facilitate integration of the two components and/or because the image signal processor implements a multi-pass algorithm, such as for local motion compensation and temporal noise reduction, to process a frame of video data. Because the image signal processor processes complete frames of video before the encoder, the image signal processor is able to determine encoding hints based on a complete frame of data which may then be made available to the encoder when the encoder starts encoding the frame. This allows the encoder to utilize frame-wide information while only performing a single-pass to encode the frame. Thus the encoder may utilize these encoding hints to improve resource allocation relative to single-pass encoding that omits the encoding hints, and may reduce processor utilization, latency, or both, relative to multi-pass encoding. Image signal processing based encoding hints for bitrate control may include the image signal processor generating encoding hints, such as scene complexity indication values, and storing the encoding hints in a shared memory. The encoder may read the encoding hints from the shared memory and may utilize the encoding hits to efficiently encode the images or video in a single-pass.

Figure 10:
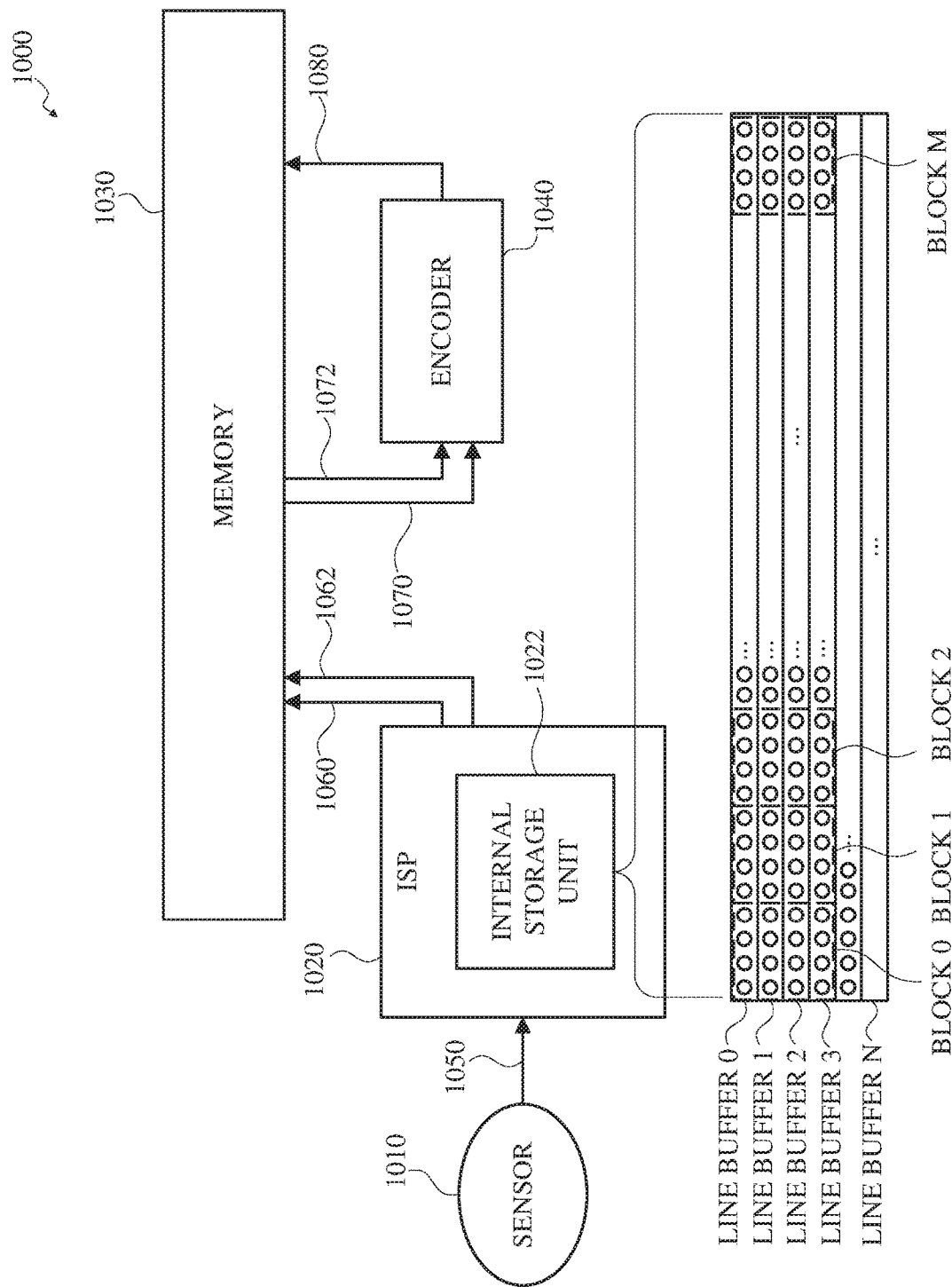
FIG. 10 is a block diagram of an example of an image signal processing and encoding pipeline in accordance with implementations of this disclosure.

FIG. 10 is a block diagram of an example of an image signal processing and encoding pipeline 1000 in accordance with implementations of this disclosure. The image signal processing and encoding pipeline 1000 may be included in an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3. In some implementations, the image signal processing and encoding pipeline 1000 shown in FIG. 10 may be similar to the image processing and coding pipeline 400 shown in FIG. 4, except as described herein.

The image signal processing and encoding pipeline 1000 may include an image sensor 1010, such as the image sensor 230 shown in FIG. 2; an image signal processor (ISP) 1020, such as the image signal processor 410 shown in FIG. 4 or the image signal processor 500 shown in FIG. 5; a shared memory 1030, such as the electronic storage unit 224 shown in FIG. 2; an encoder 1040, such as the encoder 420 shown in FIG. 4; or a combination thereof. In some implementations, one or more of the image sensor 1010, the image signal processor 1020, the shared memory 1030, or the encoder 1040 may be implemented in any combination of one or more physical units.

The image sensor 1010 may be a charge-coupled device (CCD) sensor, an active pixel sensor, a complementary metal-oxide semiconductor sensor, an N-type metal-oxide-semiconductor sensor, or any other image sensor or combination of image sensors.

The image sensor 1010 may capture or measure values, such as pixel or sub-pixel values, representing an image, or a portion thereof, and may send, or transmit, the captured image, or image portion, to the image signal processor 1020 as an input image signal 1050.

For example, the image sensor 1010 may generate and send the input image signal 1050 as an ordered, such as raster order, sequence of pixel values. The input image signal 1050 may represent pixel values in a defined format, which may be an image sensor format, such as a RAW image signal format. The input image signal 1050 may include an image, or frame, or a portion thereof, which may be one of a sequence or series of images of a video. For example, the image sensor 1010 may send the input image signal 1050 to the image signal processor 1020 on a pixel-by-pixel or a line-by-line basis.

The image signal processor 1020 may include an internal storage unit 1022, such as the internal electronic storage unit 414 shown in FIG. 4. The internal storage unit 1022 may include one or more line buffers or busses for storing a defined number or cardinality of lines, such as four lines, five lines (as shown), or any number or cardinality of lines, of the input image signal 1050, which may be vertically-sequential, such as in top-down order, frame-width lines. Other internal storage structures may be implemented in the image signal processor 1020 instead of, or in addition to, the internal storage unit 1022 shown.

An expanded partial view of the internal storage unit 1022 is shown below the image signal processor 1020 for clarity. In the expanded partial view, the internal storage unit 1022 is shown as including N line buffers, individual pixels are represented as circles, and M 4×4 blocks are indicated by broken lines. Although 4×4 blocks are described herein, any size block may be implemented.

The image signal processor 1020 may receive the input image signal 1050 from the image sensor 1010, such as on a pixel-by-pixel or line-by-line basis, and may store or cache one or more lines, or pixels, of the input image signal 1050 in the internal storage unit 1022.

In some implementations, lines of the input image signal 1050 may be buffered in the internal storage unit 1022 on a rolling basis. For example, the internal storage unit 1022 may include five line buffers, a first line of the input image signal 1050 may be received by the image signal processor 1020 and buffered in the first line buffer, a second line of the input image signal 1050 may be received by the image signal processor 1020 and buffered in the second line buffer, a third line of the input image signal 1050 may be received by the image signal processor 1020 and buffered in the third line buffer, a fourth line of the input image signal 1050 may be received by the image signal processor 1020 and buffered in the fourth line buffer, a fifth line of the input image signal 1050 may be received by the image signal processor 1020 and buffered in the fifth line buffer, a sixth line of the input image signal 1050 may be received by the image signal processor 1020, the first line of the input image signal 1050 may be replaced in the first line buffer by the second line of the input image signal 1050, the second line of the input image signal 1050 may be replaced in the second line buffer by the third line of the input image signal 1050, the third line of the input image signal 1050 may be replaced in the third line buffer by the fourth line of the input image signal 1050, the fourth line of the input image signal 1050 may be replaced in the fourth line buffer by the fifth line of the input image signal 1050, and the fifth line of the input image signal 1050 may be replaced in the fifth line buffer by the sixth line of the input image signal 1050.

The image signal processor 1020 may process one or more portions of the input image signal 1050. For example, the image signal processor 1020 may process one or more pixels, one or more lines, or one or more blocks of the input image signal 1050 buffered in the internal storage unit 1022. In an example, the internal storage unit 1022 may include four or more line buffers and one or more 4×4 blocks of the input image signal 1050 may be identified based on four buffered lines of the input image signal 1050 buffered in the four line buffers of the internal storage unit 1022.

Processing the input image signal 1050 by the image signal processor 1020 may include determining one or more image indications based on the input image signal 1050, such as based on one or more pixels, blocks, or lines, of the input image signal 1050 buffered in the internal storage unit 1022. For example, the image signal processor 1020 may process the input image signal 1050 as described herein, such as shown in FIG. 4 and FIG. 5, which may include generating one or more image indications. One or more of the image indications may be associated with one or more pixels, or sub-pixels, one or more blocks, one or more lines, one or more frames, or with any other portion of an image or video signal. An example of determining image indications is shown in FIG. 13.

The image signal processor 1020 may generate processed image data. The processed image data may include processed pixel data, such as pixel data in a defined processed format, such as YUV, which may be referred to herein as the processed image signal. In some implementations, the image signal processor 1020 may buffer the processed image data, or a portion thereof, in the internal storage unit 1022, in another internal data storage structure, or in a combination of the internal storage unit 1022 and another internal data storage structure.

The image signal processor 1020 may output the processed image data, or a portion thereof, as processed image data 1060. For example, the image signal processor 1020 may store the processed image data 1060, or a portion thereof, in the shared memory 1030. For example, the image signal processor 1020 may store the processed image data 1060 in the shared memory 1030 on a pixel-by-pixel basis, a block-by-block basis, a line-by-line basis, a frame-by-frame basis, or on the basis of any other image signal portion, which may include storing the processed image data 1060, corresponding image indications 1062, or both in the shared memory 1030, such as on a rolling basis.

The image signal processor 1020 may output the image indications, or a portion thereof, as processed image indications 1062. For example, the image signal processor 1020 may store the image indications, or a portion thereof, in the shared memory 1030 as processed image indications 1062, which may include storing the processed image indications 1062 on a rolling basis. In some implementations, the processed image indications 1062 may include image indications received from a sensor, such as the image sensor 1010, image indications determined by the image signal processor 1020, or a combination thereof.

For example, the image signal processor 1020 may receive four lines of the input image signal 1050 from the sensor 1010. The image signal processor 1020 may buffer the four lines in the internal storage unit 1022. The image signal processor 1020 may generate four lines of processed image data 1060 based on the four lines buffered in the internal storage unit 1022. The image signal processor 1020 may generate one or more image indications based on the four lines buffered in the internal storage unit 1022, based on the four lines of processed image data 1060, or based on both the input image signal 1050 and the processed image data 1060. The image signal processor 1020 may output the four lines of processed image data 1060, the processed image indications 1062, or both by storing the output information in the shared memory 1030. The image signal processor 1020 may receive one or more other lines of the input image signal 1050 from the sensor 1010 and may replace one or more of the lines buffered in the internal storage unit 1022 with one or more of the other lines of the input image signal 1050.

The image signal processor 1020 may output the processed image data 1060 separately, such as independently, from the processed image indications 1062 or may store the processed image indications 1062 in conjunction with storing the processed image data 1060.

Although not shown separately in FIG. 10, in some implementations, the image signal processor 1020 may output the processed image data 1060, the processed image indications 1062, or both to the encoder 1040 and may omit storing the processed image data 1060, the processed image indications 1062, or both in the shared memory 1030.

The image signal processor 1020 may determine an average value of an image indication for multiple portions of a frame, for a frame, or for multiple frames. For example, the image signal processor 1020 may determine an average scene complexity indication value for a frame, which may be an average of scene complexity indication values for respective portions of the frame, such as blocks of the frame. In some implementations, the image signal processor 1020 may determine an average scene complexity indication value for multiple frames, such as a sequence of frames or group of pictures (GOP).

For example, the image signal processor 1020 may process respective blocks from a frame, which may include updating or maintaining one or more average values, or running total values, for respective scene complexity indication values. In some implementations, the scene complexity indication value for the frame may be scaled or normalized, such as divided by the number or cardinality of blocks in the frame, and may be written to shared memory 1030. For example, the scene complexity indication value for a frame may be included in the processed image indications 1062 for the frame, or a portion thereof.

Blocks from a frame may be evaluated using an average image indication. For example, a scene complexity image indication for a block may be compared to a scene complexity image indication for the frame to determine a relative scene complexity value for the block.

The encoder 1040 may receive source image data 1070, source image indications 1072, or both. For example, the encoder 1040 may read the source image data 1070 from the shared memory 1030, may read the source image indications 1072 from the shared memory 1030, or may read both the source image data 1070 and the source image indications 1072 from the shared memory 1030. Although described herein as source image data 1070, the source image data 1070 may include the processed image data 1060 stored by the image signal processor 1020 for one or more frames, such as frames of a video sequence. Although described herein as source image indications 1072, the source image indications 1072 may include the image indications 1062 stored by the image signal processor 1020 for one or more frames, such as frames of a video sequence, corresponding to the source image data 1070.

Although not shown in FIG. 10, in some implementations, the image signal processor 1020 may omit storing the processed image data 1060, the image indications 1062, or both in the shared memory 1030. In some implementations, the encoder 1040 may receive the source image data 1070, the source image indications 1072, or both from the image signal processor 1020.

The encoder 1040 may read one or more source frames of video data, which may include buffering the source frames, such as in an internal data storage unit of the encoder 1040. For example, the image signal processor 1020 may store portions, such as lines or groups of lines, of a frame in the shared memory 1030 on a rolling basis, and the encoder 1040 may read the source image data 1070, the source image indications 1072, or both corresponding to the stored processed image data 1060 and the stored processed image indications 1062 for the frame on a periodic basis or in response to the image signal processor 1020 storing data in the shared memory 1030.

The encoder 1040 may compress the source image data 1070, the source image indications 1072, or both. Compressing the source image data 1070, the source image indications 1072, or both may include reducing redundancy in the image data. For example, reducing redundancy may include reducing spatial redundancy based on a frame, reducing temporal redundancy based on the frame and one or more previously encoded frames, or reducing both spatial and temporal redundancy.

The encoder 1040 may encode respective frames of a video sequence on a block-by-block basis. For example, the encoder 1040 may encode a current block of a current frame from the source image data 1070, which may include generating a predicted, or prediction, block based on previously coded information, such as one or more previously coded and reconstructed blocks or frames.

Generating a prediction block may include performing motion compensation, which may include performing motion estimation, which may include identifying a portion, or portions, of one or more previously encoded and reconstructed frames, which may be referred to herein as reference frames, that closely matches the current block. A displacement between a spatial location of the current block in the current frame and a matching portion of the reference frame may be indicated by a motion, or displacement, vector.

A difference between the prediction block and the current block may be identified as a residual or a residual block. The residual block may be transformed using a transform, such as a discrete cosign transform (DCT), an asymmetric discrete sine transform (ADST), or any other transform or combination of transforms, to generate a transform block including transform coefficients, which may be represented as a matrix, which may have the size and shape of the residual block.

The encoder 1040 may perform quantization to quantize the transform coefficients, which may reduce the accuracy of the encoded data, the bandwidth utilization for the encoded data, or both. The quantized transform coefficients, the motion vectors, other encoding data, or a combination thereof may be entropy coded to generate entropy coded data, which may be referred to herein as the encoded data or the encoded output, and the encoded data may be output by the encoder 1040 as encoded output 1080.

Although block-based encoding is described herein, other image coding techniques, such as coding based on arbitrary size and shape units, may be implemented in accordance with this disclosure.

The encoder 1040 may output, such as store, transmit, or both, the encoded data as encoded output 1080. For example, the encoder 1040 may store the encoded data as encoded output 1080 in the shared memory 1030, may transmit the encoded output 1080 to another device (not shown), or may store the encoded data as encoded output 1080 in the shared memory 1030 and transmit the encoded output 1080 to another device (not shown).

The encoded output 1080 may be received by a decoder (not shown), and may be decompressed, or decoded, to generate a reconstructed image or video corresponding to the source image data 1070.

The encoder 1040 may encode the processed source image data 1070 using lossy compression, lossless compression, or a combination of lossy and lossless compression.

One or more elements of encoding the source image data 1070, such as entropy coding, may be lossless. A reconstructed image or video generated based on losslessly encoded image or video data may be identical, or effectively indistinguishable, from the source image data 1070.

One or more elements of encoding the source image data 1070, such as quantization, may be lossy, such that some information, or the accuracy of some information, compressed by lossy compression may be lost or discarded or may be otherwise unavailable for decoding the encoded data. The accuracy with which a reconstructed image or video generated based on encoded image data encoded using lossy compression matches the source image data 1070 may vary based on the amount of data lost, such as based on the amount of compression.

Encoding, such as block-based encoding, may include the encoder 1040 adjusting encoding parameters to balance resource utilization and quality, or accuracy, of corresponding reconstructed images or video. For example, the encoder 1040 may allocate bits for encoding a block, may adjust a quantization parameter to increase or reduce the accuracy, or quality, of the corresponding reconstructed frame or video and increase or reduce the cardinality of bits utilized for encoding the block, or may allocate bits and adjust quantization or other encoding parameters.

In an example, a block of a frame of the source image data 1070 may include content that is flat, monotone, or includes little or no motion, and the encoder 1040 may over-allocate bits to the block, which may be an inefficient allocation of resources. In another example, a block of a frame of the source image data 1070 may include complex content or significant motion, and the encoder 1040 may under-allocate bits to the block, which may reduce accuracy or quality of a corresponding reconstructed frame or video.

In some implementations, the encoder 1040 may implement constant bitrate (CBR) coding, which may include allocating a defined cardinality of bits for encoding a respective frame, or a respective block of a frame, prior to encoding the frame, or a portion of the frame, such as a tile, a segment, or any other portion or combination of portions of one or more frames of a video sequence, and may include adjusting encoding quality or accuracy, such as by adjusting a quantization parameter, to comply with the bit allocations.

In some implementations, the encoder 1040 may implement single-pass variable bitrate (VBR) coding, which may include allocating a respective cardinality of bits for a unit, such as for a frame or a block, independent, or partially independent, of the content captured by the image, which may inefficiently over or under allocate resources for some blocks. In some implementations, the encoder 1040 may implement multi-pass variable bitrate encoding, such as two-pass variable bitrate encoding, which may include analyzing the frame in a first pass, such as a look-ahead pass, and optimizing the resource allocation for encoding the frame in a second pass based on the first pass analysis, which may improve bit allocation and accuracy and may increase processing and power utilization, latency, or both.

In some implementations, the image signal processor 1020 may generate one or more encoding hints and may include the encoding hints in the image indications 1062, which may be stored in the shared memory 1030, or otherwise provided to the encoder 1040. The encoder 1040 may receive the encoding hints, such as by reading the source image indications 1072, and may utilize the encoding hints to encode the image or video, or one or more portions thereof. For example, the image signal processor 1020 may determine one or more scene complexity indication values for a video, a frame, or a portion of a frame, such as one or more blocks, and may include the scene complexity indication values in the image indications 1062 stored in the shared memory 1030 as encoding hints, which may be encoding hints for bitrate control or optimization, and the encoder 1040 may encode the corresponding video, frame, blocks, or block by performing single-pass variable bitrate coding or constant bitrate coding, which may include reading the corresponding source image indications 1072, identifying the scene complexity indication values from source image indications 1072, and adjusting encoding parameters, such as bit allocation, quantization levels, or both, based on the scene complexity indication values, which may improve resource utilization, accuracy, or both relative to single-pass encoding that omits encoding hints and may reduce latency, resource utilization, or both relative to multi-pass encoding, which may include a look-ahead pass.

Figure 11:
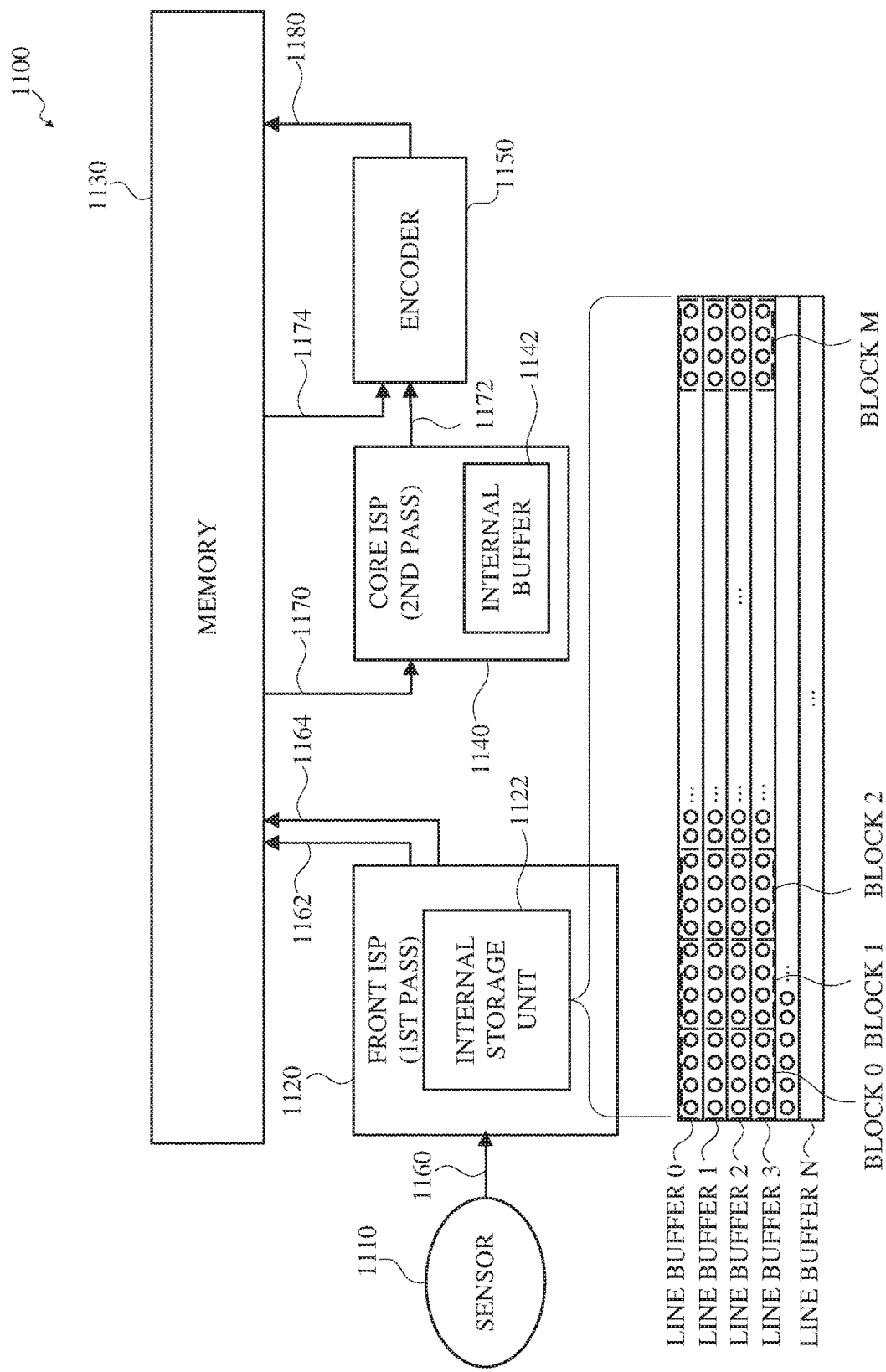
FIG. 11 is a block diagram of another example of an image signal processing and encoding pipeline in accordance with implementations of this disclosure.

FIG. 11 is a block diagram of another example of an image signal processing and encoding pipeline 1100 in accordance with implementations of this disclosure. The image signal processing and encoding pipeline 1100 may be similar to the image signal processing and encoding pipeline 1000 shown in FIG. 10, except as described herein. The image signal processing and encoding pipeline 1100 may be included in an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3.

The image signal processing and encoding pipeline 1100 includes an image sensor 1110, a front image signal processor 1120, a shared memory 1130, a core image signal processor 1140, and an encoder 1150. The image signal processing and encoding pipeline 1100 may implement multi-pass, such as two-pass, image processing and single-pass encoding.

The image sensor 1110 may be similar to the image sensor 1010 shown in FIG. 10, except as described herein. For example, the image sensor 1110 may output an input, or source, image signal 1160 to the front image signal processor 1120.

The front image signal processor 1120 may include an internal storage unit 1122 and may be similar to the image signal processor 1020 shown in FIG. 10, except as described herein. For example, the front image signal processor 1120 may receive the input image signal 1160 from the image sensor 1110 and may perform first-pass image processing to generate partially processed image data 1162, processed image indications 1164, or both for the input image signal 1160.

The front image signal processor 1120 may output, such as by storing or writing, the partially processed image data 1162, the processed image indications 1164, or both, in the shared memory 1130. For example, the front image signal processor 1120 may store the partially processed image data 1162 and the processed image indications 1164 for a portion of a frame, such as a block, a frame, or multiple frames, such as a group of pictures, in the shared memory 1130.

For example, the front image signal processor 1120 may generate scene complexity indication values for a frame, a portion of a frame, or multiple frames and may output the scene complexity indication values as the processed image indications 1164 by storing the processed image indications 1164, including the scene complexity indication values, in the shared memory 1130.

The shared memory 1130 may be similar to the shared memory 1030 shown in FIG. 10, except as described herein. For example, the shared memory 1130 may be written to by the front image signal processor 1120, the encoder 1150, or both and may be read by the core image signal processor 1140, the encoder 1150, or both.

The core image signal processor 1140 may include an internal buffer 1142 and may be similar to the image signal processor 1020 shown in FIG. 10, except as described herein. For example, the core image signal processor 1140 may read, or otherwise access, the partially processed image data 1162 from the shared memory 1130 as partially processed input image data 1170 and may perform second-pass image processing to generate processed image data 1172 based on the partially processed input image data 1170.

For example, generating the processed image data 1172 may include performing noise reduction, such as three-dimensional noise reduction, on the partially processed input image data 1170 to generate the processed image data 1172.

In some implementations, reading the partially processed input image data 1170 may include reading the processed image indications 1164 from the shared memory 1130 and generating the processed image data 1172 may include generating the processed image data 1172 based on the partially processed input image data 1170 and the processed image indications 1164.

The core image signal processor 1140 may send, transmit, or otherwise output processed image data 1172 to the encoder 1150, such as in raster order, which may omit storing the processed image data 1172 in the shared memory 1130.

Although shown separately, in some implementations, the front image signal processor 1120 and the core image signal processor 1140 may be implemented as a combined unit or may be implemented as separate physical units having shared resources, such as a shared buffer. For example, the internal storage unit 1122 of the front image signal processor 1120 and the internal buffer 1142 of the core image signal processor 1140 may be implemented as a combined physical unit. In some implementations, size, or storage capacity, of the internal storage unit 1122 of the front image signal processor 1120 may exceed the size, or storage capacity, of the internal buffer 1142 of the core image signal processor 1140. For example, the internal storage unit 1122 of the front image signal processor 1120 may store a frame and the internal buffer 1142 of the core image signal processor 1140 may store a portion of a frame.

The encoder 1150 may be similar to the encoder 1040 shown in FIG. 10, except as described herein. For example, the encoder 1150 may receive the processed image data 1172 from the core image signal processor 1140, which may omit reading the processed image data 1172 from the shared memory 1130. Although not expressly shown in FIG. 11, the encoder 1150 may include an internal memory or buffer. For example, the encoder 1150 may buffer the processed image data 1172 received from the internal buffer 1142 of the core image signal processor 1140 in an internal buffer of the encoder 1150.

In some implementations, the encoder 1150 may read, or otherwise access, the processed image indications 1164 from the shared memory 1130 as source image indications 1174, which may be encoding hints.

The encoder 1150 may generate encoded image information 1180 by encoding the processed image data 1172 based on the source image indications 1174 and may output, such as by writing or storing, the encoded image information 1180 to the shared memory 1130.

For example, the source image indications 1174 may include scene complexity indication values for portions of a frame, such as respective blocks, for a frame, or for multiple frames, such as a group of frames, corresponding to the processed image data 1172, and the encoder 1150 may generate or determine encoding parameters, such as bit allocation parameters, quantization parameters, or any other encoding parameter that may be based, at least in part, on the source image indications 1174.

In an example, the encoder 1150 may omit multi-pass coding, such as by performing a look-ahead pass, and may encode the video, group of pictures, frame, blocks, or block corresponding to the processed image data 1172 using single-pass coding, such as variable bitrate single-pass coding or constant bitrate single-pass coding, which may improve resource utilization, accuracy, or both relative to single-pass encoding that omits encoding hints and may reduce latency, resource utilization, or both relative to multi-pass encoding, which may include a look-ahead pass.

In some implementations, the encoder 1150 may read the source image indications 1174 for a frame, or a sequence of frames, such as a group of pictures, as generated by the front image signal processor 1120 prior to, or concurrent with, receiving the corresponding processed image data 1172, and may receive and encode the processed image data 1172 on a rolling basis based on the previously read source image indications 1174, which may improve efficiency relative to encoding that includes reading the processed image data 1172 from the shared memory 1130. For example, the encoder may encode a first portion of the processed image data 1172, such as a first block of a frame, prior to receiving a subsequent portion of the processed image data 1172, such as a subsequent portion of the frame, which may reduce latency and improve parallelism.

Although shown separately in FIG. 11, one or more of the image sensor 1110, the front image signal processor 1120, the shared memory 1130, the core image signal processor 1140, and the encoder 1150 may be implemented in any combination of one or more physical units.

Figure 12:
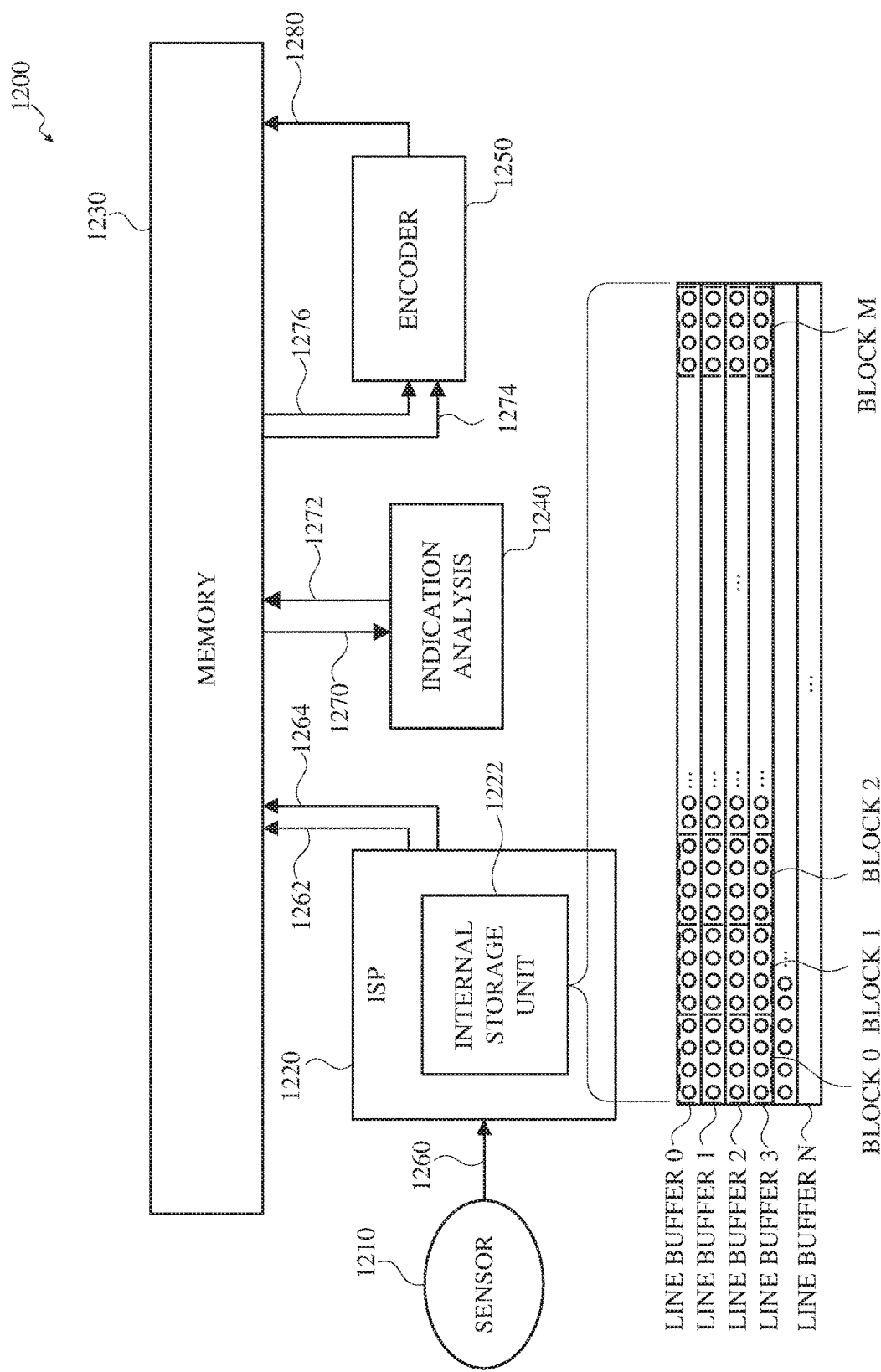
FIG. 12 is a block diagram of another example of an image signal processing and encoding pipeline in accordance with implementations of this disclosure.

FIG. 12 is a block diagram of another example of an image signal processing and encoding pipeline 1200 in accordance with implementations of this disclosure. The image signal processing and encoding pipeline 1200 may be similar to the image signal processing and encoding pipeline 1000 shown in FIG. 10 or the image signal processing and encoding pipeline 1100 shown in FIG. 11, except as described herein. The image signal processing and encoding pipeline 1200 may be included in an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3.

The image signal processing and encoding pipeline 1200 includes an image sensor 1210, an image signal processor 1220, a shared memory 1230, an indication analysis unit 1240, and an encoder 1250.

The image sensor 1210 may be similar to the image sensor 1010 shown in FIG. 10 or the image sensor 1110 shown in FIG. 11, except as described herein. For example, the image sensor 1210 may output an input, or source, image signal 1260 to the image signal processor 1220.

The image signal processor 1220 may include an internal storage unit 1222 and may be similar to the image signal processor 1020 shown in FIG. 10 or the image signal processor 1120 shown in FIG. 11, except as described herein. For example, the image signal processor 1220 may receive the input image signal 1260 from the image sensor 1210 and may perform image processing to generate processed image data 1262, processed image indications 1264, or both for the input image signal 1260.

The image signal processor 1220 may output, such as by storing or writing, the processed image data 1262, the processed image indications 1264, or both, in the shared memory 1230. For example, the image signal processor 1220 may store the processed image data 1262 and the processed image indications 1264 for a portion of a frame, such as a block, for a frame, or for multiple frames, such as a group of pictures, in the shared memory 1230.

For example, the image signal processor 1220 may generate scene complexity indication values for a frame, a portion of a frame, or multiple frames and may output the scene complexity indication values as the processed image indications 1264 by storing the processed image indications 1264, including the scene complexity indication values, in the shared memory 1230.

The shared memory 1230 may be similar to the shared memory 1030 shown in FIG. 10 or the shared memory 1130 shown in FIG. 11, except as described herein. For example, the shared memory 1230 may be written to by the image signal processor 1220, the indication analysis unit 1240, the encoder 1250, or a combination thereof, and may be read by the indication analysis unit 1240, the encoder 1250, or both.

The indication analysis unit 1240 may read, or otherwise access, the processed image indications 1264 from the shared memory 1230 as partially processed image indications 1270. Although not shown separately in FIG. 12, in some implementations, reading the partially processed image indications 1270 may include reading, or otherwise accessing, the processed image data 1262 from the shared memory 1230 as processed input image data.

The indication analysis unit 1240 may generate aggregate image indications 1272 based on the partially processed image indications 1270 and may output, such as write or store, the aggregate image indications 1272 in the shared memory 1230.

For example, the image signal processor 1220 may generate scene complexity indication values for respective blocks of a frame based on the input image signal 1260 from the image sensor 1210 and may store the scene complexity indication values for the respective blocks in the shared memory 1230 as the processed image indications 1264. The indication analysis unit 1240 may read the processed image indications 1264 from the shared memory 1230 for the respective blocks of the frame as partially processed image indications 1270 and may generate aggregate image indications 1272 for the frame based on the partially processed image indications 1270 corresponding to the respective blocks of the frame.

In another example, the image signal processor 1220 may generate scene complexity indication values for respective blocks of a frame, or for the frame, based on the input image signal 1260 from the image sensor 1210 and may store the scene complexity indication values for the respective blocks, or for the frame, in the shared memory 1230 as the processed image indications 1264. The indication analysis unit 1240 may read the processed image indications 1264 from the shared memory 1230 for the respective blocks, or for the frame, as partially processed image indications 1270, and may generate aggregate image indications 1272 for a sequence of frames, such as a group of pictures, that includes the frame based on the partially processed image indications 1270 corresponding to the frame, or blocks thereof.

Generating the aggregate image indications 1272 may include generating an average of respective values from the partially processed image indications 1270. For example, the partially processed image indications 1270 may include respective scene complexity indication values for respective blocks from a frame, and generating the aggregate image indications 1272 may include generating an average scene complexity indication value for the frame based on the respective scene complexity indication values for the respective blocks from the frame.

In some implementations, the indication analysis unit 1240 may generate relative image indications and may include the relative image indications in the aggregate image indications 1272 output to the shared memory 1230.

For example, the partially processed image indications 1270 may include respective scene complexity indication values for respective blocks from a frame, the indication analysis unit 1240 may generate aggregate image indications 1272 for the frame, such as by generating an average scene complexity indication value for the frame based on the respective scene complexity indication values for the respective blocks from the frame, the indication analysis unit 1240 may generate relative image indications for the respective blocks from the frame, such as by comparing the scene complexity indication values generated by the image signal processor 1220 for respective blocks from the frame with the average scene complexity indication value for the frame to generate the respective scene complexity indication values for the corresponding blocks, and the indication analysis unit 1240 may include the relative scene complexity indication values in the aggregate image indications 1272 output to the shared memory 1230.

In some implementations, the indication analysis unit 1240 may store the aggregate image indications 1272, which may include relative image indications, in the shared memory 1230 in association with the processed image indications 1264 stored in the shared memory 1230 by the image signal processor 1220.

In some implementations, the indication analysis unit 1240 may replace the processed image indications 1264 stored in the shared memory 1230 by the image signal processor 1220, which may include deleting the processed image indications 1264 stored in the shared memory 1230 by the image signal processor 1220 from the shared memory 1230. For example, the indication analysis unit 1240 may replace the processed image indications 1264 stored in the shared memory 1230 by the image signal processor 1220 with the aggregate image indications 1272, which may include the relative image indications. In another example, the indication analysis unit 1240 may replace the processed image indications 1264 stored in the shared memory 1230 by the image signal processor 1220 with reformatted image indications, which may include the information indicated by the processed image indications, the aggregate image indications, the relative image indications, or a combination thereof, such as in a format for access by the encoder 1250.

In some implementations, image signal processing using the image signal processing and encoding pipeline 1200 may include multi-pass, such as two-pass, image signal process, which may be similar to the two-pass image signal processing described in relation to the image signal processing and encoding pipeline 1100 shown in FIG. 11, except as described herein.

For example, although one image signal processor 1220 is shown in FIG. 12, the image signal processing and encoding pipeline 1200 may include a front image signal processor (not expressly shown), such as the front image signal processor 1120 shown in FIG. 11, for first-pass image signal processing, which may include generating partially processed image indications for the frame; the indication analysis unit 1240 may receive the partially processed image indications for the frame and may generate aggregate image indications, relative image indications, or both; and a core image signal processor (not expressly shown), such as the core image signal processor 1140 shown in FIG. 11, for second-pass image signal processing.

Although shown separately in FIG. 12, in some implementations, the image signal processor 1220 and the indication analysis unit 1240 may be implemented as a combined unit or may be implemented as separate physical units having shared resources, such as a shared buffer.

The encoder 1250 may be similar to the encoder 1040 shown in FIG. 10 or the encoder 1150 shown in FIG. 11, except as described herein. For example, the encoder 1250 may read the processed image data 1262 from the shared memory 1230 as source image data 1274, and may read the processed image indications 1264 generated by the image signal processor 1220, the aggregate image indications 1272, which may include relative image indications, generated by the indication analysis unit 1240, or both from the shared memory 1230 as source image indications 1276, which may be encoding hints.

The encoder 1250 may generate encoded image information 1280 by encoding the source image data 1274 based on the source image indications 1276 and may output, such as by writing or storing, the encoded image information 1280 to the shared memory 1230.

Although shown separately in FIG. 12, one or more of the image sensor 1210, the image signal processor 1220, the shared memory 1230, the indication analysis unit 1240, and the encoder 1250 may be implemented in any combination of one or more physical units.

FIG. 13 shows examples of blocks for determining encoding hints in accordance with this disclosure. An image signal processor, such as the image signal processor 1020 shown in FIG. 10, the front signal processor 1120 shown in FIG. 11, the core image signal processor 1140 shown in FIG. 11, the image signal processor 1220 shown in FIG. 12, or the image analysis unit 1240 shown in FIG. 12, may generate one or more encoding hints, such as encoding hints based on scene complexity, and may include the encoding hints in image indications, such as the image indications 1062 shown in FIG. 10, the image indications 1164 shown in FIG. 11, the image indications 1264 shown in FIG. 12, or the image indications 1272 shown in FIG. 12, stored in a shared memory, such as the shared memory 1030 shown in FIG. 10, the shared memory 1130 shown in FIG. 11, or the shared memory 1230 shown in FIG. 12, or otherwise provided to an encoder, such as the encoder 1040 shown in FIG. 10, the encoder 1150 shown in FIG. 11, or the encoder 1250 shown in FIG. 12.

The image signal processor may generate one or more image indications for a portion of a frame, such as a block, as encoding hints. For example, the image signal processor may include an internal storage unit, such as the internal storage unit 1022 shown in FIG. 10, the internal storage unit 1122 shown in FIG. 11, or the internal storage unit 1222 shown in FIG. 12, which may buffer images data, such as four lines of a frame; the image signal processor may identify a block, such as a 4×4 block, such as Block 0 shown in FIG. 10, as a current block; the image signal processor may generate one or more image indications for the block; and the image signal processor may output or store the image indications as encoding hints.

One or more previously processed portions, such as previously processed lines, of an image or video may be omitted from the internal storage unit of the image signal processor, or may be otherwise unavailable to the image signal processor, for generating the image indications, and the image signal process may read the unavailable portion (lines) from the shared memory, which may include buffering the lines in the internal storage unit.

Determining an image indication, such as a scene complexity image indication, for a block may include determining an activity variance value, such as a vertical activity variance value, a horizontal activity variance value, or a combination thereof, for the block.

FIG. 13 includes a top block 1300, which shows an example of determining a vertical activity variance value, as indicated by the vertical dotted lines, and a bottom block 1310, which shows an example of determining a horizontal activity variance value, as indicated by the horizontal dotted lines. For example, the top block 1300, the bottom block 1310, or both, may correspond with a block, such as Block 0 shown in FIG. 10, buffered in an internal storage unit of the image signal processor. For simplicity and clarity, pixels in the blocks 1300, 1310 shown in FIG. 13 are indicated using Cartesian coordinates, $P_{m,n}$, wherein the value of "m" indicates a row in the block and the value of "n" indicates a column in the block.

Determining a vertical activity variance value for a block may include determining a sum of absolute differences of pixel values vertically in the block. For example, determining a vertical activity variance value may include determining a sum of absolute differences (SAD), or other variance metric, for a first column of the block (V1), which may be expressed as $SAD_{V1}=|P_{0,0}-P_{1,0}|+|P_{1,0}-P_{2,0}|+|P_{2,0}-P_{3,0}|$, determining a sum of absolute differences, or other variance metric, for a second column of the block (V2), which may be expressed as $SAD_{V2}=|P_{0,1}-P_{1,1}|+|P_{1,1}-P_{2,1}|+|P_{2,1}-P_{3,1}|$, determining a sum of absolute differences, or other variance metric, for a third column of the block (V3), which may be expressed as $SAD_{V3}=|P_{0,2}-P_{1,2}|+|P_{1,2}-P_{2,2}|+|P_{2,2}-P_{3,2}|$, determining a sum of absolute differences, or other variance metric, for a fourth column of the block (V4), which may be expressed as $SAD_{V4}=|P_{0,3}-P_{1,3}|+|P_{1,3}-P_{2,3}|+|P_{2,3}-P_{3,3}|$, and may include determining a sum of the sum of absolute differences for the first column of the block (V1), the sum of absolute differences for the second column of the block (V2), the sum of absolute differences for the third column of the block (V3), and the sum of absolute differences for the fourth column of the block (V4) as the vertical activity variance value ($SAD_V$), which may be expressed as $SAD_V=SAD_{V1}+SAD_{V2}+SAD_{V3}+SAD_{V4}$.

Determining a horizontal activity variance value for a block may include determining a sum of absolute differences of pixel values horizontally in the block. For example, determining a horizontal activity variance value may include determining a sum of absolute differences, or other variance metric, for a first row of the block (H1), which may be expressed as $SAD_{H1}=|P_{0,0}-P_{0,1}|+|P_{0,1}-P_{0,2}|+|P_{0,2}-P_{0,3}|$, determining a sum of absolute differences, or other variance metric, for a second row of the block (H2), which may be expressed as $SAD_{H2}=|P_{1,0}-P_{1,1}|+|P_{1,1}-P_{1,2}|+|P_{1,2}-P_{1,3}|$, determining a sum of absolute differences, or other variance metric, for a third row of the block (H3), which may be expressed as $SAD_{H3}=|P_{2,0}-P_{2,1}|+|P_{2,1}-P_{2,2}|+|P_{2,2}-P_{2,3}|$, determining a sum of absolute differences, or other variance metric, for a fourth row of the block (H4), which may be expressed as $SAD_{H4}=|P_{3,0}-P_{3,1}|+|P_{3,1}-P_{3,2}|+|P_{3,2}-P_{3,3}|$, and may include determining a sum of the sum of absolute differences for the first row of the block (H1), the sum of absolute differences for the second row of the block (H2), the sum of absolute differences for the third row of the block (H3), and the sum of absolute differences for the fourth row of the block (H4) as the horizontal activity variance value ($SAD_H$), which may be expressed as $SAD_H=SAD_{H1}+SAD_{H2}+SAD_{H3}+SAD_{H4}$.

Determining the scene complexity image indication for the block may include determining a combined, horizontal and vertical, activity variance value, which may be expressed as shown in the following:

$$\text{Activity}=\Sigma(|P_{m,n}-P_{m+1,n}|)+\Sigma(|P_{m,n}-P_{m,n+1}|).\quad\text{[Equation 1]}$$

The image signal processor may store the horizontal, vertical, or combined activity variance value for the block in the shared memory, which may include storing an association between the activity variance value for the block and the processed image data for the block in the shared memory. Although directional sums of absolute differences are described as activity variance values for determining scene complexity herein, other image indications may be determined as encoding hints for bitrate optimization in accordance with implementations of this disclosure.

In some implementations, the scene complexity image indications may be determined based on differences between successive frames of video data. For example, the difference between corresponding blocks in two successive frames may be determined and activity variance values, such as vertical sums of absolute differences, horizontal sums of absolute differences, or a combination thereof, may be determined for corresponding blocks in two successive frames. For example, an image signal processor that includes temporal noise reduction may generate differences between successive frames, or portions thereof, which may include motion compensation, and which may efficiently generate image indications based on the differences between successive frames relative to an image signal processor that omits temporal noise reduction. Generating scene complexity encoding hints based on differences between frames may improve the accuracy of the scene complexity encoding hints relative to scene complexity encoding hints generated based on intra-frame analysis.

An encoder, such as the encoder 1040 shown in FIG. 10, the encoder 1150 shown in FIG. 11, or the encoder 1250 shown in FIG. 12, may encode a group of pictures (GOP), a frame, or a portion thereof, such as a frame of a video sequence. The encoder may receive source image data, such as processed image data generated by the image signal processor, and corresponding source image indications, which may include the processed image indications, such as the activity variance values generated and stored by the image signal processor for the blocks of the frame, for the frame, or for the sequence of frames, as encoding hints. The encoder may read the source image data and the corresponding source image indications, such as from an external memory, and the encoder may determine or adjust one or more encoding parameters, such as bit allocation or quantization parameters, for encoding one or more blocks of a frame based on the activity variance values.

For example, the encoder may allocate bits for encoding a portion of a frame, such as a block of a frame based on a difference between an activity variance value for the portion of the frame and an average activity variance value for the frame, or another threshold. The bit allocation may be proportional to the difference in activity variance. For example, the activity variance value for a first portion of the frame may exceed the average activity variance value for the frame, the activity variance value for a second portion of the frame may be within, such as equal to or less than, the average activity variance value for the frame, and the bit allocation for the first portion of the frame may be greater than the bit allocation for the second portion of the frame.

In another example, the encoder may allocate bits for encoding a frame from a sequence of frames based on a difference between an average activity variance value for the frame and an average activity variance value for the sequence of frames, or another threshold. The bit allocation may be proportional to the difference in activity variance. For example, the activity variance value for a first frame from the sequence of frames may exceed the average activity variance value for the sequence of frames, the activity variance value for a second frame from the sequence of frames may be within, such as equal to or less than, the average activity variance value for the sequence of frames, and the bit allocation for the first frame may be greater than the bit allocation for the second frame.

In some implementations, encoding may include allocating bits based on differences between an average variance for a sequence of frames and an average variance for a frame from the sequence of frames, and may omit allocating bits based on differences between a variance for a portion of the frame and an average variance for the frame.

In some implementations, encoding may include allocating bits based on differences between a variance for a portion of a frame and an average variance for the frame, and may omit allocating bits based on differences between an average variance for a sequence of frames and the average variance for the frame.

In some implementations, encoding may include allocating bits based on differences between an average variance for a sequence of frames and an average variance for a frame from the sequence of frames, and allocating bits based on differences between a variance for a portion of the frame and the average variance for the frame.

Figure 14:
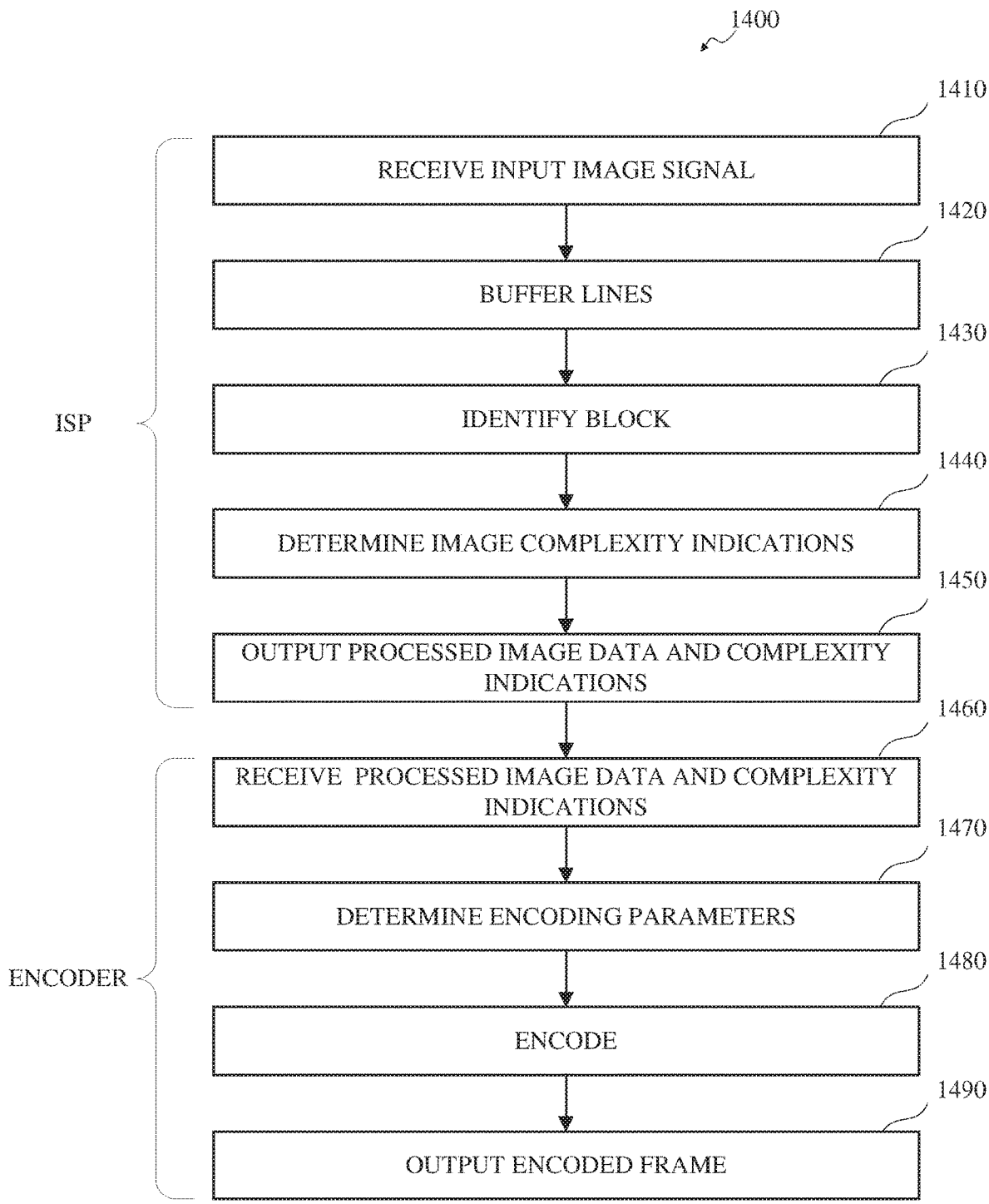
FIG. 14 shows an example of image signal processing and encoding with image signal processing-based encoding hints for bitrate control in accordance with this disclosure.

FIG. 14 shows an example of image signal processing and encoding with image signal processing-based encoding hints for bitrate control 1400 in accordance with this disclosure. Image signal processing and encoding with image signal processing-based encoding hints for bitrate control 1400 may be implemented in an image capture apparatus, such as the image capture apparatus 110 shown in FIG. 1 or the dual lens image capture apparatus 300 shown in FIG. 3, or an image capture device, such as one of the image capture devices 130, 132, 134 shown in FIG. 1 or the image capture device 200 shown in FIG. 2.

For example, an image capture device may include an image signal processor, such as the image signal processor 410 shown in FIG. 4, the image signal processor 500 shown in FIG. 5, the image signal processor 1020 shown in FIG. 10, or the image signal processor 1220 and the image analysis unit 1240 shown in FIG. 12, and an encoder, such as the encoder 420 shown in FIG. 4, the encoder 1040 shown in FIG. 10, or the encoder 1250 shown in FIG. 12, and the image capture device may implement image signal processing and encoding with image signal processing-based encoding hints for bitrate control 1400.

Figure 15:
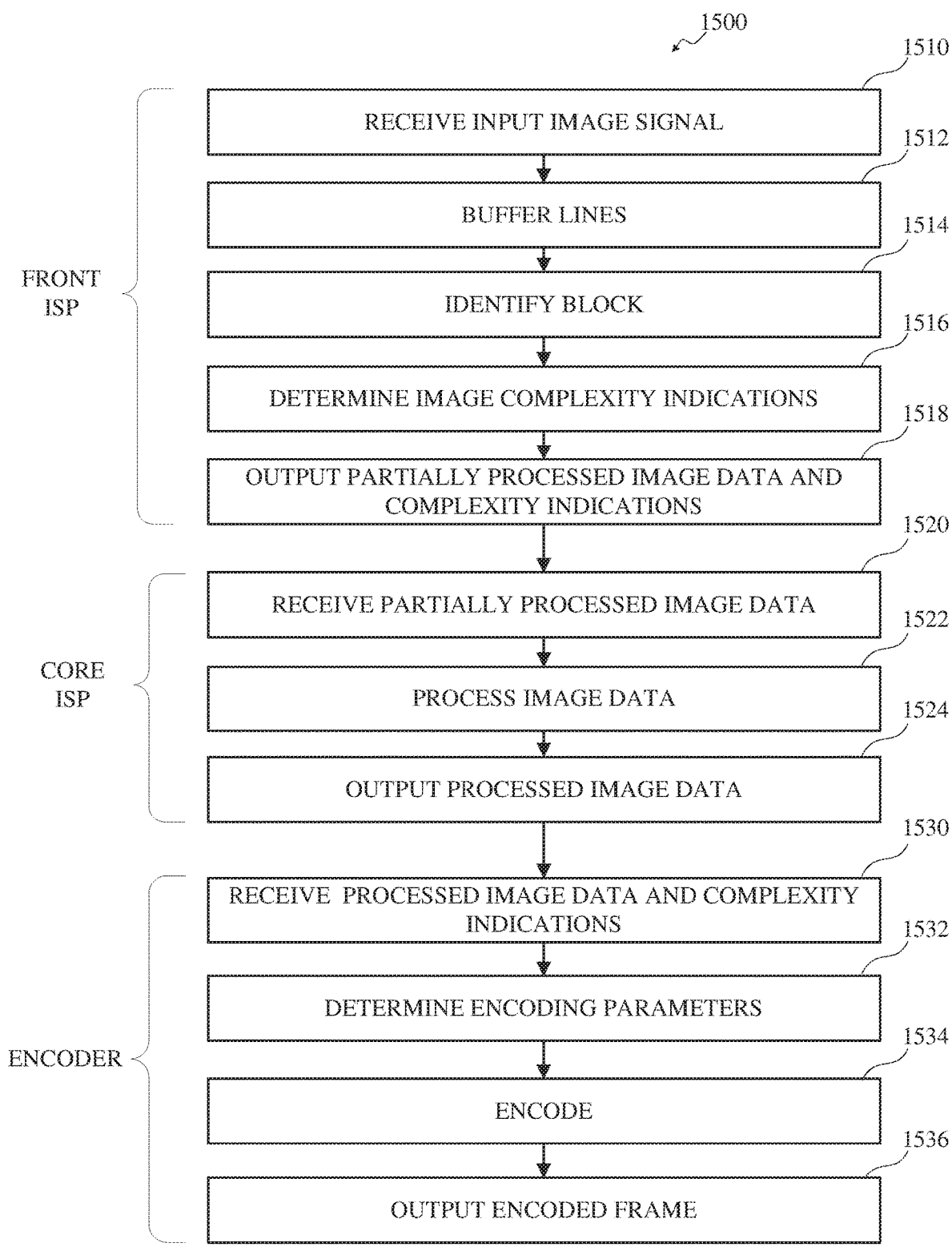
FIG. 15 shows an example of image signal processing and encoding with image signal processing-based encoding hints for bitrate control with multi-pass image signal processing in accordance with this disclosure.

For simplicity and clarity, an example of image signal processing and encoding with image signal processing-based encoding hints for bitrate control with multi-pass image signal processing, which may be implemented using the front image signal processor 1120, the core image signal processor 1140, and the encoder 1150 shown in FIG. 11 is shown in FIG. 15.

Image signal processing and encoding with image signal processing-based encoding hints for bitrate control 1400 may include receiving an input image signal at 1410, buffering one or more lines of the input image signal at 1420, identifying a block at 1430, determining an image indication at 1440, outputting processed image data and image indications at 1450, receiving the processed image data and image indications at 1460, determining encoding parameters at 1470, generating an encoded frame at 1480, outputting the encoded frame at 1490, or a combination thereof.

The image signal processor may receive an input image signal at 1410. For example, the image signal processor may receive the input image signal as shown at 1050 in FIG. 10 from an image sensor, such as the image sensor 1010 shown in FIG. 10. For example, the image sensor may generate an image signal as an ordered, such as raster order, sequence of pixel, or sub-pixel, values, and may send the image signal to the image signal processor as the input image signal. In some implementations, the input image signal may represent a respective pixel value in a defined format, such as in a RAW image signal format. In some implementations, the input image signal may include an image, or frame, or a portion thereof, which may be one of a sequence of images of a video. For example, the image sensor may send the input image signal to the image signal processor on a pixel-by-pixel or line-by-line basis.

The image signal processor may buffer one or more lines of the input image signal at 1420. For example, the image signal processor may include an internal storage unit, such as the internal storage unit 1022 shown in FIG. 10, and the image signal processor may buffer the one or more lines of the input image signal in the internal storage unit. In some implementations, lines of the input image signal may be buffered in the internal storage unit on a rolling basis.

The image signal processor may identify a block at 1430. For example, the internal storage unit may include N, or more, line buffers, such as four or more line buffers, the image signal processor may buffer N lines of the input image signal in the N line buffers at 1420, and the image signal processor may identify a N×N, such as 4×4, block from the N line buffers at 1430.

The image signal processor may determine one or more image indications at 1440. For example, the image signal processor may determine one or more scene complexity indication values, such as one or more activity variance values as the image indications at 1440. For example, determining the image indications at 1440 may be similar to determining image indications described in relation to FIG. 13, and may include identifying image indications for a portion of a frame, such as an activity variance value for a block of the frame, identifying image indications for the frame, such as an average activity variance value for the frame, identifying image indications for a sequence of frames, such as an average activity variance value for the sequence of frames, or a combination thereof, which may include identifying relative image indications, such an activity variance value indicating a relative activity variance for a block of a frame based on a difference between an activity variance value for the block and an average activity variance value for the frame.

Examples of determining, or identifying, image indications, or encoding hints, are described in relation to the image indications 1062 shown in FIG. 10 and the image indications 1264 and 1272 shown in FIG. 12.

Although not shown separately in FIG. 14, in some implementations, the image signal processor may generate processed image data based on the input image data. For example, the image signal processor may process the image data as shown in FIG. 5 to generate the processed image data. Examples of determining, or identifying, processed image data are described in relation to the processed image data 1060 shown in FIG. 10 and the processed image data 1262 shown in FIG. 12.

The image signal processor may output the processed image data, the image indications, or both at 1450. For example, the image signal processor may store the processed image data in a shared memory, such as the shared memory 1030 shown in FIG. 10 or the shared memory 1230 shown in FIG. 12, accessible by the encoder, or may send the processed image data, or a portion thereof, to the encoder directly, which may omit storing the processed image data, or a portion thereof, in the shared memory.

In an example, the image signal processor may store the image indications in the shared memory as encoding hints.

In some implementations, the image signal processor may store the processed image indications in the shared memory independently of storing the processed image data in the shared memory. In some implementations, storing the processed image indications may include storing information indicating an association between the encoding hints determined at 1440 and the block identified at 1430.

Although not expressly shown in FIG. 14, the image signal processor may process multiple portions of the input image signal, which may include iteratively performing one or more of receiving the input image signal at 1410, buffering the input image signal, or a portion thereof, at 1420, identifying blocks at 1430, determining image indications at 1440, and outputting partially processed image data and image indications at 1450.

For example, the image signal processor may receive an input image signal as a data sequence including a series of frames, such as a group of pictures, at 1410. The image signal processor may buffer the input image signal at 1412 for each respective frame, which may include buffering the input image signal for a frame as a series or sequence of groups of sets of lines, wherein a respective buffered set of lines is output prior to, or concurrent with, buffering a subsequent set of lines. For a respective buffered set of lines, the image signal processor may identify a sequence, such as a horizontal sequence, of blocks at 1414, and may determine image indications for each respective block at 1416. A buffered set of lines may be output subsequent to, or concurrent with, identifying respective blocks from the buffered lines at 1414 and determining respective image indications for respective blocks from the buffered lines at 1416.

Although not shown separately in FIG. 14, determining the image indications at 1416 may include determining aggregate image indications, relative image indications, or both. For example, the image signal processor or the indication analysis unit may identify image indications for each block of a frame, determine aggregate image indications for the frame, such as an average of a respective image indication for the blocks from the frame, and determine relative image indications for each block based on a comparison of the image indication determined for the block and the average image indication for the frame. In some implementations, determining the image indications at 1416 may include determining aggregate image indications, relative image indications, or both for a sequence of frames, which may include determining aggregate image indications, relative image indications, or both for each frame from the sequence of frames.

For example, image signal processing and encoding with image signal processing-based encoding hints for bitrate control 1400 may be implemented in an image signal processing and encoding pipeline, such as the image signal processing and encoding pipeline 1000 shown in FIG. 10, that includes an image signal processor and the image signal processor may generate image indications for each respective block from each respective frame from a sequence of frames, relative image indications for each respective block from each respective frame from the sequence of frames, aggregate image indications for each respective frame from the sequence of frames, and aggregate image indications for the sequence of frames.

image signal processing and encoding with image signal processing-based encoding hints for bitrate control 1400 may be implemented in an image signal processing and encoding pipeline, such as the image signal processing and encoding pipeline 1200 shown in FIG. 12, that includes an image signal processor and an indication analysis unit, the image signal processor may generate image indications for each respective block from each respective frame from a sequence of frames, and the indication analysis unit may generate relative image indications for each respective block from each respective frame from the sequence of frames, aggregate image indications for each respective frame from the sequence of frames, and aggregate image indications for the sequence of frames.

The encoder may receive source image data, such as source image data for a frame of a video sequence, source image indications, such as scene complexity image indications, corresponding to the source image data, or both at 1460. For example, the encoder may read, from the shared memory, the source image data, which may include the processed image data stored in the shared memory by the image signal processor at 1450. In an example, the encoder may read, from the shared memory, the source image indications, which may include the encoding hint stored in the shared memory by the image signal processor at 1450.

The encoder may determine one or more encoding parameters at 1470. For example, the encoder may determine a bit allocation, a quantization level, or both for encoding a portion of a frame, such as a block from the frame, or for encoding the frame as a frame from a sequence of frames, based on the encoding hints identified by the image signal processor at 1440.

For example, although not shown separately in FIG. 14, the encoder may identify a block from a frame, which may correspond with the block identified by the image signal processor at 1430; the encoder may identify the encoding hints generated for the block, for the frame, for the sequence of frames, or a combination thereof, determined by the image signal processor at 1440, and the encoder may determine encoding parameters for the block, for the frame, for the sequence of frames, or for a combination thereof based on the respective corresponding encoding hints at 1470.

Determining the encoding parameters at 1470 may include identifying a cardinality of bits to allocate to respective portions of a frame, such as respective blocks, proportionally to the magnitude of the respective relative scene complexity image indication for the respective portion of the frame.

For example, a defined cardinality of bits may be available for encoding a sequence of frames, such as a group of pictures. The encoding hints read at 1460 may include an aggregate, or average, scene complexity image indication for the sequence of frames, and a relative scene complexity image indication for each frame from the sequence of frames, and the encoder may allocate, at 1470, a portion of the defined cardinality of bits available for encoding the sequence of frames to each respective frame from the sequence of frames in proportion to the magnitude of the respective relative scene complexity image indication for each respective frame prior to, or concurrent with, receiving the processed image data, or a portion thereof, for a frame, such as the first frame, from the sequence of frames.

The encoding hints read at 1460 may include relative scene complexity image indications for respective portions, such as for a block, of the frame, and the encoder may allocate, at 1470, a portion of the cardinality of bits allocated to frame to the respective portion in proportion to the magnitude of the respective relative scene complexity image indication for the respective portion of the frame prior to, or concurrent with receiving the processed image data for the respective portion of the frame.

In some implementations, the encoding hints read at 1460 may include respective scene complexity image indication for each portion of the frame and the cardinality of bits to allocate to a respective portion of the frame may be determined based on the encoding hints for the respective portion of the frame.

The size, spatially or in pixels, of portions, such as blocks, of a frame may be variable and may include symmetric, such as N×N, and asymmetric sizes, such as N×M. For example, a frame may include a 4×4 block, a 32×8 block, a 16×64 block, or any other combination of portion sizes.

In some implementations, the resources, such as memory and processor utilization, for determining encoding parameters, at 1470, based on encoding hints including respective scene complexity image indications for each portion of the frame may be reduced by grouping or categorizing the portions of the frame, including information indicating the respective groupings in the encoding hints output at 1450, which may include relative scene complexity image indications for each group, and omitting including the respective scene complexity image indications for each portion of the frame in the encoding hints.

For example, the image signal processor, the indication analysis unit, or a combination of the image signal processor and the indication analysis unit may generate a histogram for a frame based on the scene complexity image indications for each portion of the frame, and may group blocks from the frame into categories, such as two or more categories, based on the histogram. Grouping the blocks based on the histogram may include using a band-pass filter based on the histogram, which may include filtering blocks having relatively low scene complexity image indications, such as a scene complexity image indication within, such as equal to or less than, a minimum threshold, and blocks having relatively high scene complexity image indications, such as a scene complexity image indication of at least, such as greater than or equal to, a maximum threshold, into an average-allocation group, and passing blocks having scene complexity image indications between the minimum threshold and the maximum threshold into an activity-allocation group.

The image signal processor, the indication analysis unit, or a combination of the image signal processor and the indication analysis unit may include information indicating the groupings in the encoding hints output at 1450. Scene complexity image indications for the portions of the frame included in the average-allocation group may be omitted from the encoding hints output at 1450 and scene complexity image indications for the portions of the frame included in the activity-allocation group may be included in the encoding hints output at 1450

The encoder may read the grouping information at 1460 as encoding hints, which may include reading the scene complexity image indications for the portions of the frame included in the activity-allocation group, and may omit reading scene complexity image indications for the portions of the frame included in the average-allocation group, and may allocate bits to the image portions included in the respective groups at 1470. For example, the encoder may allocate bits to image portions from the average-allocation group using a first type of bit allocation, such as average bit distribution, and may allocate bits to image portions from the activity-allocation group using a second type of bit allocation, such as activity based bit distribution.

Average bit distribution may be similar to constant bitrate distribution. For example, include average bit distribution may include allocating each frame from a sequence of frames a cardinality of bits from a cardinality of bits available for encoding the sequence of frames. The cardinality of bits allocated to each frame may be determined by dividing the cardinality of bits available for encoding the sequence of frames by the cardinality of frames in the sequence of frames.

Average bit distribution may include allocating each portion of a frame a respective cardinality of bits from the cardinality of bits allocated for encoding the frames. The cardinality of bits allocated to each portion of the frame may be determined by dividing the cardinality of bits available for encoding the frame by the cardinality of portions in the frame. For example, the average-allocation group may be allocated a cardinality of bits based on the spatial proportion of the frame included in the average-allocation group, and each respective portion of the frame included in the average-allocation group may be allocated an equivalent cardinality of bits identified by dividing cardinality of bits allocated to the average-allocation group by the cardinality of portions included in the average-allocation group. Bit allocations for variable size portions having sizes differing from a defined minimum size, such as 4×4, may be proportional to the respective portion size. For example, the bits allocated for an 8×8 block may be equivalent to the bits allocated to four 4×4 blocks.

Activity based bit distribution may include bit allocation based on the respective scene complexity image indications for the portions of the frame included in the moderate-complexity group. For example, the activity-allocation group may be allocated a cardinality of bits based on the spatial proportion of the frame included in the activity-allocation group, and each respective portion of the frame included in the activity-allocation group may be allocated a respective cardinality of bits from the cardinality of bits allocated to the activity-allocation group based on a relative magnitude of the respective relative scene complexity image indication for the respective portion of the frame, which may be relative to an average scene complexity image indication for the activity-allocation group.

In another example, the image signal processor, the indication analysis unit, or a combination of the image signal processor and the indication analysis unit may group the scene complexity image indications for respective portions of a frame based on the magnitude of the respective scene complexity image indications, which may omit using a histogram. For example, the scene complexity image indications may have a defined accuracy, such as eight bits, which may represent a defined cardinality of discrete levels, such as 256 levels, of activity, and the respective portions of the frame may be grouped based on the corresponding level of activity. The encoding hints output by the image signal processor, the indication analysis unit, or a combination of the image signal processor and the indication analysis unit at 1450 may indicate the blocks included in the respective complexity groups, and the encoder may allocate bits, at 1470, for each portion of the frame based on the respective complexity groupings.

In an example, two complexity groups may be identified and the image signal processor, the indication analysis unit, or a combination of the image signal processor and the indication analysis unit may include portions of the frame having scene complexity image indications indicating a level of activity between zero and 127, or between 1 and 128, may be grouped into a low-complexity group and portions of the frame having scene complexity image indications indicating a level of activity between 128 and 255, or between 129 and 256, may be grouped into a high-complexity group.

In another example, sixteen complexity groups may be identified and the image signal processor, the indication analysis unit, or a combination of the image signal processor and the indication analysis unit may include portions of the frame having scene complexity image indications indicating a level of activity between 0 and 15, or between 1 and 16, in a first-complexity group, portions of the frame having scene complexity image indications indicating a level of activity between 16 and 31, or between 17 and 32, in a second-complexity group, portions of the frame having scene complexity image indications indicating a level of activity between 32 and 47, or between 33 and 48, in a third-complexity group, portions of the frame having scene complexity image indications indicating a level of activity between 48 and 63, or between 49 and 64, in a fourth-complexity group, portions of the frame having scene complexity image indications indicating a level of activity between 64 and 79, or between 65 and 80, in a fifth-complexity group, portions of the frame having scene complexity image indications indicating a level of activity between 80 and 95, or between 81 and 96, in a sixth-complexity group, portions of the frame having scene complexity image indications indicating a level of activity between 96 and 111, or between 97 and 112, in a seventh-complexity group, portions of the frame having scene complexity image indications indicating a level of activity between 112 and 127, or between 113 and 128, in an eighth-complexity group, portions of the frame having scene complexity image indications indicating a level of activity between 128 and 143, or between 129 and 144, in a ninth-complexity group, portions of the frame having scene complexity image indications indicating a level of activity between 144 and 159, or between 145 and 160, in a tenth-complexity group, portions of the frame having scene complexity image indications indicating a level of activity between 160 and 175, or between 161 and 176, in a eleventh-complexity group, portions of the frame having scene complexity image indications indicating a level of activity between 176 and 191, or between 177 and 192, in a twelfth-complexity group, portions of the frame having scene complexity image indications indicating a level of activity between 192 and 207, or between 193 and 208, in a thirteenth-complexity group, portions of the frame having scene complexity image indications indicating a level of activity between 208 and 223, or between 209 and 224, in a fourteenth-complexity group, portions of the frame having scene complexity image indications indicating a level of activity between 224 and 239, or between 225 and 240, in a fifteenth-complexity group, and portions of the frame having scene complexity image indications indicating a level of activity between 240 and 255, or between 241 and 256, in a sixteenth-complexity group.

The encoder may generate an encoded frame at 1480. For example, the encoder may generate an encoded frame by encoding the frame received at 1460 based on the encoding parameter determined at 1470.

The encoder may output the encoded frame at 1490. For example, the encoder may store the encoded frame in the shared memory. In an example, the encoder may transmit, such as via wireless communications and/or a network such as the internet, the encoded frame to another device, such as a decoder, for subsequent decoding and presentation to a user of the other device.

FIG. 15 shows an example of image signal processing and encoding with image signal processing-based encoding hints for bitrate control with multi-pass image signal processing 1500 in accordance with this disclosure. The image signal processing and encoding with image signal processing-based encoding hints for bitrate control with multi-pass image signal processing 1500 shown in FIG. 15 may be similar to the image signal processing and encoding with image signal processing-based encoding hints for bitrate control 1400 shown in FIG. 14, except as described herein.

For example, image signal processing and encoding with image signal processing-based encoding hints for bitrate control with multi-pass image signal processing 1500 may be implemented in an image capture apparatus, such as the image capture apparatus 110 shown in FIG. 1 or the dual lens image capture apparatus 300 shown in FIG. 3, or an image capture device, such as one of the image capture devices 130, 132, 134 shown in FIG. 1 or the image capture device 200 shown in FIG. 2, which may include a front image signal processor, such as the front image signal processor 1120, and a core image signal processor, such as the core image signal processor 1140 shown in FIG. 11, and an encoder, such as the encoder 1150 shown in FIG. 11.

Image signal processing and encoding with image signal processing-based encoding hints for bitrate control with multi-pass image signal processing 1500 may include receiving an input image signal at 1510, buffering a portion, such as one or more lines, of the input image signal at 1512, identifying a block at 1514, determining an image indication at 1516, outputting partially processed image data and image indications at 1518, receiving the partially processed image data at 1520, generating processed image data at 1522, outputting the processed image data at 1524, receiving the processed image data and image indications at 1530, determining encoding parameters at 1532, generating an encoded frame at 1534, outputting the encoded frame at 1534, or a combination thereof.

The front image signal processor may receive an input image signal at 1510. Receiving the input image signal at 1510 may be similar to receiving the input image signal as shown at 1410 in FIG. 14, except as described herein. For example, as shown in FIG. 15, the front image signal processor may receive the input image signal as shown at 1160 in FIG. 11 from an image sensor, such as the image sensor 1110 shown in FIG. 11.

The front image signal processor may buffer a portion, such as one or more lines, of the input image signal at 1512. Buffering a portion of the input image signal at 1512 may be similar to the buffering shown at 1420 in FIG. 14, except as described herein. For example, as shown in FIG. 15, the front image signal processor may include an internal storage unit, such as the internal storage unit 1122 shown in FIG. 11, and the front image signal processor may buffer the one or more lines of the input image signal in the internal storage unit. In some implementations, lines of the input image signal may be buffered in the internal storage unit on a rolling basis.

The front image signal processor may identify a spatial portion of the input image signal, such as a block, at 1514. Identifying the portion of the input image signal at 1514 may be similar to the block identification shown at 1430 in FIG. 14, except as described herein. For example, as shown in FIG. 15, the internal storage unit may include N, or more, line buffers, such as four or more line buffers, the front image signal processor may buffer N lines of the input image signal in the N line buffers at 1512, and the front image signal processor may identify a N×N, such as 4×4, block from the N line buffers at 1514.

The front image signal processor may determine one or more image indications for the identified block at 1516. Determining the image indications at 1516 may be similar to the image indication determination shown at 1440 in FIG. 14, except as described herein. For example, as shown in FIG. 15, the front image signal processor may determine one or more scene complexity indication values, such as one or more activity variance values, as the image indications for the block at 1516. For example, determining the image indications at 1516 may include identifying image indications for a portion of a frame, such as an activity variance value for a block of the frame. An example of determining, or identifying, image indications, or encoding hints, is described in relation to the image indications 1164 shown in FIG. 11.

Although not shown separately in FIG. 15, the front image signal processor may generate partially processed image data based on the input image data, which may include first-pass processing the image data. For example, generating the partially processed image data may be similar to generating the partially processed image data 1162 shown in FIG. 11.

The front image signal processor may output the partially processed image data, the processed image indications, or both at 1518. For example, the front image signal processor may store the partially processed image data, the processed image indications, or both in a shared memory, such as the shared memory 1130 shown in FIG. 11, accessible by the core image signal processor.

In an example, the front image signal processor may store the image indications in the shared memory as encoding hints. In some implementations, the front image signal processor may store the processed image indications in the shared memory independently of storing the processed image data in the shared memory. In some implementations, storing the processed image indications may include storing information indicating an association between the encoding hints determined at 1516 and the corresponding portion of the input image signal, such as the block identified at 1514.

Although not expressly shown in FIG. 15, the front image signal processor may process multiple portions of the input image signal, which may include iteratively performing one or more of receiving the input image signal at 1510, buffering the input image signal, or a portion thereof, at 1512, identifying blocks at 1514, determining image indications at 1516, and outputting partially processed image data and image indications at 1518.

For example, the front image signal processor may receive an input image signal as a data sequence including a series of frames, such as a group of pictures, at 1510. The front image signal processor may buffer the input image signal at 1512 for each respective frame, which may include buffering the input image signal for a frame as a series or sequence of groups of sets of lines, wherein each buffered set of lines is output prior to, or concurrent with, buffering a subsequent set of lines. For a respective buffered set of lines, the front image signal processor may identify a sequence, such as a horizontal sequence, of blocks at 1514, and may determine image indications for each respective block at 1516. A buffered set of lines may be output subsequent to, or concurrent with, identifying each block from the buffered lines at 1514 and determining respective image indications for each block from the buffered lines at 1516.

Although not shown separately in FIG. 15, determining the image indications at 1516 may include determining aggregate image indications, relative image indications, or both. For example, the front image signal processor may identify image indications for each block of a frame, determine aggregate image indications for the frame, such as an average of a respective image indication for the blocks from the frame, and determine relative image indications for each block based on a comparison of the image indication determined for the block and the average image indication for the frame. In some implementations, determining the image indications at 1516 may include determining aggregate image indications, relative image indications, or both for a sequence of frames, which may include determining aggregate image indications, relative image indications, or both for each frame from the sequence of frames.

The core image signal processor may receive the partially processed image data at 1520. For example, the core image signal processor may read the partially processed image data, such as the partially processed image data for a frame, stored in the shared memory at 1518 by the front image signal processor.

The core image signal processor may generate processed image data at 1522, which may include second-pass processing of the image data. For example, the core image signal processor may generate the processed image data by performing noise reduction, such as the three-dimensional noise reduction described in relation to the three-dimensional noise reduction unit 540 shown in FIG. 5, on the partially processed image data.

The core image signal processor may output the processed image data at 1524. For example, the core image signal processor may output the processed image data to an encoder.

In some implementations, receiving the partially processed image data at 1520, generating processed image data at 1522, and outputting the processed image data at 1524 may be performed iteratively for portions of the image data. For example, the core image signal processor may read one or more pixels, one or more lines, one or more blocks, or one or more frames at 1520, may generate the processed image data for one or more pixels, one or more lines, one or more blocks, or one or more frames at 1522, may output the processed image data for one or more pixels, one or more lines, one or more blocks, or one or more frames at 1522, prior to processing a subsequent portion of the image data.

The encoder may receive source image data, such as source image data for a frame of a video sequence, source image indications, such as scene complexity image indications, corresponding to the source image data, or both at 1530. For example, the encoder may receive, as the source image data, or a portion thereof, the processed image data output by the core image signal processor at 1524, and the encoder may read, from the shared memory, the source image indications, which may include the encoding hints stored in the shared memory by the front image signal processor at 1518. In some implementations, the encoder may read the source image indications for a frame from the shared memory prior to, or concurrent with, receiving processed image data for the frame from the core image signal processor.

The encoder may determine one or more encoding parameters at 1532. Determining the encoding parameters at 1532 may be similar to the encoding parameter determination shown at 1470 in FIG. 14, except as described herein. For example, as shown in FIG. 15, the encoder may determine a bit allocation, a quantization level, or both for encoding a portion of a frame, such as a block from the frame, or for encoding the frame as a frame from a sequence of frames, based on the encoding hints identified by the front image signal processor at 1516.

Although not shown separately in FIG. 15, the encoder may identify a block from a frame from the processed image data output by the core image signal processor at 1524, which may correspond to the block identified by the front image signal processor at 1514; the encoder may identify the encoding hints generated for the block, for the frame, for the sequence of frames, or a combination thereof, determined by the front image signal processor at 1516, and the encoder may determine encoding parameters for the block, for the frame, for the sequence of frames, or for a combination thereof based on the respective corresponding encoding hints at 1532.

The encoder may determine encoding parameters at 1532 based on encoding hints read from shared memory at 1530 subsequent to the front image signal processor outputting the encoding hints to the shared memory at 1518 and prior to, or concurrent with, receiving a portion of a frame of processed image data output by the core image signal processor at 1524.

The encoder may generate an encoded frame, or a portion thereof, at 1534 using single-pass encoding. Generating an encoded frame, or a portion thereof, at 1534 may be similar to the encoding shown at 1480 in FIG. 14, except as described herein. For example, as shown in FIG. 15, the encoder may generate an encoded frame by encoding the frame received at 1530 output by the core image signal processor at 1524 based on the encoding parameter determined at 1532. Encoding the frame received at 1530 based on the encoding parameter determined at 1532 may include using a single-pass, which may omit using a second-pass or a look-ahead pass.

For example, the encoder may receive a portion, such as a block, of a frame at 1530 and may identify encoding hints at 1530 for the portion of the frame, the frame, a sequence of frames, or a combination thereof, which may include scene complexity image indications, such as activity variance values, for the portion of the frame, relative scene complexity image indications for the portion of the frame, aggregate scene complexity image indications for the frame, or a combination thereof, the encoder may determine the encoding parameters for the portion of the frame at 1532 based on corresponding encoding hints, and the encoder may generate encoded data for the portion of the frame at 1534 by encoding the portion of the frame received at 1530 based on the encoding parameters identified at 1532.

The encoder may output the encoded frame at 1536. For example, the encoder may store the encoded frame in the shared memory. In an example, the encoder may transmit, such as via wireless communications and/or a network such as the Internet, the encoded frame to another device, such as a decoder, for subsequent decoding and presentation to a user of the other device.

Figure 16:
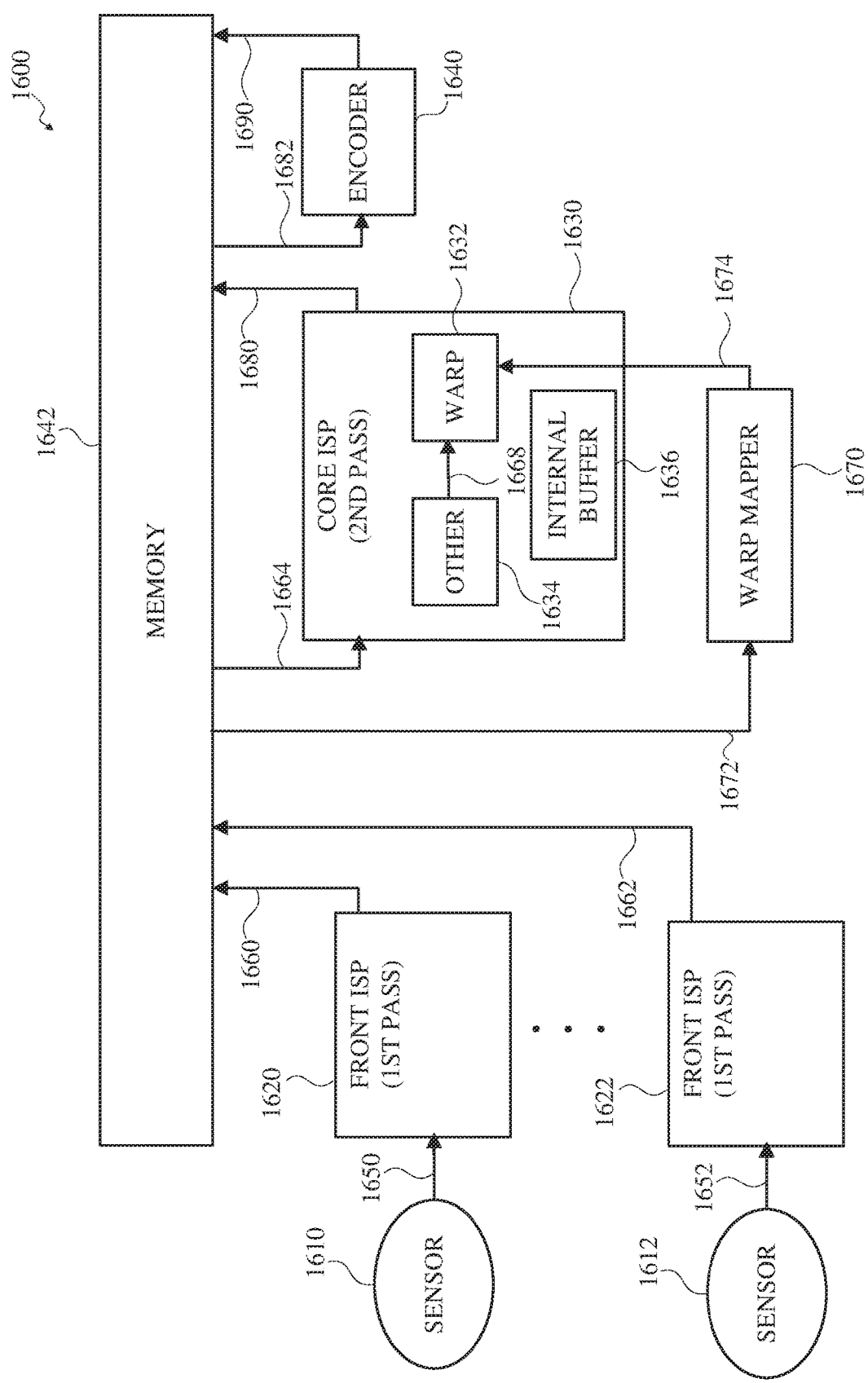
FIG. 16 is a block diagram of an example of an image signal processing and encoding pipeline, utilizing a warp mapping.

FIG. 16 is a block diagram of an example of an image signal processing and encoding pipeline 1600 in accordance with implementations of this disclosure. In some implementations, the image signal processing and encoding pipeline 1600 may be included in an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3. In some implementations, the image signal processing and encoding pipeline 1600 shown in FIG. 16 may be similar to the image processing and coding pipeline 400 shown in FIG. 4, except as described herein.

An image signal processor may implement multi-pass processing in two stages. A first stage of the image signal processor includes front image signal processors 1620 and 1622 that perform first-pass processing on images captured by respective image sensors 1610 and 1612.

A second stage of the image signal processor includes a core image signal processor 1630 that performs second-pass processing on partially processed image data 1664, including warping and blending the images using warp module 1632, to produce output image data 1680, such as an output image that combines the fields of view from the multiple image sensors 1610 and 1612. The output image data 1680 may then be passed to an encoder 1640 for encoding in a compressed format.

Within the core image signal processor 1630, other second-pass functions 1634, such as temporal noise reduction (TNR) are performed, some of which may be more effectively or efficiently performed prior to warping and blending, using the warp module 1632, the images from the image sensors 1610 and 1612. Processed image data 1668 is passed directly, such as using an internal buffer 1636, from the other second-pass image processing functions 1634 to the warp and blend functions of the warp module 1632 as it is generated, such as in raster order, avoiding an intermediate write to and read from a shared memory 1642.

Performing the warp and blend functions of the warp module 1632 as the processed image data 1668 is generated, such as in raster order, may be facilitated by a warp mapper 1670 that reads data 1672 for complete images, such as frames of video, from the partially processed image data 1660 and 1662, such as low resolution copies of the images to conserve memory bandwidth and/or reduce processor utilization, and determines warp mappings 1674 for the complete images based on the data 1672 and makes those mappings available to the warp module 1632 in the core image signal processor 1630 by the start of the second-pass processing for the corresponding images in the core image signal processor 1630.

This example configuration of the image signal processing and encoding pipeline 1600 may conserve processing resources, including memory bandwidth and processor time, and/or reduce latency.

The image signal processing and encoding pipeline 1600 includes the two image sensors 1610 and 1612. The input image signal 1650 from the image sensor 1610 is passed to the front image signal processor 1620 for initial processing. For example, the front image signal processor 1620 may be similar to the front image signal processor 510 shown in FIG. 5. The front image signal processor 1620 may process the input image signal 1650 to generate partially processed image data 1660 that may be subject to one or more additional passes of processing in the core image signal processor 1630 before being input to the encoder 1640. One or more frames of partially processed image data 1660 may be concurrently stored in the memory 1642 to await additional processing by the core image signal processor 1630.

In some implementations, the front image signal processor 1620 may determine a low-resolution image based on an image in the input image signal 1650. The low-resolution image may be output as part of the partially processed image data 1660 along with or in lieu of a full resolution image in the partially processed image data 1660. Having a low-resolution image included in the partially processed image data 1660 may facilitate efficient performance of downstream functions in the pipeline 1600.

The input image signal 1652 from the image sensor 1612 is passed to the front image signal processor 1622 for initial processing. For example, the front image signal processor 1622 may be similar to the front image signal processor 510 as shown in FIG. 5. The front image signal processor 1622 may process the input image signal 1652 to generate partially processed image data 1662 that may be subject to one or more additional passes of processing in the core image signal processor 1630 before being input to the encoder 1640.

One or more frames of partially processed image data 1662 may be concurrently stored in the memory 1642 to await additional processing by the core image signal processor 1630. In some implementations, the front image signal processor 1622 may determine a low-resolution image based on an image in the input image signal 1652. The low-resolution image may be output as part of the partially processed image data 1662 along with or in lieu of a full resolution image in the partially processed image data 1662. Having a low-resolution image included in the partially processed image data 1662 may facilitate efficient performance of downstream functions in the pipeline 1600.

Figure 18:
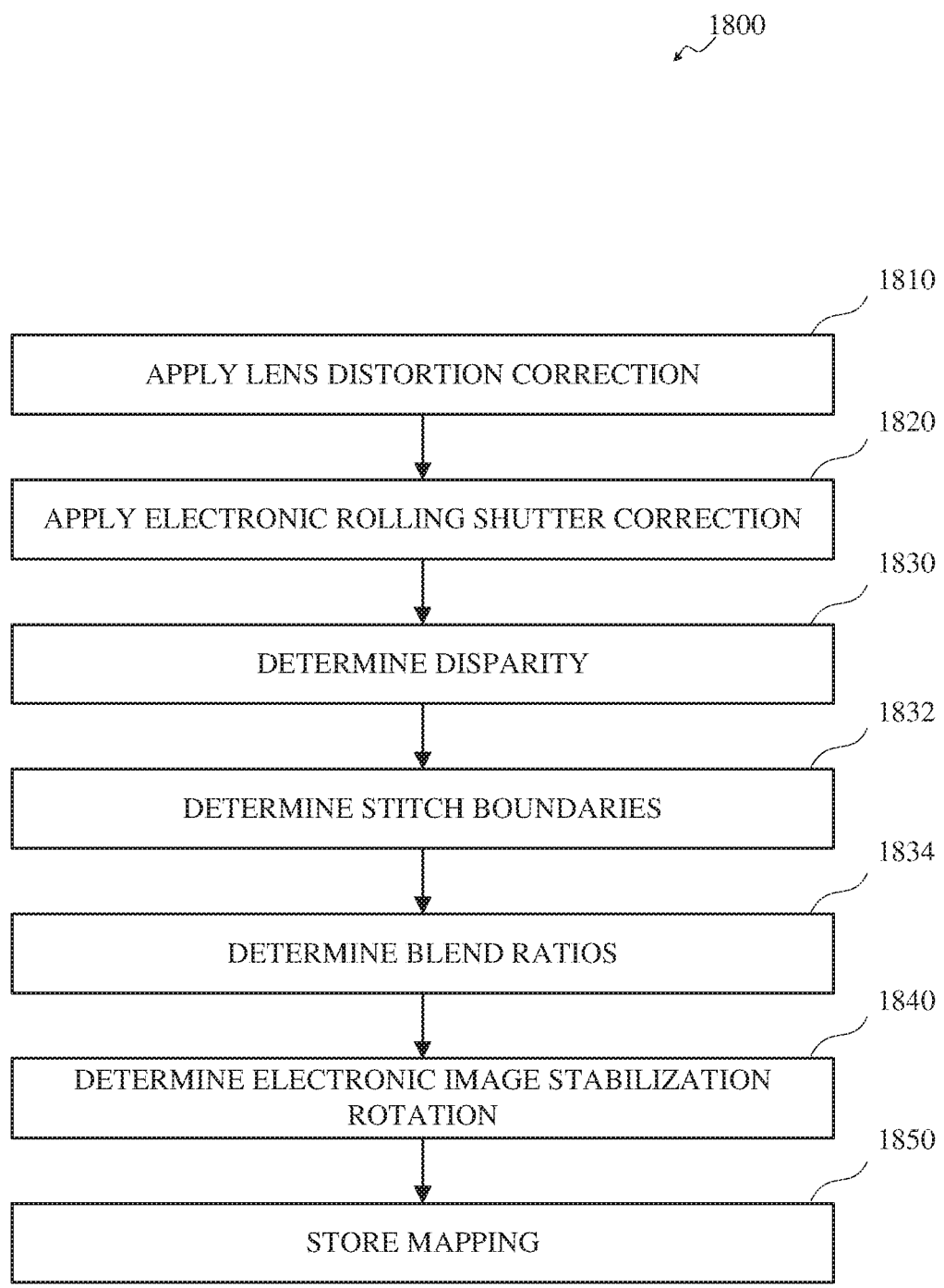
FIG. 18 is a flowchart of an example process for determining a warp mapping.

The warp mapper 1670 may determine the warp mapping 1674 for an image, such as a frame of video, in the partially processed image data 1660 and 1662. For example, the warp mapper 1670 may implement determining a warp mapping 1800 as shown in FIG. 18 to determine the warp mapping 1674 based on data 1672 from the partially processed image data 1660 and 1662.

In some implementations, the warp mapper 1670 may determine a sequence of transformations to be applied by the warp module 1632 to corresponding processed image data 1668 for an image, such as a frame of video, and specify those transformations with the warp mapping 1674. For example, such a sequence of transformations may include lens distortion correction, electronic rolling shutter correction, disparity based alignment and blending of images from multiple image sensors, electronic image stabilization rotation, and/or projection into a chosen output space for resulting output images. Some transformations specified by the warp mapping 1674 may be determined in whole or in part based on motion sensor measurements, such as from a gyroscope and/or accelerometer, associated with an image, such as a frame of video. For example, electronic rolling shutter correction or electronic image stabilization may be based on motion sensor measurements associated with an image. Some transformations specified by the warp mapping 1674 may be determined based on data 1672 for the subject image. For example, a disparity based alignment and blending transformation may analyze data 1672, such as low-resolution images from multiple sensors, for the image to determine disparities and determine an alignment and blending ratios for portions of the input images.

The warp mapping 1674 may include a set of records that specify portions, such as pixels or blocks of pixels, of the input images that are associated with (i.e., will be used to determine) portions, such as pixels or blocks of pixels, of the corresponding output image. The warp mapper 1670 may sort the records of the warp mapping 1674 according to an order, such as a raster order, of the portions of the input images. This sorting of the records of the warp mapping 1674 may facilitate the application of the warp mapping 1674 to processed image data 1668 as it is generated in the same order and fed directly into the warp module 1632.

For example, the warp mapper 1670 may be implemented as part of the image signal processor, such as a component of the core image signal processor 1630. In some implementations (not shown), the warp mapper 1670 may be implemented as software running on an application processor with access to the memory 1642 and the warp mappings 1674 may be passed to the core image signal processor 1630 via the memory 1642. The warp mapper 1670 may be easier or cheaper to update or modify than some implementations of the image signal processor or some implementations of the encoder 1640, such as an encoder that is implemented in hardware and/or provided as object code. The warp mapper 1670 may be modified in order to format output image data 1680 from an image signal processor in a format that an encoder is designed to receive. Using the warp mapper 1670 implemented as software running on an application processor may reduce the cost and delays associated with maintaining the encoding pipeline 1600 as different components in the pipeline 1600 are updated.

The core image signal processor 1630 reads partially processed image data 1664 from the memory 1642 and performs second-pass processing to generate output image data 1680. The warp module 1632 in the core image signal processor 1630 applies one more transformations specified by the warp mapping 1674 to the processed image data 1668 as the processed image data is generated, such as in a raster order, by the other functions 1634 of the core image signal processor 1630. For example, the warp module 1632 may implement applying a warp mapping as shown at 1900 in FIG. 19 to determine output image data 1680 based on portions of the processed image data 1668 as those portions become available.

For example, the core image signal processor 1630 may perform other functions 1634, such as temporal noise reduction, such as other functions of the image signal processor 500 as shown in FIG. 5, to generate the processed image data 1668. The core image signal processor 1630 may include an internal buffer 1636, which may be similar to the internal storage unit 1022 shown in FIGS. 10-12, that stores less than a complete frame of the image data. For example, the internal buffer 1636 may be a line buffer that stores a few lines of pixels from a full resolution input image at any given time.

The processed image data 1668 may be passed directly to the warp module 1632 and the core image signal processor 1630 may omit writing the processed image data 1668 to the memory 1642. For example, one or more blocks of pixels of the processed image data 1668, as they are completed, may be stored in the internal buffer 1636 and read by the warp module 1632. For example, pixels of the processed image data 1668 may be read from the internal buffer 1636 in raster order as those pixels become available. By avoiding an intermediate write to and read from the memory 1642 for the processed image data 1668 as it passes from the other functions 1634 to the warp module 1632, computing resources, such as memory and processor bandwidth, may be conserved.

The encoder 1640 may receive source image data 1682. For example, the encoder 1640 may read the source image data 1682 from the memory 1642. Although described herein as source image data 1682, the source image data 1682 may include the output image data 1680 stored by the core image signal processor 1630 for one or more frames, such as frames of a video sequence.

Although not shown in FIG. 16, in some implementations, the core image signal processor 1630 may omit storing the output image data 1680 in the memory 1642. In some implementations, the encoder 1640 may receive the source image data 1682 directly from the core image signal processor 1630.

In some implementations, the encoder 1640 may read one or more source frames of video data, which may include buffering the source frames, such as in an internal data storage unit of the encoder 1640.

In some implementations, the encoder 1640 may compress the source image data 1682. Compressing the source image data 1682 may include reducing redundancy in the image data. For example, reducing redundancy may include reducing spatial redundancy based on a frame, reducing temporal redundancy based on the frame and one or more previously encoded frames, or reducing both spatial and temporal redundancy.

In some implementations, the encoder 1640 may encode each frame of a video sequence on a block-by-block basis. For example, the encoder 1640 may encode a current block of a current frame from the source image data 1682, which may include generating a predicted block based on previously coded information, such as one or more previously coded and reconstructed blocks or frames. Generating a prediction block may include performing motion compensation, which may include performing motion estimation, which may include identifying a portion, or portions, of one or more previously encoded and reconstructed frames, which may be referred to herein as reference frames, that closely matches the current block. A displacement between a spatial location of the current block in the current frame and a matching portion of the reference frame may be indicated by a motion, or displacement, vector. A difference between the prediction block and the current block may be identified as a residual or a residual block. The residual block may be transformed using a transform, such as a discrete cosign transform (DCT), an asymmetric discrete sine transform (ADST), or any other transform or combination of transforms, to generate a transform block including transform coefficients, which may be represented as a matrix, which may have the size and shape of the residual block. The encoder 1640 may perform quantization to quantize the transform coefficients, which may reduce the accuracy of the encoded data, the bandwidth utilization of the encoded data, or both. The quantized transform coefficients, the motion vectors, other encoding data, or a combination thereof may be entropy coded to generate entropy coded data, which may be referred to herein as the encoded data or the encoded output, and the encoded data may be output by the encoder 1040 as encoded output 1690. Although block-based encoding is described herein, other image coding techniques, such as coding based on arbitrary size and shape units, may be implemented in accordance with this disclosure.

In some implementations, the encoder 1640 may output, such as store, transmit, or both, the encoded data as encoded output 1690. For example, the encoder 1640 may store the encoded data as encoded output 1690 in the memory 1642, may transmit the encoded output 1690 to another device (not shown), or may store the encoded data as encoded output 1690 in the memory 1642 and transmit the encoded output 1690 to another device (not shown).

In some implementations, the encoded output 1690 may be received by a decoder (not shown) and may be decompressed, or decoded, to generate a reconstructed image or video corresponding to the source image data 1682.

In some implementations, one or more elements of encoding the source image data 1682, such as entropy coding, may be lossless. A reconstructed image or video generated based on losslessly encoded image or video data may be identical, or effectively indistinguishable, from the source image data 1682.

In some implementations, one or more elements of encoding the source image data 1682, such as quantization, may be lossy, such that some information, or the accuracy of some information, compressed by lossy compression may be lost or discarded or may be otherwise unavailable for decoding the encoded data. The accuracy with which a reconstructed image or video generated based on encoded image data encoded using lossy compression matches the source image data 1682 may vary based on the amount of data lost, such as based on the amount of compression. In some implementations, the encoder 1640 may encode the processed source image data 1682 using a combination of lossy and lossless compression.

Many variations (not shown) of the image signal processing and encoding pipeline 1600 may be used to implement the techniques described herein. For example, a pipeline may include more than two image sensors, such as six image sensors on the faces of a cube-shaped device, and the image signal processor can warp and blend images from some or all the images sensors. Additional front image signal processors may also be included to handle initial processing for images from additional image sensors. For example, a pipeline may include only a single image sensor and front image signal processor and implement just warp, with no blending of multiple input images.

Figure 17:
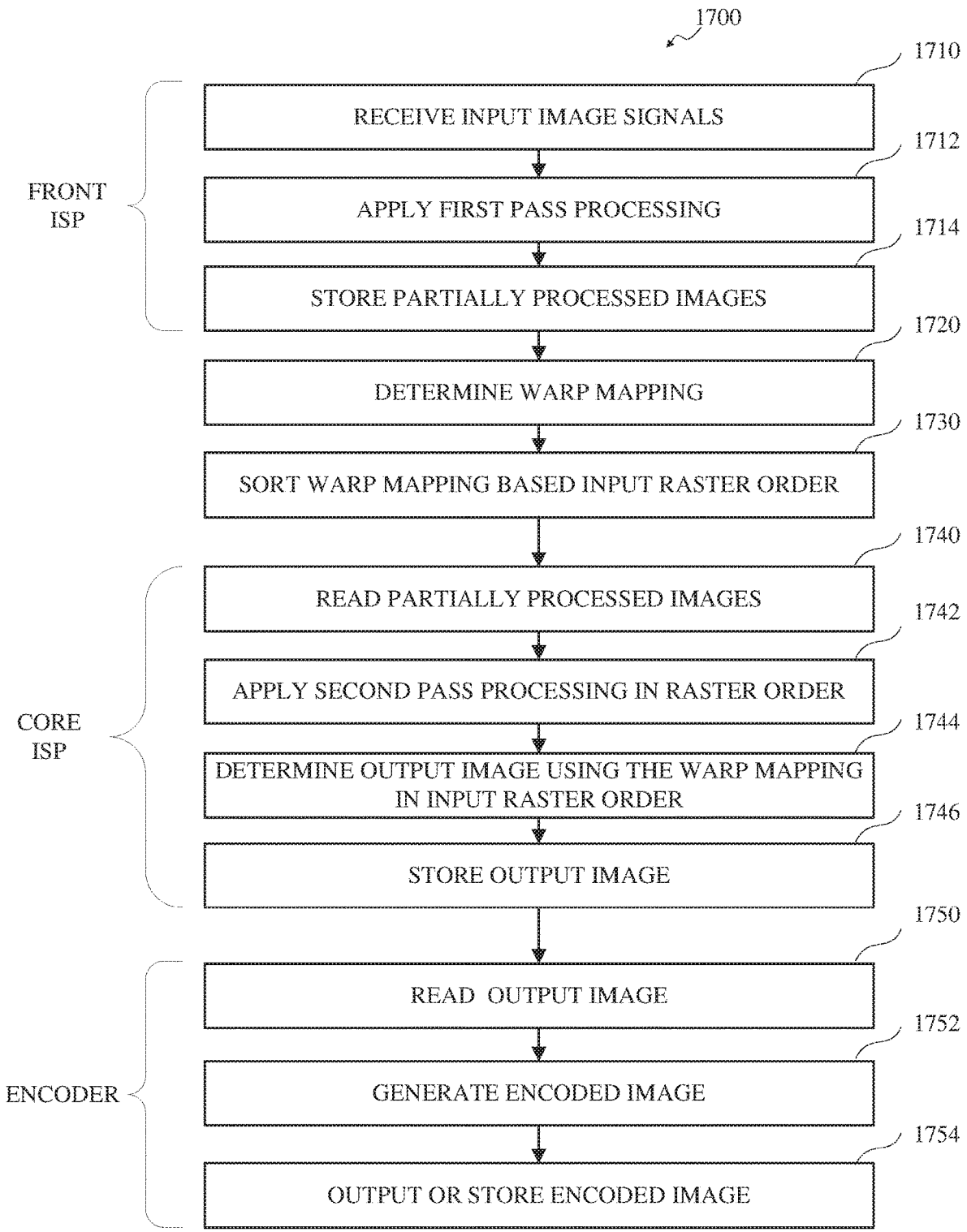
FIG. 17 is a flowchart of an example process for image signal processing and encoding, utilizing a warp mapping.

FIG. 17 is a flowchart of an example of image signal processing and encoding utilizing a warp mapping 1700 in accordance with implementations of this disclosure. Image signal processing and encoding utilizing a warp mapping 1700 may be implemented by a device, such as a device including the image processing and encoding pipeline 1600 shown in FIG. 16. For example, image signal processing and encoding utilizing a warp mapping 1700 may be implemented by an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3.

Image signal processing and encoding utilizing a warp mapping 1700 may include receiving image signals at 1710, such as from one or more image sensors, applying first-pass processing at 1712 to determine partially processed image data for complete images, such as frames of video, and storing the partially processed image data at 1714.

Image signal processing and encoding utilizing a warp mapping 1700 may include determining a warp mapping at 1720 based at least in part on the partially processed image data stored at 1714 and sorting the warp mapping at 1730 according to a raster order of portions, such as pixels or blocks of pixels, of input image(s).

Image signal processing and encoding utilizing a warp mapping 1700 may include reading the partially processed image data from memory at 1740, applying a second pass of processing at 1742 to determine processed image data for portions of the input image(s) in the raster order, determining the output image at 1744 using the warp mapping applied to portions of the processed image data in the raster order, and storing the output image at 1746.

Image signal processing and encoding utilizing a warp mapping 1700 may include reading the output image from memory at 1750, generating an encoded image at 1752 based on the output image, and outputting or storing the encoded image at 1754.

Image signal processing and encoding utilizing a warp mapping 1700 may be implemented by a device including the image processing and encoding pipeline 1600 shown in FIG. 16. For example, image signal processing and encoding utilizing a warp mapping 1700 may be implemented by an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3.

Image signal processing and encoding utilizing a warp mapping 1700 may include receiving, such as by an image signal processor, one or more input images, such as frames of input video, at 1710 from, respectively, one or more image sensors. For example, a front image signal processor, such as the front image signal processor 1620 shown in FIG. 16, may receive an input image signal at 1710. For example, the front image signal processor may receive the input image signal, as shown at 1650, 1652 in FIG. 16, from an image sensor, such as the image sensor 1610 shown in FIG. 16. For example, the image sensor may generate an image signal as an ordered, such as raster order, sequence of pixel or sub-pixel values and may send the image signal to the image signal processor as the input image signal. In some implementations, the input image signal may represent each pixel value in a defined format, such as in a RAW image signal format. In some implementations, the input image signal may include an image, or frame, or a portion thereof, which may be one of a sequence of images of a video. For example, the image sensor may send the input image signal to the front image signal processor on a pixel-by-pixel or line-by-line basis.

Image signal processing and encoding utilizing a warp mapping 1700 may include applying, such as by the image signal processor, a first pass of image processing at 1712 to the one or more input images, such as frames of input video, to determine one or more partially processed images. In some implementations, one or more front image signal processors, such as the front image signal processor 1620 shown in FIG. 16, may apply first-pass processing at 1712 to input image signals received from one or more image sensors, such as the image sensor 1610 shown in FIG. 16, which may include, for example, image scaling, correcting dead pixels, performing band processing, decoupling vertical blanking, or a combination thereof. Applying first-pass processing at 1712 may include determining a full resolution image, a low-resolution image, such as a ¼×¼ resolution frame, or both.

Image signal processing and encoding utilizing a warp mapping 1700 may include storing the one or more partially processed images, such as frames, at 1714 in a memory, such as the memory 1642 shown in FIG. 16. The one or more partially processed images stored at 1714 in the memory may include full resolution image(s) and/or a low-resolution image(s). For example, the one or more images stored may include an image from each of multiple image sensors included in an image capture device implementing image signal processing and encoding utilizing a warp mapping 1700.

Image signal processing and encoding utilizing a warp mapping 1700 may include determining a warp mapping at 1720 based on the one or more input images, such as frames of input video, wherein the warp mapping includes records that associate image portions of an output image, such as a frame of output video, with corresponding image portions of the one or more input images, such as frames of input video. For example, determining a warp mapping 1800 as shown in FIG. 18 may be used to determine the warp mapping at 1720. For example, the warp mapping may include records, such as records stored in the format shown in the memory map 2000 shown in FIG. 20. For example, the warp mapping may be determined at 1720 by a warp mapper, such as the warp mapper 1670 shown in FIG. 16. For example, the warp mapping may be determined at 1720 by an image signal processor. For example, the warp mapping may be determined at 1720 by software executed on an application processor with access to a memory shared with an application processor.

In some implementations, determining the warp mapping at 1720 based on the one or more input images, such as frames of input video, includes determining the warp mapping based on one or more low resolution images that were determined based on the one or more input images, such as frames of input video, such as one or more low resolution images stored at 1714 in the memory as part of partially processed image data for the one or more input images.

In some implementations, determining the warp mapping at 1720 may include determining disparity based on two of the input images, such as frames of input video, and determining a stitching boundary based in part on the disparity. For example, a stitching boundary may be determined based on an alignment of the two image sensors that detected the two input images. For example, an alignment of the two image sensors may be identified based on disparity, such as a disparity profile, using the techniques described in relation FIGS. 7 and/or 9. A stitching boundary may include a line or curve that passes through the field of view of both of the two image sensors used to capture the two input images. In some implementations, more than two input images may be combined by a warp mapping and multiple stitching boundaries may be determined for pairs of image sensors that have overlapping fields of view.

In some implementations, determining the warp mapping at 1720 based on the one or more input images, such as frames of input video, includes determining, based in part on the stitching boundary, blend ratios associated with image portions of an output image, such as a frame of output video, and corresponding image portions of the one or more input images frames of input video. For example, a blend ratio for an image portion, such as a pixel or block of pixels, of an input image may be determined as a function of the distance, such as a normalized distance, of the image portion from the stitching boundary in the field of view of the input image. For example, the blend ratios for image portions may be stored as part of the respective records of the warp mapping.

In some implementations, the size, in pixels, of at least some of the corresponding image portions, such as a pixel or block of pixels, of the one or more input images, such as frames of input video, varies based on a distance of the corresponding image portions from the stitching boundary. For example, large image portions, such as large blocks of pixels, may provide sufficient resolution for the warp mapping at locations far from a stitching boundary. For example, small image portions, such as small blocks of pixels or individual pixels, may be used by the warp mapping at locations near a stitching boundary to enable alignment of overlapping input images using a finer resolution. In some implementations, a stitching cost map may be determined at multiple scales to facilitate varying the size of the image portions.

In some implementations, determining the warp mapping at 1720 based on the one or more input images, such as frames of input video, includes applying lens distortion correction to determine one or more lens corrected images, such as frames, based on the one or more input images, such as frames of input video, applying electronic rolling shutter correction to determine one or more shutter corrected images, such as frames, based on the one or more lens corrected images, such as frames, determining disparity based on two of the one or more shutter corrected images, such as frames, determining a stitching boundary based in part on the disparity, and determining an electronic image stabilization rotation based at least in part on angular rate measurements for a device including the one or more image sensors.

Image signal processing and encoding utilizing a warp mapping 1700 may include sorting the records of the warp mapping at 1730 according to a raster order of the corresponding image portions, such as pixels or blocks of pixels, of the one or more input images, such as frames of input video. For example, sorting the records of the warp mapping at 1730 may facilitate using the warp mapping to warp and/or blend portions of the one or more input images as they become available in a raster order following other second-pass processing, such as temporal noise reduction, in an image signal processor. For example, sorting the records of the warp mapping at 1730 may include adjusting the locations of records within a data structure storing the warp mapping. For example, sorting the records of the warp mapping at 1730 may include generating and storing an index based on the corresponding portion of the input image(s) field for the records of a data structure storing the warp mapping. In some implementations, the records of a warp mapping may be initially determined and/or stored in a raster order according to the corresponding image portions of the one or more input images, such that the sorting at 1730 operation is combined with the determining at 1720 operation. For example, the warp mapping may include records in the format shown in the memory map 2000 shown in FIG. 20. For example, the warp mapping may be sorted at 1730 by a warp mapper, such as the warp mapper 1670 shown in FIG. 16. For example, the warp mapping may be sorted at 1730 by an image signal processor. For example, the warp mapping may be sorted at 1730 by software executed on an application processor with access to a memory shared with an application processor.

Image signal processing and encoding utilizing a warp mapping 1700 may include reading partially processed image data at 1740 from the memory, such as the memory 1642 shown in FIG. 16, and applying, by the image signal processor, a second pass of image processing at 1742 to image portions of the one or more partially processed frames to determine image portions of one or more processed images, such as frames, in the raster order. For example, applying second-pass processing at 1742 may include local motion compensation, such as using the local motion compensation unit 530 as shown in FIG. 5, temporal noise reduction, such as using the temporal noise reduction unit 520 as shown in FIG. 5, spatial denoising, such as using the raw to raw unit 540 as shown in FIG. 5, local tone mapping, such as using the YUV to YUV unit 560 as shown in FIG. 5, and/or demosaic, such as using the raw to YUV unit 550 as shown in FIG. 5.

Image signal processing and encoding utilizing a warp mapping 1700 may include determining, by the image signal processor, the image portions of the output image, such as frame of output video, at 1744 based at least in part on the warp mapping and the corresponding image portions of the one or more processed frames in the raster order. For example, applying a warp mapping as shown at 1900 in FIG. 19 may be implemented to determine the output image at 1744. In some implementations, determining the output image at 1744 may include warping and blending at least two of the one or more processed frames to generate the output image, such as the frame of output video.

Image signal processing and encoding utilizing a warp mapping 1700 may include storing the frame of output video at 1746 in a memory, such as the memory 1642. For example, an image signal processor, such as the core image signal processor 1630 shown in FIG. 16, may determine the output at 1744 and store the output at 1746 in a memory, such as the memory 1642 shown in FIG. 16.

Image signal processing and encoding utilizing a warp mapping 1700 may include reading, such as by an encoder, such as the encoder 1640 shown in FIG. 16, the output image, such as a frame of output video, at 1750 from the memory, such as the memory 1642 shown in FIG. 16. Image signal processing and encoding utilizing a warp mapping 1700 may include generating, such as by the encoder, such as the encoder 1640 shown in FIG. 16, an encoded image, such as a video, at 1752 based at least in part on the output image, such as the frame of output video. Image signal processing and encoding utilizing a warp mapping 1700 may include outputting or storing the encoded image, such as video, at 1754.

Many variations (not shown) of image signal processing and encoding utilizing a warp mapping 1700 are within the scope of this disclosure. For example, although image signal processing and encoding utilizing a warp mapping 1700 are described as applying the second-pass processing at 1742 and the warp mapping at 1730 in raster order for the portions of the input image(s), other orders may be used. The order in which the warp mapping is applied may be chosen to match availability of processed image data in the core image signal processor that implements second-pass processing of the input image(s) and temporarily stores resulting portions, such as pixels and/or blocks of pixels, in an internal buffer, such as a line buffer.

FIG. 18 is a flowchart of an example of determining a warp mapping 1800 in accordance with implementations of this disclosure. For example, the determining a warp mapping 1800 may be implemented by the warp mapper 1670 shown in FIG. 16. For example, the determining a warp mapping 1800 may be implemented by an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3.

Determining a warp mapping 1800 may include determining one or more transformations, which may be a sequence of transformations, such as a sequence of four transformations 1810, 1820, 1830, 1840 as shown. The transformations may include lens distortion correction at 1810, electronic rolling shutter correction at 1820, disparity correction at 1830, and electronic image stabilization at 1840. The transformations may be applied, such as in a sequence, to processed image data. For example, second-pass processing in an image signal processor may include applying the sequence of transformations.

A transformation for lens distortion correction may be applied at 1810 to determine one or more lens corrected images, such as frames, based on the one or more images, such as frames of input video. The one or more images may include partially processed image data from a front image signal processor, such as the front image signal processor 1620 shown in FIG. 16. In some implementations, the images may be low resolution, such as ¼×¼ resolution, copies of input images that have been determined and stored by a front image signal processor, such as the front image signal processor 1620 shown in FIG. 16. For example, the lens distortion correction transformation may be grid based. For example, the lens distortion correction transformation may include bilinear, biquadratic, or bicubic interpolation. The warp mapping may be initialized based on the lens distortion correction transformation. For example, the warp mapping may be initialized with records, such as rows in a table, that associate portions, such as pixels or blocks of pixels, of the one or more input images with portions of the lens corrected image(s).

A transformation for electronic rolling shutter correction may be applied at 1820 to determine one or more shutter corrected images, such as frames, based on the one or more lens corrected images, such as frames, obtained at 1810. The electronic rolling shutter correction may include a rotation that is determined based on motion sensor, such as gyroscope and/or accelerometer, measurements from a time associated with the input image(s). The warp mapping may be updated based on the electronic rolling shutter correction transformation. For example, the warp mapping records may be expanded, such as by adding a column to a table, to associate portions, such as pixels or blocks of pixels, of the one or more lens corrected images with portions of the shutter corrected image(s).

Disparity may be determined at 1830 based on two of the one or more shutter corrected images, such as frames, obtained at 1820. Disparity correction at 1820 may include a binocular disparity correction near a stitching boundary for pairs of input images with overlapping fields of view, such as along an overlapping region of two of the images.

For example, a stitching cost unit, such as the stitching cost unit 580 shown in FIG. 5, may be used to determine disparity as described in relation to FIG. 5. For example, disparity correction at 1830 may include determining a stitching cost map, as described in relation to FIGS. 5 and 7. For example, determining disparity may include determining a stitching profile, as described in relation to FIGS. 5 and 7. In some implementations, two low-resolution shutter corrected images with overlapping fields of view may be warped to a stitching cost space. For example, an Anscombe transformation (or a similar transformation) may be applied, such as using a look-up table, as part of the warp to the stitching cost space to impose a value independent noise level. For example, color images may be converted to gray scale images as part of the warp to the stitching cost space. For example, a transformation may be selected based on the epipolars being horizontal and applied as part of the warp to the stitching cost space. For example, an image may be mirrored as part of the warp to the stitching cost space. A stitching cost map may be generated based on the warped images. The stitching cost map may be a two-dimensional area indexed by disparity and position (or angle) along the length of the overlapping region of the two images. The value of each element in the cost map may be a cost metric, such as a pixel discrepancy, associated with using that disparity at that position along the overlapping region between the two images. A stitching profile may be determined as an array specifying a single disparity value at each position along the length of the overlapping region. For example, a stitching profile may be determined by using an optimization process, based at least in part on the stitching cost map, to select an alignment path. For example, a stitching profile may be found that has low total cost along the path and smooth changes in disparity along the length of the overlapping region.

Determining a warp mapping 1800 may include determining a stitching boundary between the two images at 1832 based on the disparity obtained at 1830, and determining blend ratios for the two images at 1834 based on the stitching boundary determined at 1832.

The stitching boundary may be determined at 1832 based in part on the disparity obtained at 1830. For example, the stitching boundary may be determined at 1832 by using the techniques discussed in relation to FIG. 7 to identify an alignment of two images. For example, a stitching boundary may be determined at 1832 by applying a stitching profile to adjust a stitching boundary by shifting portions, such as pixels or blocks or pixels, in relation to an initial stitching boundary estimate based on the determined disparity at various positions, such as angles, along the length of an overlapping region between two shutter corrected images. In some implementations, a disparity fading function is defined to apply disparity correction within a distance ($z\_d$) from an initial stitching boundary. The fading function may be one at the initial stitching boundary and decrease to zero at the distance $z\_d$. In some implementations, a disparity blurring function is defined to apply disparity correction within a distance ($z\_d$) from an initial stitching boundary. The disparity blurring function may be zero (i.e., no blurring and the individual disparity value for that position along the initial stitching boundary is used) at the initial boundary and increase with distance from the boundary so that the disparity value applied is an average of the disparity values in the stitching profile for a range of positions near the position under consideration along the length of the overlapping region. When the disparity is applied to the shutter corrected images, the warp mapping may be updated based on the disparity-based transformation. For example, the warp mapping records may be expanded, such as by adding a column to a table, to associate portions, such as pixels or blocks of pixels, of the one or more shutter corrected images with portions of the disparity corrected image(s).

Blend ratios associated with image portions of an output image, such as a frame of output video, and corresponding image portions of the one or more input images, such as frames of input video, may be determined at 1834 based in part on the stitching boundary obtained at 1832. The value of a portion, such as a pixel of a block of pixels, of an output image may be determined as a weighted sum of the values of corresponding portions of two or more input images. For example, $c\_out$ may indicate a portion of the output image, $c\_1$ may indicate a corresponding portion of a first input image, $c\_2$ may indicate a corresponding portion of a second input image that overlaps with the first input image, $b$ may be the blending ratio, and obtaining output image portions using blend ratios may be expressed as follows:

$$c\_out = b * c\_1 + (1-b) * c\_2.$$

For example, a blending ratio may be determined at 1834 as a function of distance from a stitching boundary. For example, the blending ratios may vary from zero to one over the width of a band along a stitching boundary, such as where the band has a width of $2*z\_b$, with $z\_b < z\_d$, and be equal to 0.5 at the stitching boundary in the center of the band. Thus, on one side of the blending band, only the portions from the first input image are used to determine corresponding portions of the output image. On the other side of the blending band, only the portions from the second input image are used to determine corresponding portions of the output image. Inside the blending band, portions from both the first input image and the second input image will be used to determine corresponding portions of the output image, with the mixing determined by the blending ratios associated with those portions. The warp mapping may be updated with the blend ratios. For example, the warp mapping records may be expanded, such as by adding a column to a table, to associate portions, such as pixels or blocks of pixels, of the one or more shutter corrected images with blend ratios.

An electronic image stabilization rotation may be determined at 1840 based at least in part on angular rate measurements for a device including the one or more image sensors used to capture the input images. The electronic image stabilization rotation may be determined at 1840 based on motion sensor, such as gyroscope and/or accelerometer, measurements from a time associated with the input image(s). The warp mapping may be updated based on the electronic image stabilization rotation. For example, the warp mapping records may be expanded, such as by adding a column to a table, to associate portions, such as pixels or blocks of pixels, of the one or more disparity corrected image with portions of the stabilized image.

Determining a warp mapping 1800 may include storing the mapping at 1850. For example, storing the mapping at 1850 may include storing the mapping as a set of records that associate portions of an output image, such as a frame of output video, with portions of one or more input images, such as frames of input video.

The warp mapping may be stored at 1850 in a memory, such as the memory 1642 shown in FIG. 16, that can be accessed by an image signal processor, such as the core image signal processor 1630 shown in FIG. 16, that will apply the warp mapping to full resolution processed image data. For example, the warp mapping may be stored at 1850 as a set of records in the format shown in FIG. 20. For example, the warp mapping may be stored at 1850 in an internal buffer of an image signal processor, such as the core image signal processor 1630 shown in FIG. 16, that will apply the warp mapping to full resolution processed image data. Some of the of the intermediate data stored in a warp mapping data structure may be omitted when the output of warp mapping is stored at 1850. For example, fields in records, such as columns in a table, corresponding to portions of intermediate images, such as fields identifying portions of a lens corrected image or portions of a shutter corrected image, may be deleted. For example, the output stored at 1850 may include records with a field specifying a portion, such as a pixel or group of pixels, of an input image and a field specifying a portion of the output image. In some implementations, the output stored at 1850 may include records with a field specifying a blend ratio for the corresponding portion of an input image.

Many variations (not shown) of determining a warp mapping 1800 are within the scope of this disclosure. For example, a transformation to project the output image into a chosen output space or representation, such as six-faces, equirectangular, or spherical, may be determined and the warp mapping may be updated based on the projection transformation. For example, electronic image stabilization rotation can be omitted or determined later and applied after the warp mapping has been applied to full resolution processed image data. For example, other transformations, such as electronic rolling shutter, may be omitted entirely and not used to update the warp mapping.

Figure 19:
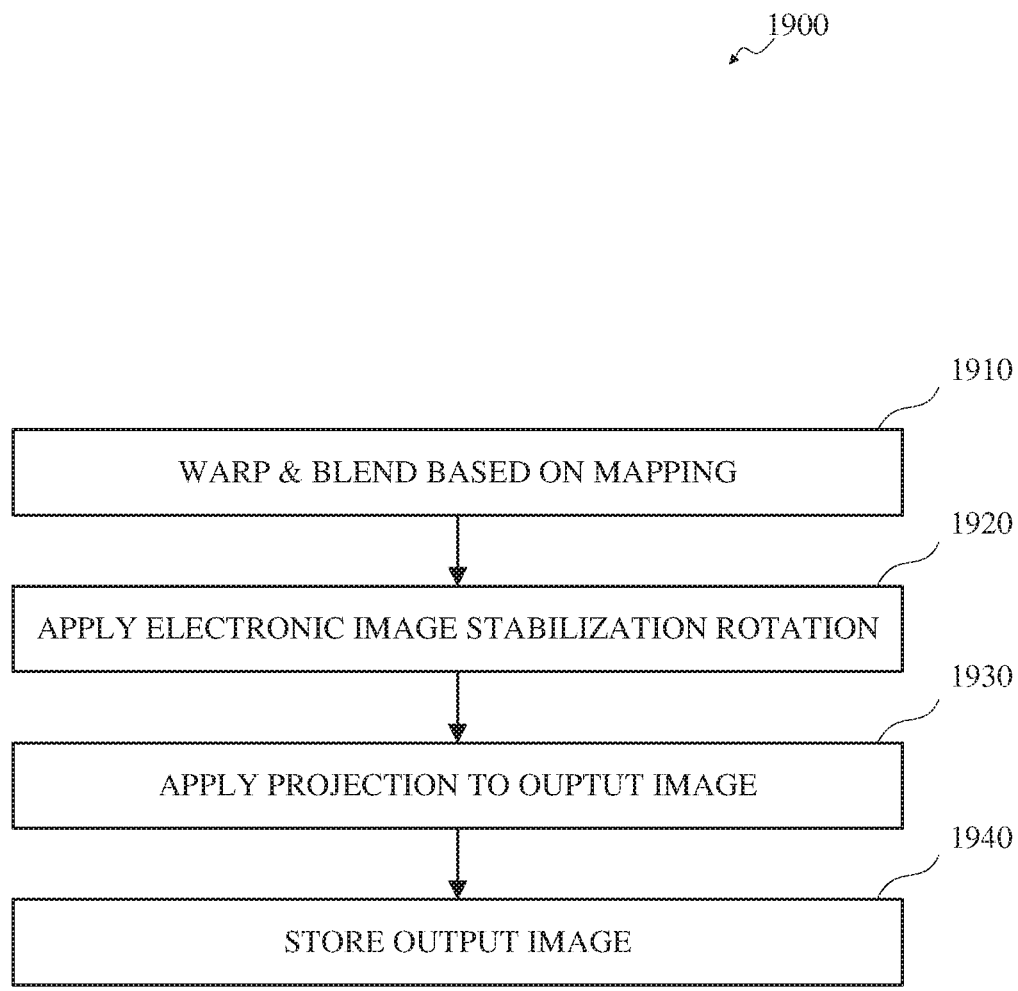
FIG. 19 is a flowchart of an example process for applying a warp mapping.

FIG. 19 is a flowchart of an example of applying a warp mapping 1900 in accordance with implementations of this disclosure. Applying a warp mapping 1900 may be implemented by a warp unit, such as the warp module 1632 shown in FIG. 16. For example, applying a warp mapping 1900 may be implemented by an image capture device, such as one or more of the image capture devices 130, 132, 134 shown in FIG. 1 or the image capture device 200 shown in FIG. 2, or an image capture apparatus, such as the image capture apparatus 110 shown in FIG. 1 or the image capture apparatus 300 shown in FIG. 3.

Applying a warp mapping 1900 includes warping and blending at 1910, based on a warp mapping that has been determined based on partially processed image data for one or more input images, to implement one or more transformations, such as lens distortion correction, electronic rolling shutter correction, and/or disparity correction and image blending, on full resolution processed image data as it becomes available, such as the mapping stored as shown at 1850 in FIG. 18. Applying a warp mapping 1900 includes electronic image stabilization rotation at 1920. Applying a warp mapping 1900 includes applying projection at 1930 to output space or format for the output image. Applying a warp mapping 1900 includes storing the output image at 1940.

Portions, such as pixels or blocks of pixels, of processed input images, such as frames of input video, may be received in a defined order, such as a raster order, and may be warped, blended, or both using warping and blending at 1910, based on the warp mapping, to determine corresponding portions of an output image, such as frame of output video. For example, the warp mapping may include records, such as records formatted as shown in the memory map 2000 shown in FIG. 20. The records of the warp mapping may be sorted according to an order, such as a raster order, of portions of the input image(s) and the appropriate record(s) for a portion of the processed image data may become available and may be accessed to determine corresponding portions of the output image that may be updated based on the current portion of the processed image data. The data for the current portion of the processed image data may be associated with the corresponding portion(s) of the output image specified by the warp mapping. In some implementations, the data for the current portion of the processed image data may be multiplied by a blend ratio associated with the current portion of the processed image data in the warp mapping.

An electronic image stabilization rotation may be applied at 1920 to a portion, such as a pixel or a block of pixels, of the output image. For example, a portion of the output image may be shifted to an address or position within the output image based on the electronic image stabilization rotation. The electronic image stabilization rotation may be determined based, for example, on angular rate measurements for a device including the one or more image sensors used to capture the input images. The electronic image stabilization rotation may be determined based on motion sensor, such as gyroscope and/or accelerometer, measurements corresponding to a time associated with the input image(s).

A transformation to project the output image to a chosen output space or representation, such as six-faces, equirectangular, or spherical, may be applied at 1930 to a portion of the output image. For example, the projection transformation may be grid based. The projection transformation may project the portion of the output image into one or more portions of the output image in the output format.

The portion(s) of the output image may be stored at 1940. For example, portions of the output image may be stored at 1940 in a memory, such as the memory 1642 shown in FIG. 16, which may be accessible by an encoder, such as the encoder 1640 shown in FIG. 16. In some implementations, storing a portion of the output associated with blend ratios at 1940 may include reading the current value stored at the corresponding address or position within the output image from memory, obtaining an updated value by adding the portion value obtained at 1920 or 1930 to the current value, and writing the updated value for the portion of the output image to the memory, such as for portions associated with a blend ratio that is less than one.

Many variations (not shown) of applying a warp mapping 1900 are within the scope of this disclosure. For example, electronic image stabilization rotation can be omitted or integrated into the warp mapping. In another example, a transformation to project the output image into a chosen output space or representation, such as six-faces, equirectangular, or spherical, may be omitted or integrated into the warp mapping.

Figure 20:
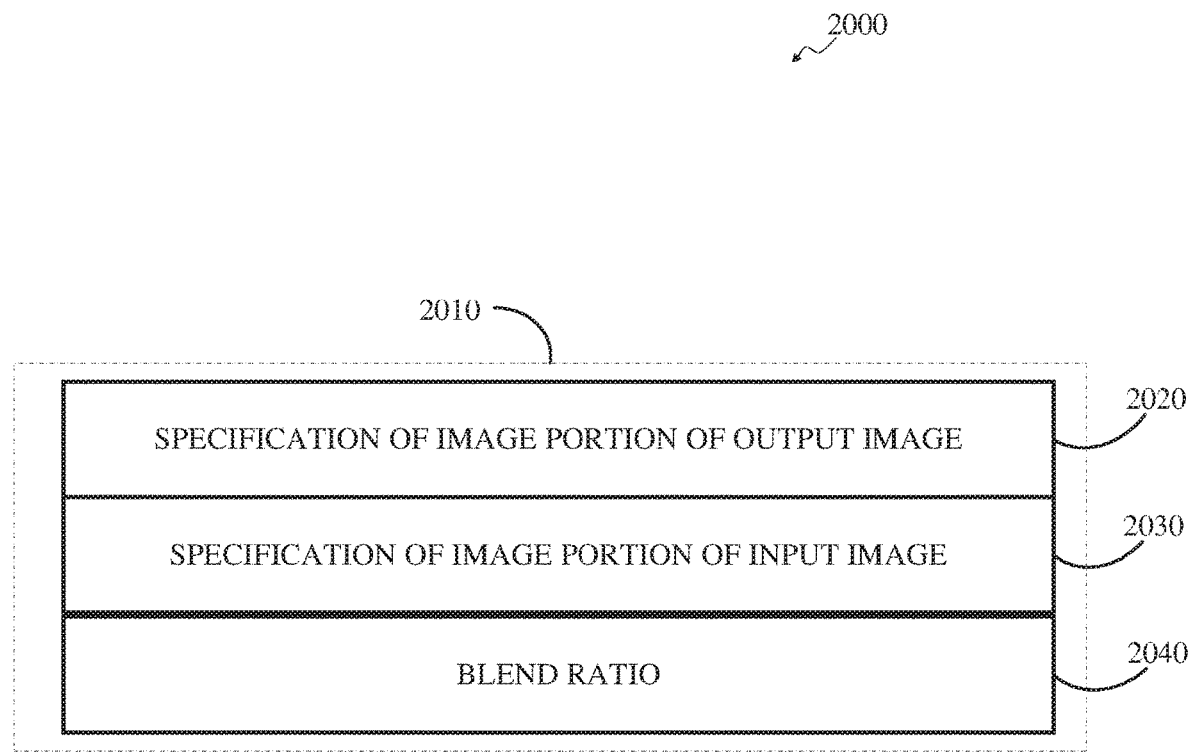
FIG. 20 is a memory map showing an example format for a record stored as part of warp mapping.

FIG. 20 is a diagram of an example of a memory map 2000 describing a warp mapping record 2010 in accordance with implementations of this disclosure. The warp mapping record 2010 includes an output image specification 2020 of an image portion, such as a pixel or a block of pixels, of an output image, an input image specification 2030 of an image portion, such as a pixel or a block of pixels, of an input image, and a blend ratio 2040.

For example, an image portion may be specified by an address or position, which may be an ordered pair of coordinates or a raster order location, within a respective image. In addition, or in the alternative, an image portion may be specified by a size, such as a length and a width in pixels.

The input image specification 2030 of the image portion of the input image may identify an input image from among a set of input images, such as using an image sensor identification number. The blend ratio 2040 may be stored as a fixed point integer or a floating point value representing a blend ratio, such as the blend ratio shown at 1834 in FIG. 18.

Figure 21:
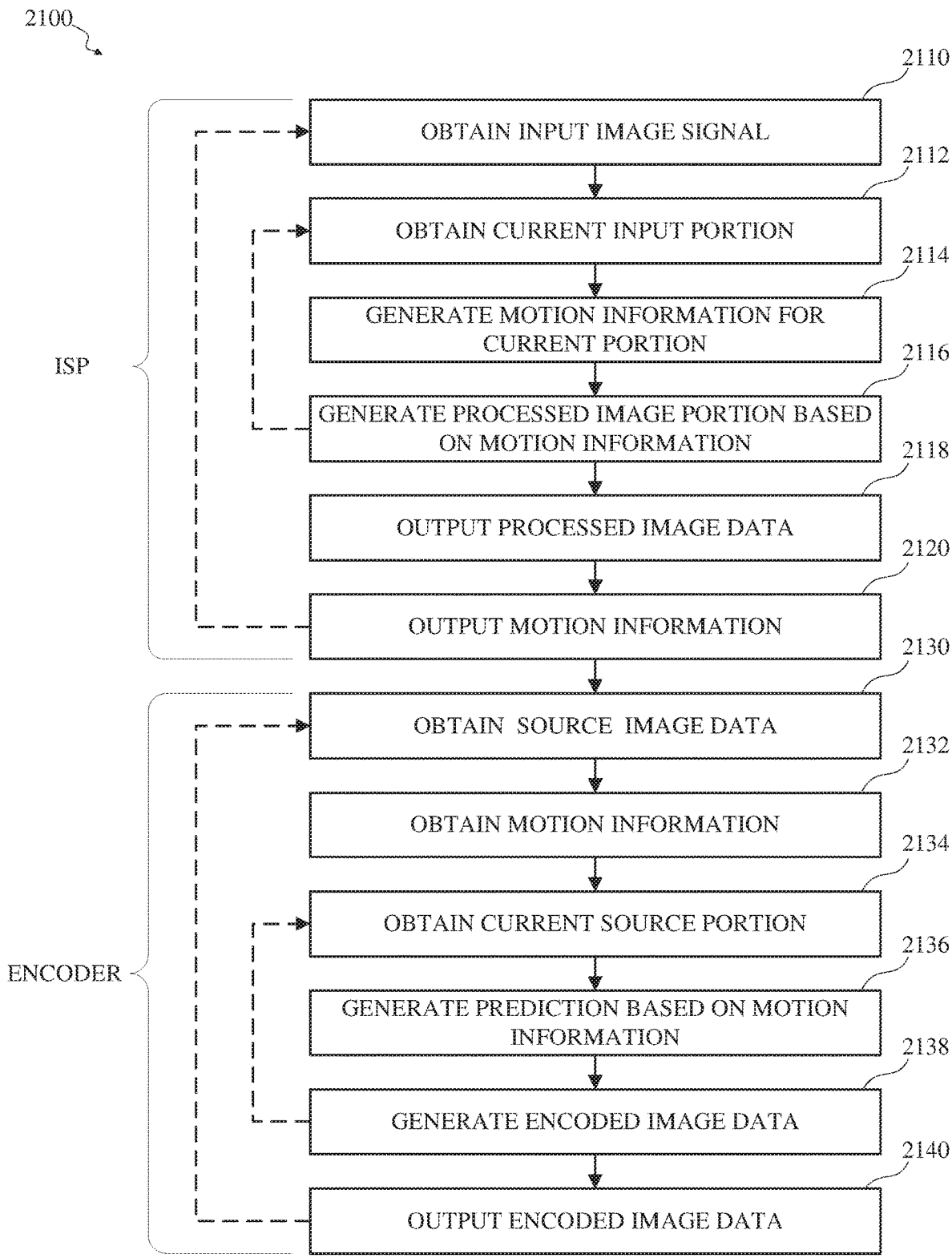
FIG. 21 shows an example of image signal processing and encoding with image signal processing-based encoding hints for motion estimation in accordance with this disclosure.

FIG. 21 shows an example of image signal processing and encoding with image signal processing-based encoding hints for motion estimation 2100 in accordance with this disclosure. The image signal processing and encoding with image signal processing-based encoding hints for motion estimation 2100 shown in FIG. 21 may be similar to the image signal processing and encoding with image signal processing-based encoding hints for bitrate control 1400 shown in FIG. 14 or the image signal processing and encoding with image signal processing-based encoding hints for bitrate control with multi-pass image signal processing 1500, except as described herein.

For example, an image signal processing and encoding pipeline, such as the image signal processing and encoding pipeline 1000 shown in FIG. 10, the image signal processing and encoding pipeline 1100 shown in FIG. 11, the image signal processing and encoding pipeline 1200 shown in FIG. 12, or the image signal processing and encoding pipeline 1600 shown in FIG. 16, which may include an image signal processor, such as the image signal processor 410 shown in FIG. 4, the image signal processor 500 shown in FIG. 5, the image signal processor 1020 shown in FIG. 10, the core image signal processor 1140 shown in FIG. 11, the image signal processor 1220 shown in FIG. 12, or the core image signal processor 1630 shown in FIG. 16, may implement image signal processing based encoding hints for motion estimation.

Image signal processing and encoding with image signal processing-based encoding hints for motion estimation 2100 may include obtaining an input image signal at 2110, obtaining a current input image portion for image processing at 2112, generating motion information at 2114, generating a processed image portion at 2116, outputting processed image data at 2118, outputting the motion information at 2120, obtaining source image data at 2130, obtaining the motion information at 2132, obtaining a current source portion at 2134, generating prediction portion at 2136, generate encoded image data at 2138, outputting the encoded image data at 2140, or a combination thereof.

An input image signal, or a portion thereof, may be obtained at 2110. For example, an image sensor, such as the image sensor 230 shown in FIG. 2, the first image sensor 340 shown in FIG. 3, the second image sensor 342 shown in FIG. 3, the image sensor 1010 shown in FIG. 10, the image sensor 1110 shown in FIG. 11, the image sensor 1210 shown in FIG. 12, or the image sensor 1610 shown in FIG. 16, the image sensor 1612 shown in FIG. 16, of the image signal processing and encoding pipeline may generate the input image signal, such as the input image signal 430 shown in FIG. 4, the input image signal 1050 shown in FIG. 10, the input image signal 1160 shown in FIG. 11, the input image signal 1260 shown in FIG. 12, the input image signal 1650 shown in FIG. 16, or the input image signal 1652 shown in FIG. 16, and may output the input image signal, or a portion thereof, to an image signal processor of the image signal processing and encoding pipeline.

The image signal processor may obtain the input image signal, or a portion thereof, at 2110, such as by receiving the input image signal, or a portion thereof, from the image sensor. Receiving the input image signal at 2110 may be similar to receiving the input image signal as shown at 1410 in FIG. 14, receiving the input image signal as shown at 1510 in FIG. 15, or receiving the input image signals as shown at 1710 in FIG. 17, except as described herein.

Although not shown separately in FIG. 21, obtaining the input image signal at 2110 may include buffering the input image signal, or a portion thereof, such as in an internal buffer, such as the electronic storage 414 shown in FIG. 4, the internal storage unit 1022 shown in FIG. 10, the internal buffer 1142 shown in FIG. 11, the internal storage unit 1222 shown in FIG. 12, or the internal buffer 1636 shown in FIG. 16, of the image signal processor, which may be similar to the buffering 1420 shown in FIG. 14, or the buffering 1512 shown in FIG. 15, except as described herein.

A current input image portion may be obtained at 2112 for image processing. For example, the image signal processor may identify a spatial portion, such as a block, of an input image from the input image signal received at 2110 as the input image portion. Identifying the input image portion of the input image signal at 2112 may be similar to the block identification shown at 1430 in FIG. 14 or the block identification shown at 1514 in FIG. 15, except as described herein. For example, the internal storage unit of the image signal processor may include N, or more, line buffers, such as four or more line buffers, the image signal processor may buffer N lines of the input image signal in the N line buffers at 2112, and the image signal processor may identify an N×N block, such as a 4×4 block, from the N line buffers at 2112.

Although not shown separately in FIG. 21, image signal processing and encoding with image signal processing-based encoding hints for motion estimation 2100 may include obtaining reference image data, such as previously processed image data, which may include processed image data from a temporally preceding frame, or processed image data from a previously processed portion of the current image. For example, the image signal processor may obtain reference image data for processing the input image, such as for processing the input image portion identified at 2112.

Motion information may be generated at 2114 for the current input image portion identified at 2112. Generating the motion information at 2114 for the input image portion identified at 2112 may be similar to determining motion information as described in relation to the local motion estimation unit 520 shown in FIG. 5, except as described herein. For example, generating the motion information may include generating a motion vector, or other representation of motion, or a displacement, between the current input image portion identified at 2112 and reference data, such as reference data corresponding to a portion of a reference frame, such as a portion of a previously processed temporally preceding frame, or a previously processed portion of the current frame.

A processed image portion may be generated at 2116 by processing the input image portion identified at 2112 based on the motion information identified at 2114.

Generating the processed image portion at 2116 may include generating, such as by a high dynamic range unit, such as the high dynamic range unit 530 shown in FIG. 5, of the image signal processing and encoding pipeline, a high dynamic range processed image portion based on the current input image portion identified at 2112, reference data, the motion information identified at 2114, or a combination thereof.

Generating the processed image portion at 2116 may include generating, such as by a noise reduction unit, such as the three-dimensional noise reduction unit 540 shown in FIG. 5, of the image signal processing and encoding pipeline, a noise reduced, or denoised, processed image portion based on the current input image portion identified at 2112, reference data, the motion information identified at 2114, or a combination thereof.

Generating the processed image portion at 2116 may include processing the input image as described in relation to FIG. 5, such as by demosaicing, color processing, format converting, such as from RAW to YUV, local tone mapping, or combining, merging, or stitching images, which may include warping, blending, or both. Other image processing may be performed.

Although not shown separately in FIG. 21, generating the processed image portion at 2116 may include updating or modifying the motion information generated at 2116. For example, generating the processed image portion at 2116 may include generating combined image information based on input image signals representing two or more input images, which may include warping, blending, stitching or otherwise combining images, such as the warping described in relation to FIG. 16, FIG. 17, FIG. 18, FIG. 19, and FIG. 20, and which may include updating or modifying the motion information obtained at 2116, such as by warping the motion information in accordance with generating the combined processed image data.

The processed image data may be output at 2118. For example, the image signal processor may store the processed image data in a shared memory, such as the electronic storage unit 224 shown in FIG. 2, the shared memory 1030, the shared memory 1130 shown in FIG. 11, or the shared memory 1230 shown in FIG. 12, accessible by the encoder.

The motion information may be output at 2120. For example, the image signal processor may store the motion information in the shared memory as encoding hints.

Although shown separately in FIG. 21, outputting the processed image data at 2118 and outputting the motion information at 2120 may be combined. For example, the image signal processor may store the motion information and the processed image data in the shared memory concurrently or in combination. In some implementations, storing the motion information at 2118, storing the processed image data at 2116, or both may include storing information indicating an association between the motion information generated at 2114, the processed image data generated at 2116, the input image portion identified at 2112, or a combination thereof.

The input image signal received at 2110 may include multiple input image portions and obtaining the current input image portion for image processing at 2112, generating motion information at 2114, generating the processed image portion at 2116, outputting processed image data at 2118, outputting the motion information at 2120, or a combination thereof, may be performed for each input image portion from the input image signal, as indicated by the broken directional line from generating the processed image portion at 2116 to obtaining the current input image portion for image processing at 2112.

In some implementations, the image signal processor may output the processed image data at 2118, the motion information at 2120, or both subsequent to generating the motion information at 2114 and the processed image data at 2116 for each respective input image portion included in the input image signal received at 2110.

In some implementations, the image signal processor may output the processed image data at 2118, the motion information at 2120, or both subsequent to generating the motion information at 2114 and the processed image data at 2116 for the input image portions included in the input image signal received at 2110, which may include buffering the processed image data generated at 2118, the motion information generated at 2120, or both for one or more of the input image portions included in the input image signal received at 2110 prior to outputting the processed image data generated at 2118, the motion information generated at 2120, or both for the input image portions included in the input image signal received at 2110.

Image signal processing and encoding with image signal processing-based encoding hints for motion estimation 2100 may include sequentially or iteratively obtaining and processing multiple portions of an input image signal as indicated by the broken directional line from outputting motion information at 2120 to obtaining the input image signal at 2110.

For example, the input image signal may represent an image, and encoding with image signal processing-based encoding hints for motion estimation 2100 may include successively, or iteratively, obtaining and processing respective portions of the image, such as lines or rows of the image. In another example, the input image signal may represent a sequence or series of images, such as a video, or a portion thereof, and encoding with image signal processing-based encoding hints for motion estimation 2100 may include successively, or iteratively, obtaining and processing respective portions of the series of images, such as respective frames, or respective lines or rows of the respective frames.

Source image data may be obtained at 2120 for encoding. For example, the image signal processing and encoding pipeline may include an encoder, and the encoder may obtain the source image data for encoding. The source image data may include the processed image data, or a portion thereof, output by the image signal processor at 2118. Obtaining the source image data may include reading, or otherwise accessing, the source image data from the shared memory or receiving the source image data from the image signal processor.

Motion information may be obtained at 2132 for encoding the source image data obtained at 2130. For example, the encoder may obtain the motion information output by the image signal processor at 2120 by receiving the motion information from the image signal processor or by reading, or otherwise accessing, the motion information from the shared memory.

Although shown separately in FIG. 21, obtaining the source image data at 2130 and obtaining the motion information at 2132 may be combined. For example, the encoder may read the motion information and the source image data from the shared memory concurrently or in combination.

A current source portion may be obtained at 2134 for encoding. For example, the encoder may identify a current source portion, such as a current source block, of a source image from the source image data obtained at 2130.

A prediction portion may be generated at 2136 based on the motion information identified at 2132 for encoding the current source portion identified at 2130. For example, the encoder may identify reference image data spatially corresponding to a location of the current source portion in a current source image offset or displaced from the spatial location of the current portion as indicated by the motion information and may generate the prediction portion based on the identified reference image data. The current source image may be a previously processed reference frame, such as a previously processed temporally preceding frame, or the current source image may be the current frame and the current source portion may be a previously processed portion of the current frame.

In an example, generating the prediction portion at 2136 may include identifying the reference image data using motion vectors indicated in the motion information identified by the image signal processor at 2114 and obtained by the encoder at 2132 and may omit performing motion estimation at the encoder, which may improve the efficiency of encoding the processed image data by performing motion estimation independent of the motion information generated by the image signal processor at 2114.

In another example, generating the prediction portion at 2136 may include identifying the reference image data by performing motion estimation based on the motion information identified by the image signal processor at 2114 and obtained by the encoder at 2132, which may improve the efficiency of encoding the processed image data by performing motion estimation independent of the motion information generated by the image signal processor at 2114. For example, the encoder may identify a spatial location for motion searching based on the motion information identified by the image signal processor at 2114 and obtained by the encoder at 2132, which may improve the efficiency of motion estimation by performing motion estimation independent of the motion information generated by the image signal processor at 2114.

Encoded image data may be generated at 2138. For example, the encoder may generate residual data indicating a difference between the current source portion identified at 2134 and the prediction portion generated at 2136, generate corresponding transform data transforming the residual data, generate quantized data by quantizing the transform data, generate entropy coded data by entropy coding the quantized data, and include the entropy coded data, corresponding to the current source portion identified at 2134, in encoded image data for a current image or frame.

The encoded image data may be output at 2140. For example, the encoder may store the encoded image data in the shared memory, or may otherwise include the encoded image data in an output bitstream. In an example, the encoder may transmit, such as via a wired or wireless electronic communication network, such as the internet, the encoded image data to another device, such as a decoder, for subsequent decoding and presentation.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C#, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire, such as FW400, FW110, and/or other variations, USB, such as USB2, Ethernet, such as 10/100, 10/100/1000 (Gigabit Ethernet, 10-Gig-E, and/or other Ethernet implementations), MoCA, Coaxsys, such as TVnet™, radio frequency tuner, such as in-band or out-of-band, cable modem, and/or other radio frequency tuner protocol interfaces, Wi-Fi (802.11), WiMAX (802.16), personal area network (PAN), such as 802.15, cellular, such as 3G, LTE/LTE-A/TD-LTE, GSM, and/or other cellular technology, IrDA families, and/or other network interfaces.

As used herein, the term "Wi-Fi" includes one or more of IEEE-Std. 802.11, variants of IEEE-Std. 802.11, standards related to IEEE-Std. 802.11, such as 802.11 a/b/g/n/s/v, and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(such as, IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum, such as infrared, ultraviolet, and/or other energy, such as pressure waves.

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

EMBODIMENTS

1. A method comprising:
   performing image signal processing.
2. A method as in the preceding embodiment, wherein performing image signal processing includes obtaining an input image signal.
3. A method as in any one of the preceding embodiments, wherein performing image signal processing includes obtaining the input image signal by an image signal processor.
4. A method as in any one of the preceding embodiments, wherein performing image signal processing includes obtaining the input image signal from an image sensor.
5. A method as in any one of the preceding embodiments, wherein the image signal processor is an image signal processor of an image capture device.
6. A method as in any one of the preceding embodiments, wherein the image sensor is an image sensor of the image capture device.
7. A method as in any one of the preceding embodiments, wherein performing image signal processing includes obtaining an input image portion of an input image from the input image signal.
8. A method as in any one of the preceding embodiments, wherein performing image signal processing includes obtaining the input image portion by the image signal processor.
9. A method as in any one of the preceding embodiments, wherein performing image signal processing includes generating motion information for the input image portion.
10. A method as in any one of the preceding embodiments, wherein performing image signal processing includes generating the motion information by the image signal processor.
11. A method as in any one of the preceding embodiments, wherein performing image signal processing includes generating a processed image portion by processing the input image portion based on the motion information.
13. A method as in any one of the preceding embodiments, wherein performing image signal processing includes generating the processed image portion by the image signal processor.

14. A method as in any one of the preceding embodiments, wherein performing image signal processing includes including the processed image portion in processed image data.

15. A method as in any one of the preceding embodiments, wherein performing image signal processing includes including the processed image portion in the processed image data by the image signal processor.

16. A method as in any one of the preceding embodiments, wherein performing image signal processing includes outputting the processed image data.

17. A method as in any one of the preceding embodiments, wherein performing image signal processing includes outputting the processed image data by the image signal processor.

18. A method as in any one of the preceding embodiments, wherein performing image signal processing includes outputting the motion information as an encoding hint.

19. A method as in any one of the preceding embodiments, wherein performing image signal processing includes outputting the motion information by the image signal processor.

20. A method as in any one of the preceding embodiments, wherein performing image signal processing includes obtaining source image data for a frame.

21. A method as in any one of the preceding embodiments, wherein performing image signal processing includes obtaining the source image data by an encoder.

22. A method as in any one of the preceding embodiments, wherein the encoder is an encoder of the image capture device.

23. A method as in any one of the preceding embodiments, wherein the source image data includes the processed image data.

24. A method as in any one of the preceding embodiments, wherein performing image signal processing includes obtaining the motion information.

25. A method as in any one of the preceding embodiments, wherein performing image signal processing includes obtaining the motion information by the encoder.

26. A method as in any one of the preceding embodiments, wherein performing image signal processing includes obtaining a source image portion from the source image data.

27. A method as in any one of the preceding embodiments, wherein performing image signal processing includes obtaining the source image portion by the encoder.

28. A method as in any one of the preceding embodiments, wherein the source image portion corresponds to the processed image portion.

29. A method as in any one of the preceding embodiments, wherein performing image signal processing includes generating a prediction portion for encoding the source image portion based on the motion information.

30. A method as in any one of the preceding embodiments, wherein performing image signal processing includes generating the prediction portion by the encoder.

31. A method as in any one of the preceding embodiments, wherein performing image signal processing includes generating encoded image data based on the prediction portion.

32. A method as in any one of the preceding embodiments, wherein performing image signal processing includes generating the encoded image data by the encoder.

33. A method as in any one of the preceding embodiments, wherein performing image signal processing includes outputting the encoded image data.

34. A method as in any one of the preceding embodiments, wherein performing image signal processing includes outputting the encoded image data by the encoder.

35. A method as in any one of the preceding embodiments, wherein outputting the processed image data includes outputting the processed image data such that the processed image data is accessible by the encoder.

36. A method as in any one of the preceding embodiments, wherein outputting the motion information includes outputting the motion information such that the motion information is accessible by the encoder.

37. A method as in any one of the preceding embodiments, wherein outputting the motion information includes outputting the motion information such that the motion information is accessible by the encoder for generating an encoded output bitstream.

38. A method as in any one of the preceding embodiments, wherein outputting the motion information includes outputting the motion information such that the motion information is accessible by the encoder for generating an encoded output bitstream by obtaining source image data for a frame.

39. A method as in any one of the preceding embodiments, wherein outputting the motion information includes outputting the motion information such that the motion information is accessible by the encoder for generating an encoded output bitstream by obtaining the motion information.

40. A method as in any one of the preceding embodiments, wherein outputting the motion information includes outputting the motion information such that the motion information is accessible by the encoder for generating an encoded output bitstream by obtaining a source image portion from the source image data.

41. A method as in any one of the preceding embodiments, wherein outputting the motion information includes outputting the motion information such that the motion information is accessible by the encoder for generating an encoded output bitstream by generating a prediction portion for encoding the source image portion based on the motion information.

42. A method as in any one of the preceding embodiments, wherein outputting the motion information includes outputting the motion information such that the motion information is accessible by the encoder for generating an encoded output bitstream by generating encoded image data based on the prediction portion.

43. A method as in any one of the preceding embodiments, wherein outputting the motion information includes outputting the motion information such that the motion information is accessible by the encoder for generating an encoded output bitstream by including the encoded image data in the encoded output bitstream.

44. A method as in any one of the preceding embodiments, wherein obtaining the input image signal includes obtaining a first input image signal corresponding to a first input image.

45. A method as in any one of the preceding embodiments, wherein obtaining the input image signal includes obtaining a second input image signal corresponding to a second input image.

46. A method as in any one of the preceding embodiments, wherein obtaining the input image portion includes:
obtaining a first input image portion from the first input image signal.

47. A method as in any one of the preceding embodiments, wherein obtaining the input image portion includes:
obtaining a second input image portion from the second input image signal.

48. A method as in any one of the preceding embodiments, wherein generating the processed image portion includes: generating the processed image portion by combining the first input image portion and the second input image portion.
49. A method as in any one of the preceding embodiments, wherein generating the processed image portion includes modifying the motion information in accordance with combining the first input image portion and the second input image portion.
50. A method as in any one of the preceding embodiments, wherein outputting the processed image data includes storing the processed image data in a shared memory unit accessible by the encoder.
51. A method as in any one of the preceding embodiments, wherein obtaining the source image data includes reading the source image data from the shared memory.
52. A method as in any one of the preceding embodiments, wherein outputting the processed image data includes transmitting the processed image data to the encoder.
53. A method as in any one of the preceding embodiments, wherein outputting the processed image data omits storing the processed image data in a shared memory unit.
54. A method as in any one of the preceding embodiments, wherein obtaining the source image data includes receiving processed image data from the image signal processor as the source image data.
55. A method as in any one of the preceding embodiments, wherein obtaining the source image data omits reading the processed image data from a shared memory unit.
56. A method as in any one of the preceding embodiments, wherein outputting the motion information includes storing the motion information in a shared memory unit accessible by the encoder.
57. A method as in any one of the preceding embodiments, wherein obtaining the motion information includes reading the motion information from a shared memory accessible by the image signal processor.
58. A method as in any one of the preceding embodiments, wherein the encoder omits performing motion estimation in response to obtaining the motion information output by the image signal processor.
59. A method as in any one of the preceding embodiments, wherein generating the prediction portion includes performing motion estimation based on the motion information.
60. A method as in any one of the preceding embodiments, wherein the method includes identifying a block of a frame based on the input image signal.
61. A method as in any one of the preceding embodiments, wherein identifying the block includes identifying the block by the image signal processor.
62. A method as in any one of the preceding embodiments, wherein the method includes generating processed image data corresponding to the block.
63. A method as in any one of the preceding embodiments, wherein generating the processed image data includes generating the processed data by the image signal processor.
64. A method as in any one of the preceding embodiments, wherein the method includes determining a processed image indication for the block.
65. A method as in any one of the preceding embodiments, wherein the method includes determining a processed image indication for the block by the image signal processor.
66. A method as in any one of the preceding embodiments, wherein the method includes outputting the processed image indication as an encoding hint.
67. A method as in any one of the preceding embodiments, wherein the method includes outputting the processed image indication as an encoding hint by the image signal processor.
68. A method as in any one of the preceding embodiments, wherein the source image data includes the processed image data corresponding to the block.
69. A method as in any one of the preceding embodiments, wherein the method includes receiving source image indications for the frame, the source image indications including the processed image indication.
70. A method as in any one of the preceding embodiments, wherein the method includes receiving source image indications for the frame by the encoder.
71. A method as in any one of the preceding embodiments, wherein the method includes determining an encoding parameter for encoding the frame based on the processed image indication.
72. A method as in any one of the preceding embodiments, wherein the method includes determining an encoding parameter for encoding the frame based on the processed image indication by the encoder.
73. A method as in any one of the preceding embodiments, wherein the method includes generating an encoded frame by encoding the frame using the encoding parameter.
74. A method as in any one of the preceding embodiments, wherein the method includes generating an encoded frame by encoding the frame using the encoding parameter by the encoder.
75. A method as in any one of the preceding embodiments, wherein the method includes outputting or storing the encoded frame.
76. A method as in any one of the preceding embodiments, wherein the method includes outputting or storing the encoded frame by the encoder.
77. A method as in any one of the preceding embodiments, wherein receiving the input image signal includes buffering one or more lines of the input image signal in an internal storage unit of the image signal processor as buffered lines.
78. A method as in any one of the preceding embodiments, wherein identifying the block includes identifying a N×N size block from the buffered lines.
79. A method as in any one of the preceding embodiments, wherein the internal storage unit includes at least N line buffers, and wherein buffering the one or more lines includes buffering an Nth line from the one or more lines in an Nth line buffer from the at least N line buffers.
80. A method as in any one of the preceding embodiments, wherein receiving the input image signal includes receiving pixel values formatted in an image sensor format.
81. A method as in any one of the preceding embodiments, wherein generating the processed image data includes generating pixel values formatted in a defined processed format based on the pixel values formatted in the image sensor format.
82. A method as in any one of the preceding embodiments, wherein determining the processed image indication includes determining a scene complexity metric for the block.
83. A method as in any one of the preceding embodiments, wherein determining the scene complexity metric includes determining an activity variance metric for the block, and wherein determining the activity variance metric includes determining a sum of absolute differences for the block as the activity variance metric.

84. A method as in any one of the preceding embodiments, wherein outputting the processed image data includes storing the processed image data in a shared memory accessible by the encoder.

85. A method as in any one of the preceding embodiments, wherein outputting the processed image indication as the encoding hint includes storing the processed image indication as the encoding hint in a shared memory accessible by the encoder.

86. A method as in any one of the preceding embodiments, wherein outputting the processed image data includes storing the processed image data in a shared memory accessible by the encoder, and wherein outputting the processed image indication as the encoding hint includes storing the processed image indication as the encoding hint in the shared memory such that the shared memory includes an indication that the encoding hint is associated with the block.

87. A method as in any one of the preceding embodiments, wherein receiving the source image data includes reading the source image data from a shared memory accessible by the image signal processor.

88. A method as in any one of the preceding embodiments, wherein receiving the source image indications includes reading the source image indications from a shared memory accessible by the image signal processor.

89. A method as in any one of the preceding embodiments, wherein determining the encoding parameter includes determining one or more of a bit allocation for the block or a quantization parameter for the block.

90. A method as in any one of the preceding embodiments, wherein the method includes receiving a first input frame captured by a first image capture device of an image capture apparatus, the first image capture device having a first field-of-view.

91. A method as in any one of the preceding embodiments, wherein the method includes receiving a second input frame captured by a second image capture device of the image capture apparatus, the second image capture device having a second field-of-view such that a first region of the first field-of-view, corresponding to a first region of the first input frame, overlaps a second region of the second field-of-view, corresponding to a second region of the second input frame.

92. A method as in any one of the preceding embodiments, wherein the method includes generating a calibrated camera alignment model for the first image capture device and the second image capture device.

93. A method as in any one of the preceding embodiments, wherein generating the calibrated camera alignment model includes identifying a camera alignment model for the first image capture device and the second image capture device, wherein the camera alignment model includes information describing a first alignment path for a defined location in the first region of the first input frame and a second alignment path for the defined location in the second region of the second input frame.

94. A method as in any one of the preceding embodiments, wherein generating the calibrated camera alignment model includes identifying the first alignment path as a first candidate alignment path in the first input frame.

95. A method as in any one of the preceding embodiments, wherein generating the calibrated camera alignment model includes identifying a second candidate alignment path in the first input frame spatially adjacent to the first candidate alignment path in a first lateral direction.

96. A method as in any one of the preceding embodiments, wherein generating the calibrated camera alignment model includes identifying the second alignment path as a third candidate alignment path in the second input frame.

97. A method as in any one of the preceding embodiments, wherein generating the calibrated camera alignment model includes identifying a fourth candidate alignment path in the second input frame spatially adjacent to the third candidate alignment path in a second lateral direction.

98. A method as in any one of the preceding embodiments, wherein generating the calibrated camera alignment model includes identifying a first point along the first candidate alignment path or the second candidate alignment path corresponding to a second point along the third candidate alignment path or the fourth candidate alignment path.

99. A method as in any one of the preceding embodiments, wherein, on a condition that the first point is a point along the second candidate alignment path, generating the calibrated camera alignment model includes generating an updated first alignment path by updating the first alignment path based on the second candidate alignment path.

100. A method as in any one of the preceding embodiments, wherein, on a condition that the first point is a point along the second candidate alignment path, generating the calibrated camera alignment model includes omitting the first alignment path from the calibrated camera alignment model.

101. A method as in any one of the preceding embodiments, wherein, on a condition that the first point is a point along the second candidate alignment path, generating the calibrated camera alignment model includes including the updated first alignment path in the calibrated camera alignment model.

102. A method as in any one of the preceding embodiments, wherein, on a condition that the second point is a point along the fourth candidate alignment path, generating the calibrated camera alignment model includes generating an updated second alignment path by updating the second alignment path based on the fourth candidate alignment path.

104. A method as in any one of the preceding embodiments, wherein, on a condition that the second point is a point along the fourth candidate alignment path, generating the calibrated camera alignment model includes omitting the second alignment path from the calibrated camera alignment model.

105. A method as in any one of the preceding embodiments, wherein, on a condition that the second point is a point along the fourth candidate alignment path, generating the calibrated camera alignment model includes including the updated second alignment path in the calibrated camera alignment model.

106. A method as in any one of the preceding embodiments, wherein the method includes outputting or storing the calibrated camera alignment model.

107. A method as in any one of the preceding embodiments, wherein the first point is a point along the second candidate alignment path on a condition that a relative physical orientation of the first image capture device and the second image capture device concurrent with receiving the first input frame differs from a relative physical orientation of the first image capture device and the second image capture device concurrent with the camera alignment model.

108. A method as in any one of the preceding embodiments, wherein the first input frame is one of a sequence of input frames captured by the first image capture device for a defined temporal period, further comprising omitting generating a calibrated camera alignment model based on each frame from the sequence of input frames other than the first input frame.

109. A method as in any one of the preceding embodiments, wherein the camera alignment model is a previously generated calibrated camera alignment model calibrated based on input frames received prior to receiving the first input frame and reviving the second input frame.

110. A method as in any one of the preceding embodiments, wherein the defined location is a defined relative longitude.

111. A method as in any one of the preceding embodiments, wherein the first alignment path indicates a first end of the first alignment path at a first portion of the first region of the first input frame proximate to a location in the first input frame corresponding to the defined relative longitude and a defined relative latitude.

112. A method as in any one of the preceding embodiments, wherein the first alignment path indicates a second end of the first alignment path at a second portion of the first region of the first input frame proximate to a location in the first input frame corresponding to the defined relative longitude and a distal relative latitude.

113. A method as in any one of the preceding embodiments, wherein the defined relative latitude is the relative equator, and the distal relative latitude is a latitude a defined distance from the equator distal to an optical center of the first image capture apparatus.

114. A method as in any one of the preceding embodiments, wherein the distal relative latitude is at an edge of the first input frame.

115. A method as in any one of the preceding embodiments, wherein the camera alignment model includes information describing a plurality of alignment paths for a plurality of defined locations in the first region of the first input frame, wherein each alignment path from the plurality of alignment paths corresponds with a respective defined location from the plurality of defined locations, and wherein the first alignment path is one of the plurality of alignment paths and the defined location is one of the plurality of defined locations.

116. A method as in any one of the preceding embodiments, wherein each defined location from the plurality of defined locations corresponds with a respective distinct longitude.

117. A method as in any one of the preceding embodiments, wherein a distance between the first candidate alignment path and the second candidate alignment path is within half of a distance between the first alignment path and an adjacent alignment path from the plurality of alignment paths in the first lateral direction.

118. A method as in any one of the preceding embodiments, wherein identifying the first point includes generating a plurality of match quality metrics including a respective match quality metric for each point from a plurality of points along the first candidate alignment path, wherein the plurality of points along the first candidate alignment path includes the first point, and wherein each point from the plurality of points along the first candidate alignment path corresponds with a distinct relative latitude, and wherein determining the respective match quality metric for the first point includes determining a difference between a first block of pixels from the first input frame centered on the first point and a second block of pixels from the second input frame centered on the second point 119. A method as in any one of the preceding embodiments, wherein identifying the first point from the plurality of points along the first candidate alignment path the match quality metric for the first point is a minimal match quality metric from the plurality of match quality metrics such that a smoothness criterion is satisfied.

120. A method as in any one of the preceding embodiments, wherein the method includes applying a first pass of image processing to the one or more frames of the input video to determine one or more partially processed frames.

121. A method as in any one of the preceding embodiments, wherein the method includes applying the first pass includes applying the first pass by the image signal processor.

122. A method as in any one of the preceding embodiments, wherein the method includes storing the one or more partially processed frames in a memory.

123. A method as in any one of the preceding embodiments, wherein the method includes determining a warp mapping based on the one or more frames of the input video, wherein the warp mapping includes records that associate image portions of a frame of output video with corresponding image portions of the one or more frames of input video.

124. A method as in any one of the preceding embodiments, wherein the method includes sorting the records of the warp mapping according to a raster order of the corresponding image portions of the one or more frames of input video.

125. A method as in any one of the preceding embodiments, wherein the method includes applying a second pass of image processing to image portions of the one or more partially processed frames to determine image portions of one or more processed frames in the raster order.

125. A method as in any one of the preceding embodiments, wherein the method includes applying the second pass by the image signal processor.

126. A method as in any one of the preceding embodiments, wherein the method includes determining, by the image signal processor, the image portions of the frame of output video based at least in part on the warp mapping and the corresponding image portions of the one or more processed frames in the raster order.

127. A method as in any one of the preceding embodiments, wherein the method includes storing the frame of output video in the memory.

128. A method as in any one of the preceding embodiments, wherein operations comprise reading the frame of output video from the memory.

129. A method as in any one of the preceding embodiments, wherein operations comprise reading the frame by the encoder.

130. A method as in any one of the preceding embodiments, wherein operations comprise generating an encoded video based at least in part on the frame of the output video.

131. A method as in any one of the preceding embodiments, wherein operations comprise generating the encoded video by the encoder.

132. A method as in any one of the preceding embodiments, wherein operations comprise outputting or storing the encoded video.

133. A method as in any one of the preceding embodiments, wherein determining the warp mapping based on the one or more frames of input video comprises determining one or more low-resolution images based on the one or more frames of input video.

134. A method as in any one of the preceding embodiments, wherein determining the warp mapping based on the one or more frames of input video comprises determining the warp mapping based on the one or more low-resolution images.

135. A method as in any one of the preceding embodiments, wherein determining the warp mapping based on the one or more frames of input video comprises determining disparity based on two of the one or more frames of input video.

136. A method as in any one of the preceding embodiments, wherein determining the warp mapping based on the one or more frames of input video comprises determining a stitching boundary based in part on the disparity.

137. A method as in any one of the preceding embodiments, wherein determining the warp mapping based on the one or more frames of input video comprises determining, based in part on the stitching boundary, blend ratios associated with image portions of a frame of output video and corresponding image portions of the one or more frames of input video.

138. A method as in any one of the preceding embodiments, wherein determining the warp mapping based on the one or more frames of input video comprises storing the blend ratios as part of the respective records of the warp mapping.

139. A method as in any one of the preceding embodiments, wherein sizes, in pixels, of the at least some of the corresponding image portions of the one or more frames of input video vary based on a distance of the corresponding image portions from the stitching boundary.

140. A method as in any one of the preceding embodiments, wherein determining the warp mapping based on the one or more frames of input video comprises applying lens distortion correction to determine one or more lens corrected frames based on the one or more frames of input video.

141. A method as in any one of the preceding embodiments, wherein determining the warp mapping based on the one or more frames of input video comprises applying electronic rolling shutter correction to determine one or more shutter corrected frames based on the one or more lens corrected frames.

142. A method as in any one of the preceding embodiments, wherein determining the warp mapping based on the one or more frames of input video comprises determining disparity based on two of the one or more shutter corrected frames.

143. A method as in any one of the preceding embodiments, wherein determining the warp mapping based on the one or more frames of input video comprises determining a stitching boundary based in part on the disparity.

144. A method as in any one of the preceding embodiments, wherein determining the warp mapping based on the one or more frames of input video comprises determining an electronic image stabilization rotation based at least in part angular rate measurements for a device including the one or more image sensors.

145. A method as in any one of the preceding embodiments, wherein determining the warp mapping based on the one or more frames of input video comprises determining, based in part on the stitching boundary, blend ratios associated with image portions of a frame of output video and corresponding image portions of the one or more frames of input video.

146. A method as in any one of the preceding embodiments, wherein determining the image portions of the frame of output video based at least in part on the warp mapping and the corresponding image portions of the one or more processed frames in the raster order comprises warping and blending at least two of the one or more processed frames to generate the frame of output video.

147. An image capture device configured to perform at least part of any one of the preceding embodiments.

148. An image capture apparatus configured to perform at least part of any one of the preceding embodiments.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. A non-transitory computer-readable storage medium, comprising executable instructions that, when executed by a processor, facilitate performance of operations, comprising:
    obtaining, by an image signal processor, from an image sensor, an input image signal;
    obtaining, by the image signal processor, an input image portion of an input image from the input image signal;
    generating, by the image signal processor, motion information for the input image portion;
    generating, by the image signal processor, a processed image portion by processing the input image portion based on the motion information;
    including, by the image signal processor, the processed image portion in processed image data;
    outputting, by the image signal processor, the processed image data, such that the processed image data is accessible by an encoder; and
    outputting, by the image signal processor, the motion information as an encoding hint, such that the motion information is accessible by the encoder for generating an encoded output bitstream by:
        obtaining source image data for a frame, the source image data including the processed image data;
        obtaining the motion information;
        obtaining a source image portion from the source image data, the source image portion corresponding to the processed image portion;
        generating a prediction portion for encoding the source image portion based on the motion information;
        generating encoded image data based on the prediction portion; and
        including the encoded image data in the encoded output bitstream.

2. The non-transitory computer-readable storage medium of claim 1, wherein:
    obtaining the input image signal includes:
        obtaining a first input image signal corresponding to a first input image; and
        obtaining a second input image signal corresponding to a second input image;
    obtaining the input image portion includes:
        obtaining a first input image portion from the first input image signal; and
        obtaining a second input image portion from the second input image signal; and
    generating the processed image portion includes:
        generating the processed image portion by combining the first input image portion and the second input image portion; and
        modifying the motion information in accordance with combining the first input image portion and the second input image portion.

3. The non-transitory computer-readable storage medium of claim 1, wherein:
    obtaining the input image portion includes obtaining a current input block from a current input frame;
    generating the motion information includes:
        obtaining reference image data; and
        generating a motion vector indicating a displacement between the input image portion and the reference image data.

4. The non-transitory computer-readable storage medium of claim 1, wherein obtaining the input image signal includes buffering at least a portion of the input image signal in an internal buffer of the image signal processor.

5. The non-transitory computer-readable storage medium of claim 1, wherein:
outputting the processed image data includes storing the processed image data in a shared memory unit accessible by the encoder; and
obtaining the source image data includes reading the source image data from the shared memory.

6. The non-transitory computer-readable storage medium of claim 1, wherein:
outputting the processed image data includes:
transmitting the processed image data to the encoder; and
omits storing the processed image data in a shared memory unit; and obtaining the source image data includes:
receiving the processed image data from the image signal processor as the source image data; and
omits reading the processed image data from the shared memory unit.

7. The non-transitory computer-readable storage medium of claim 1, wherein:
outputting the motion information includes storing the motion information in a shared memory unit accessible by the encoder; and
obtaining the motion information includes reading the motion information from the shared memory.

8. The non-transitory computer-readable storage medium of claim 1, wherein outputting the motion information includes outputting the motion information such that the motion information is accessible by the encoder for generating the encoded output bitstream by:
generating the prediction portion for encoding the source image portion based on the motion information, wherein, in response to obtaining the motion information output by the image signal processor, generating the prediction portion for encoding the source image portion based on the motion information omits performing motion estimation.

9. The non-transitory computer-readable storage medium of claim 1, wherein outputting the motion information includes outputting the motion information such that the motion information is accessible by the encoder for generating the encoded output bitstream by:
generating the prediction portion by performing motion estimation based on the motion information.

10. A method comprising:
obtaining, by an image signal processor, from an image sensor, an input image signal;
obtaining, by the image signal processor, an input image portion of an input image from the input image signal;
generating, by the image signal processor, motion information for the input image portion;
generating, by the image signal processor, a processed image portion by processing the input image portion based on the motion information;
including, by the image signal processor, the processed image portion in processed image data;
outputting, by the image signal processor, the processed image data;
outputting, by the image signal processor, the motion information as an encoding hint;
obtaining, by an encoder, source image data for a frame, the source image data including the processed image data;
obtaining, by the encoder, the motion information;

obtaining, by the encoder, a source image portion from the source image data, the source image portion corresponding to the processed image portion;
generating, by the encoder, a prediction portion for encoding the source image portion based on the motion information;
generating, by the encoder, encoded image data based on the prediction portion; and
outputting, by the encoder, the encoded image data.

11. The method of claim 10, wherein:
obtaining the input image signal includes:
obtaining a first input image signal corresponding to a first input image; and
obtaining a second input image signal corresponding to a second input image;
obtaining the input image portion includes:
obtaining a first input image portion from the first input image signal; and
obtaining a second input image portion from the second input image signal; and
generating the processed image portion includes:
generating the processed image portion by combining the first input image portion and the second input image portion; and
modifying the motion information in accordance with combining the first input image portion and the second input image portion.

12. The method of claim 10, wherein:
outputting the processed image data includes storing the processed image data in a shared memory unit accessible by the encoder; and
obtaining the source image data includes reading the source image data from the shared memory.

13. The method of claim 10, wherein: outputting the processed image data includes:
transmitting the processed image data to the encoder; and
omits storing the processed image data in a shared memory unit; and obtaining the source image data includes:
receiving processed image data from the image signal processor as the source image data; and
omits reading the processed image data from a shared memory unit.

14. The method of claim 10, wherein:
outputting the motion information includes storing the motion information in a shared memory unit accessible by the encoder; and
obtaining the motion information includes reading the motion information from a shared memory accessible by the image signal processor.

15. The method of claim 10, wherein the encoder omits performing motion estimation in response to obtaining the motion information output by the image signal processor.

16. The method of claim 10, wherein generating the prediction portion includes performing motion estimation based on the motion information.

17. An apparatus comprising:
an image sensor;
an image signal processor configured to:
obtain an input image signal from the image sensor;
obtain an input image portion of an input image from the input image signal;
generate motion information for the input image portion;
generate a processed image portion by processing the input image portion based on the motion information;

include the processed image portion in processed image data;
output the processed image data; and
output the motion information as an encoding hint; and
an encoder configured to:
  obtain source image data for a frame, the source image data including the processed image data;
  obtain the motion information output by the image signal processor;
  obtain a source image portion from the source image data, the source image portion corresponding to the processed image portion;
  generate a prediction portion for encoding the source image portion based on the motion information;
  generate encoded image data based on the prediction portion; and
  output the encoded image data.

18. The apparatus of claim 17, wherein the image signal processor is configured to:
  obtain the input image signal by:
    obtaining a first input image signal corresponding to a first input image; and
    obtaining a second input image signal corresponding to a second input image;
  obtain the input image portion by:
    obtaining a first input image portion from the first input image signal; and
    obtaining a second input image portion from the second input image signal; and
  generate the processed image portion by:
    generating the processed image portion by combining the first input image portion and the second input image portion; and
    modifying the motion information in accordance with combining the first input image portion and the second input image portion.

19. The apparatus of claim 17, wherein:
  the apparatus includes a shared memory unit accessible by the image signal processor and the encoder;
  the image signal processor is configured to output the processed image data by storing the processed image data in the shared memory unit; and
  the encoder is configured to obtain the source image data by reading the source image data from the shared memory unit.

20. The apparatus of claim 17, wherein:
  the image signal processor is configured to:
    omit storing the processed image data in a shared memory unit; and
    output the processed image data by transmitting the processed image data to the encoder; and
  the encoder is configured to:
    omit reading the processed image data from the shared memory unit; and
    obtain the source image data by receiving the processed image data from the image signal processor as the source image data.

21. The apparatus of claim 17, wherein:
  the apparatus includes a shared memory unit accessible by the image signal processor and the encoder;
  the image signal processor is configured to output the motion information by storing the motion information in the shared memory unit; and
  the encoder is configured to obtain the motion information by reading the motion information from the shared memory.

22. The apparatus of claim 17, wherein the encoder is configured to omit performing motion estimation in response to obtaining the motion information output by the image signal processor.

23. The apparatus of claim 17, wherein the encoder is configured to generate the prediction portion by performing motion estimation based on the motion information.

* * * * *